US006188382B1

(12) United States Patent
Okamura et al.

(10) Patent No.: US 6,188,382 B1
(45) Date of Patent: Feb. 13, 2001

(54) IMAGE DISPLAY APPARATUS WITH IMPROVED IMAGE PORTION

(75) Inventors: Toshiro Okamura; Seiichiro Tabata, both of Hino (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 08/863,955

(22) Filed: May 27, 1997

(30) Foreign Application Priority Data

May 30, 1996 (JP) .................................................. 8-157394

(51) Int. Cl.[7] .................................................. G09G 5/00
(52) U.S. Cl. .............................................. 345/132; 345/121
(58) Field of Search .............................. 345/132, 88, 213, 345/214, 204

(56) References Cited

U.S. PATENT DOCUMENTS

| | | | | |
|---|---|---|---|---|
| 5,229,848 | * | 7/1993 | Sugasawa .............................. | 348/264 |
| 5,422,658 | * | 6/1995 | Kawaguchi et al. .................. | 345/213 |
| 5,689,283 | * | 11/1997 | Shirochi .............................. | 345/132 |

* cited by examiner

*Primary Examiner*—Steven J. Saras
*Assistant Examiner*—Alecia D. Nelson
(74) *Attorney, Agent, or Firm*—Stevens, Davis, Miller & Mosher, L.L.P.

(57) ABSTRACT

An image display apparatus including a liquid crystal display panel (LCD) constituting an image display plane composed of a plurality of pixels arranged with a pixel pitch, a LCD driver circuit which receives an input image signal S1 and displays an image on a substantially whole image display plane of the LCD as well as a part of the image on a selected region C of the image display plane by selectively shifting image display positions of the image with respect to inherent positions on said image display plane in a given direction by an integer multiple or an inverse of an integer multiple of the pixel pitch of the LCD, and a pixel shift driver circuit which effectively and selectively shifts, in synchronism with the operation of said LCD driver circuit, said image display plane in a direction opposite to said given direction in which said image display position shifting is carried out. Even if the LCD has a larger number of scanning lines or the pixel shift operation is performed by a larger number of times, the resolution can be effectively improved.

18 Claims, 55 Drawing Sheets

FIG_1

FIG_4

FIG_8

| | 0 | 1 | 2 | 3 | 4 | 5 | 6 | 7 | | |
|---|---|---|---|---|---|---|---|---|---|---|
| 1st Row | | | | | | | | | | |
| 2/5 Nth Row | | AD | AD+1 | AD+2 | AD+3 | AD+4 | AD+5 | AD+6 | AD+7 | |
| | | | | | | | | | | |
| | | | | | | | | | | ADE |

25

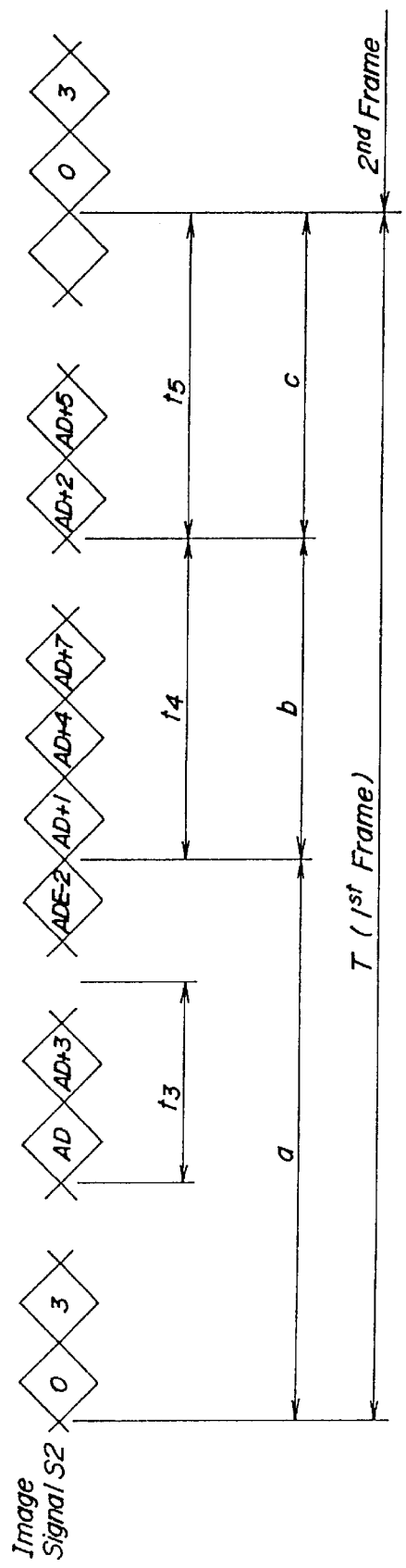

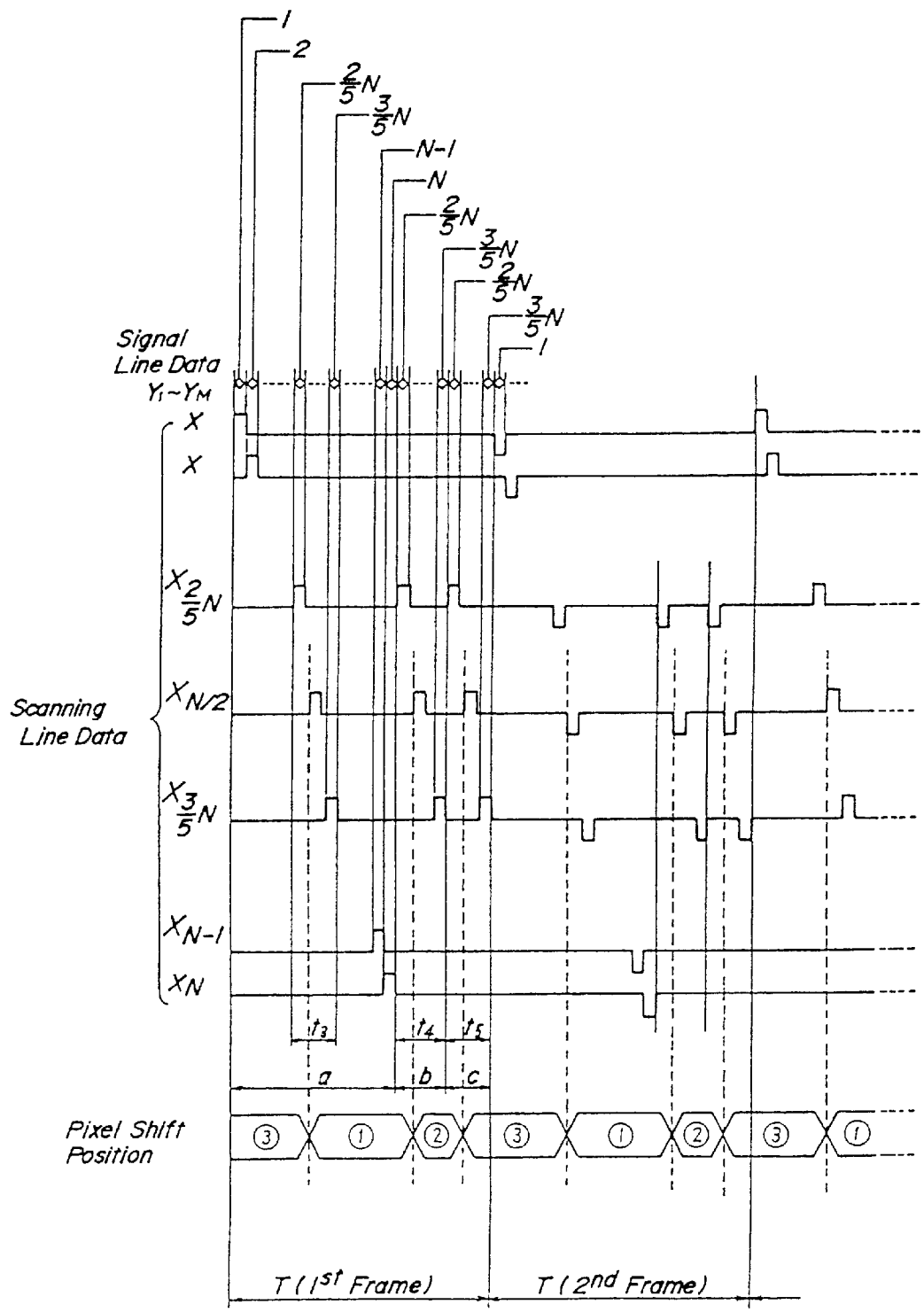
FIG_11

FIG_12A
FIG_12B
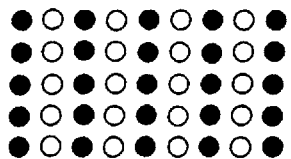
FIG_12C
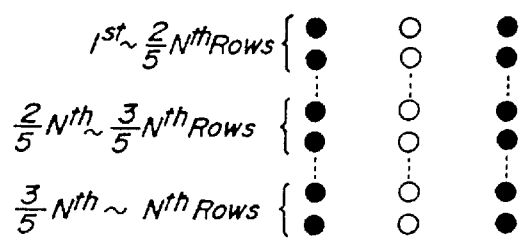
FIG_12D
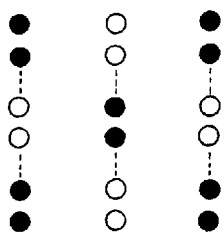
FIG_12F
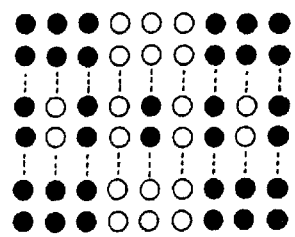
FIG_12E
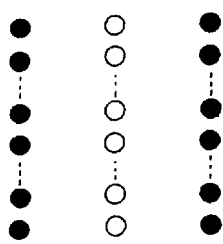

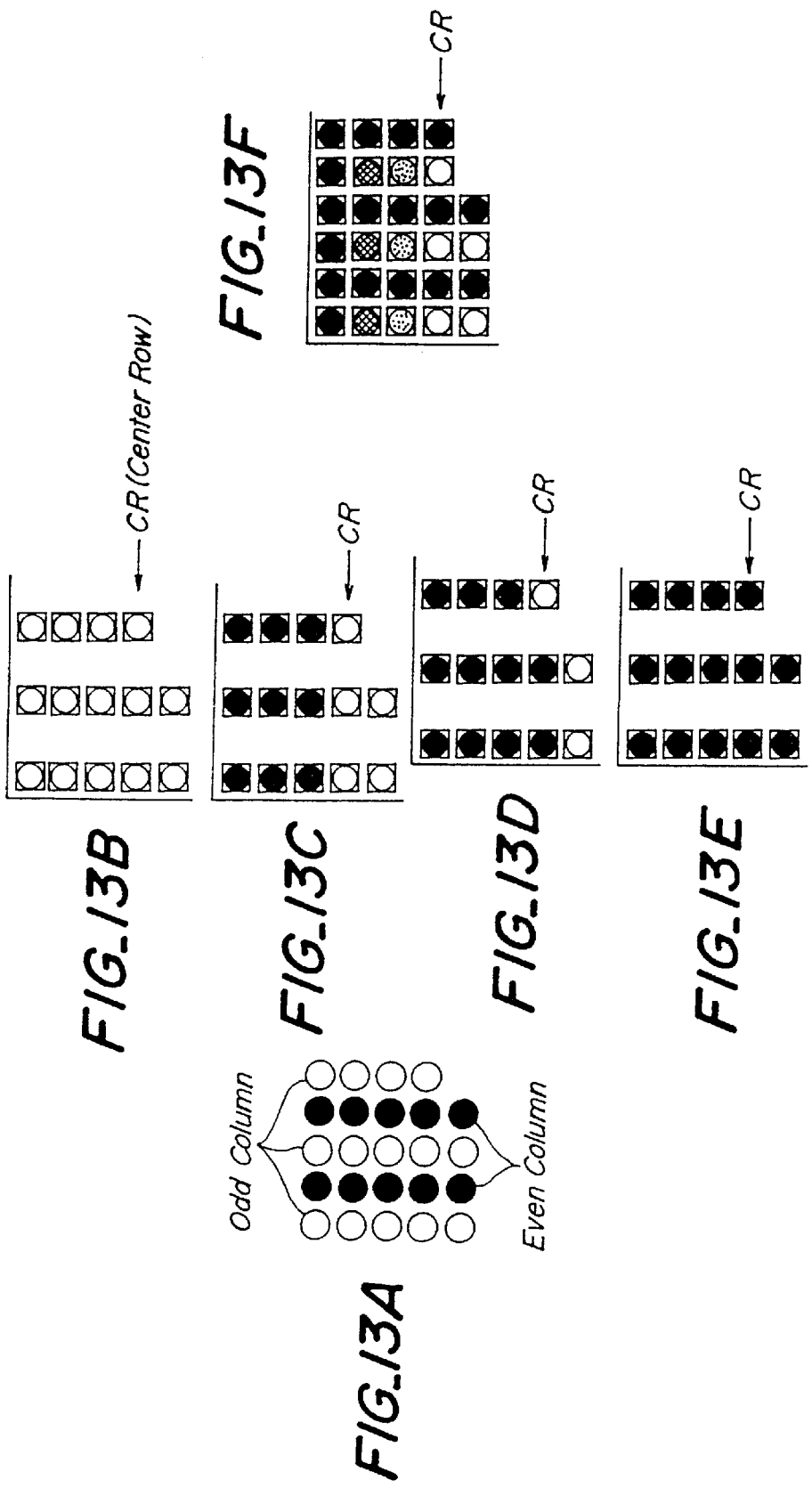

FIG_15
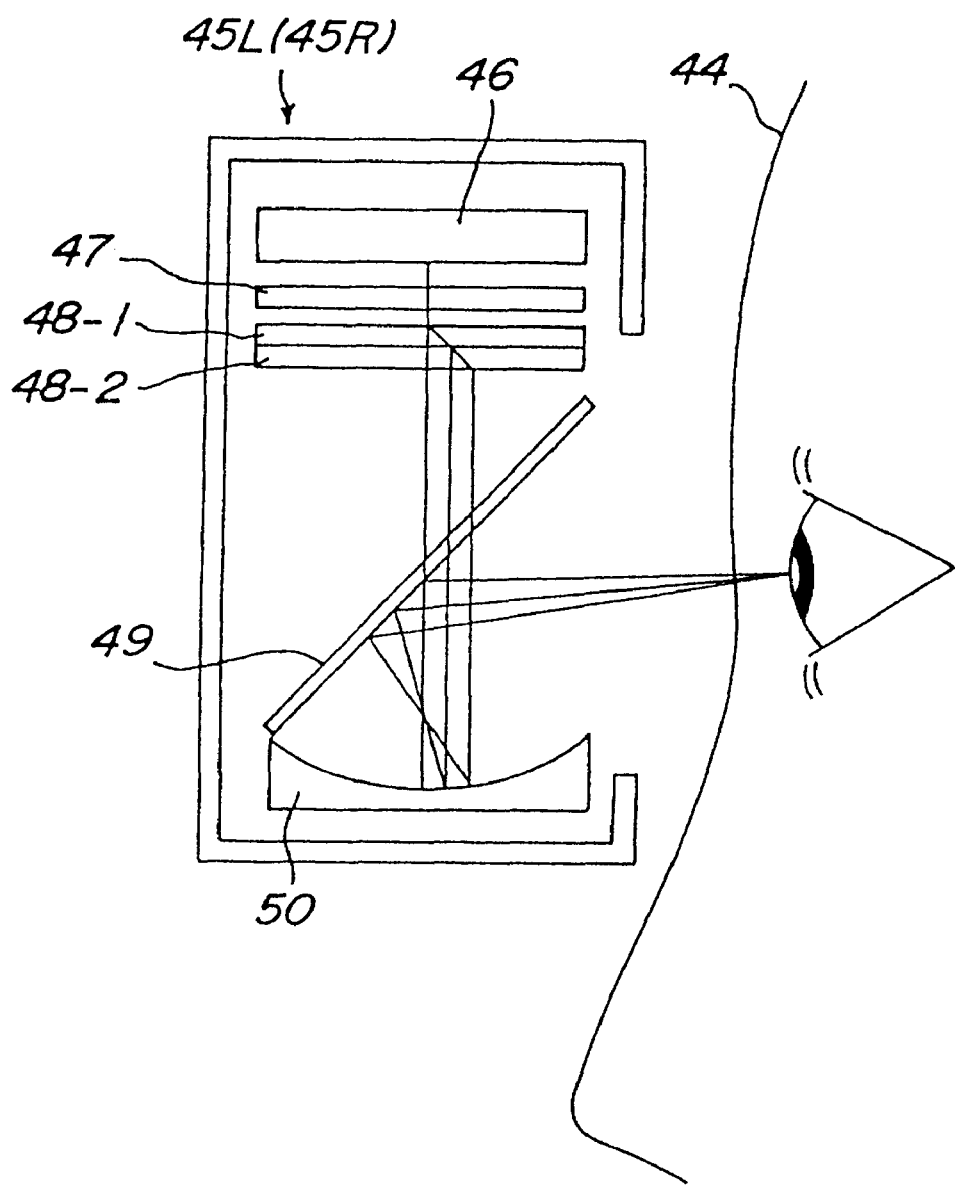

FIG_16
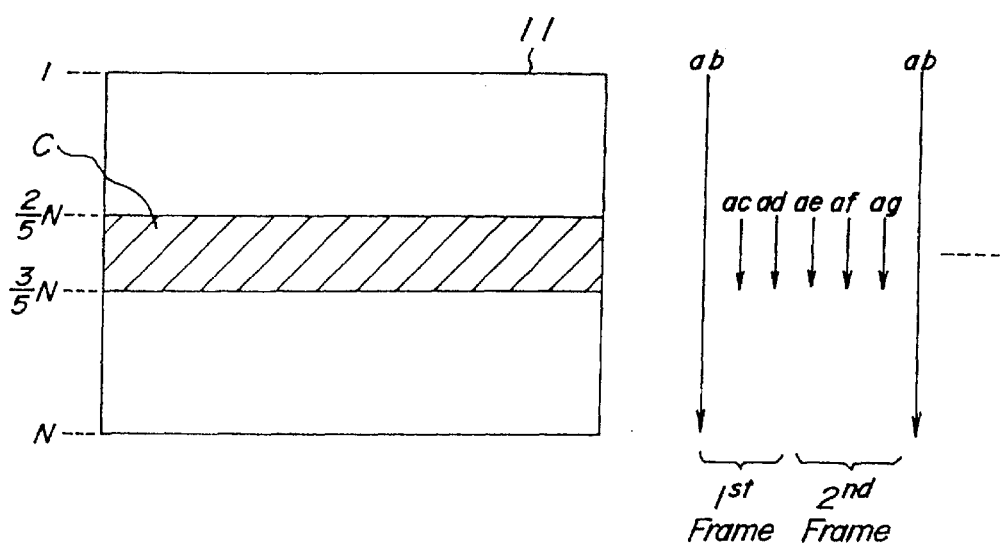

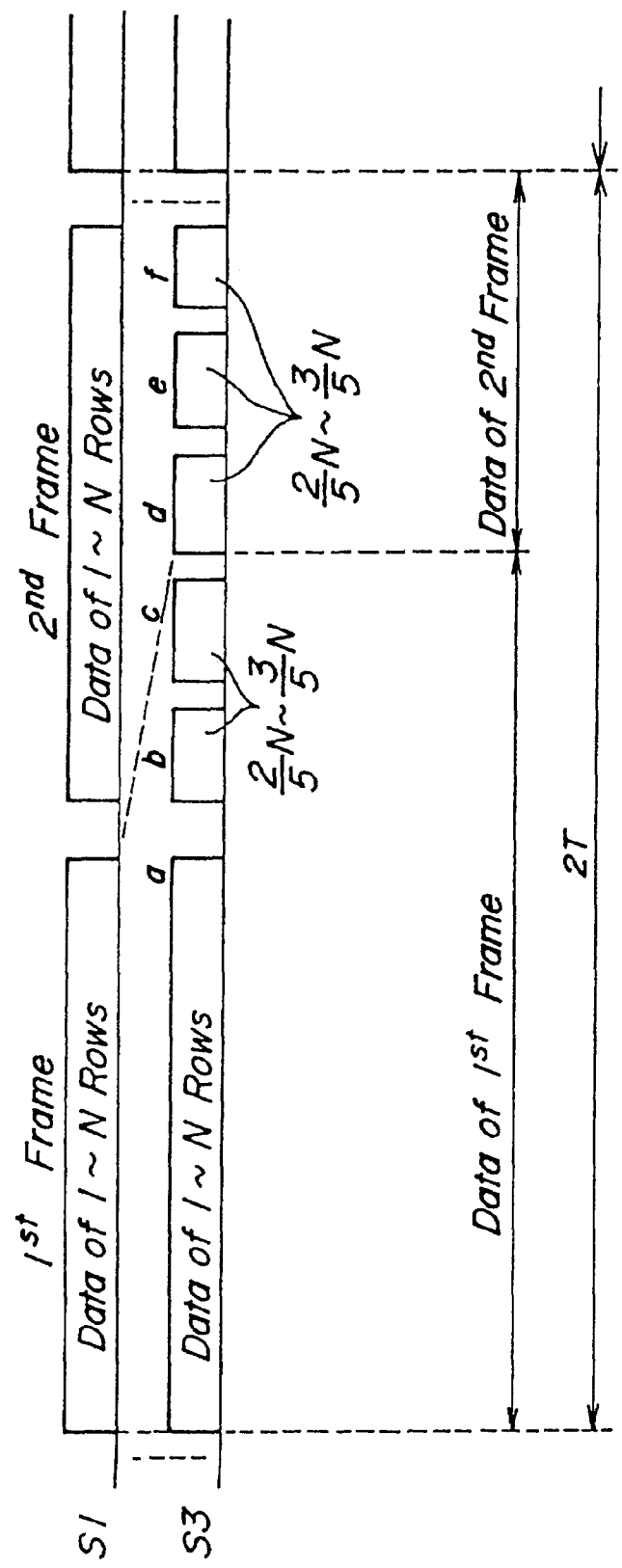
FIG_17

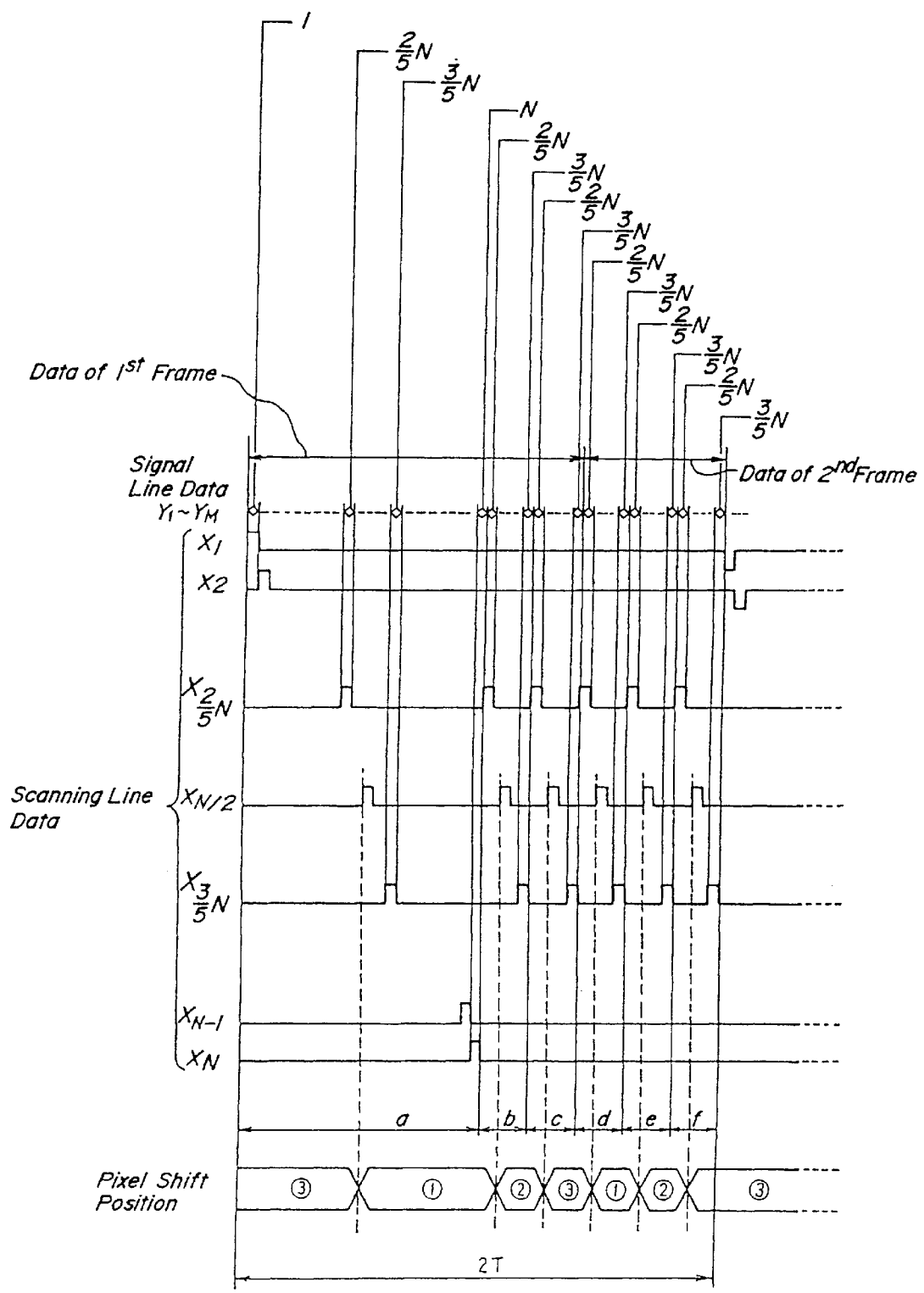
FIG_18

FIG_19
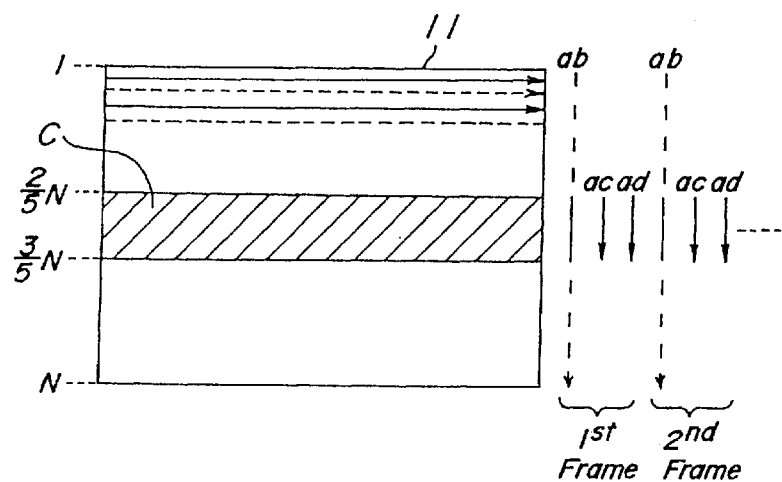
FIG_20
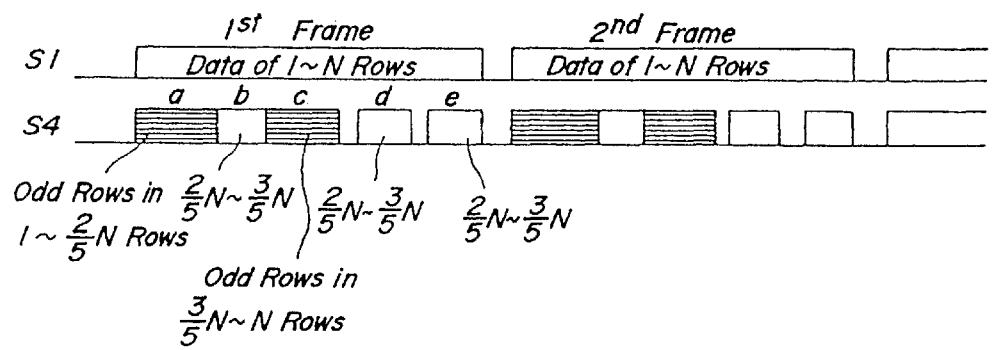

FIG_22
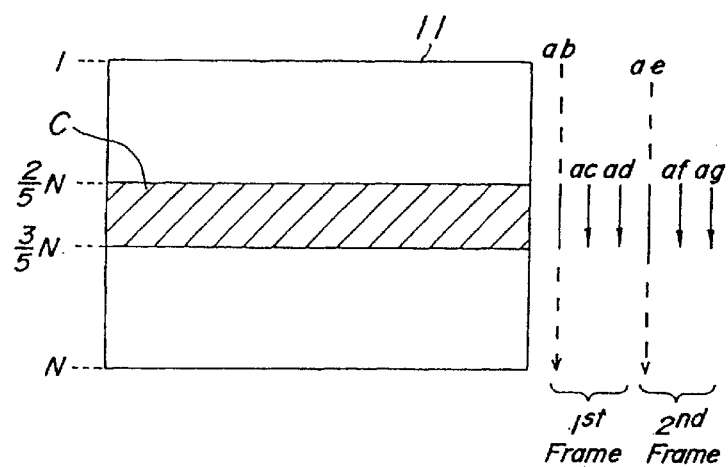
FIG_23
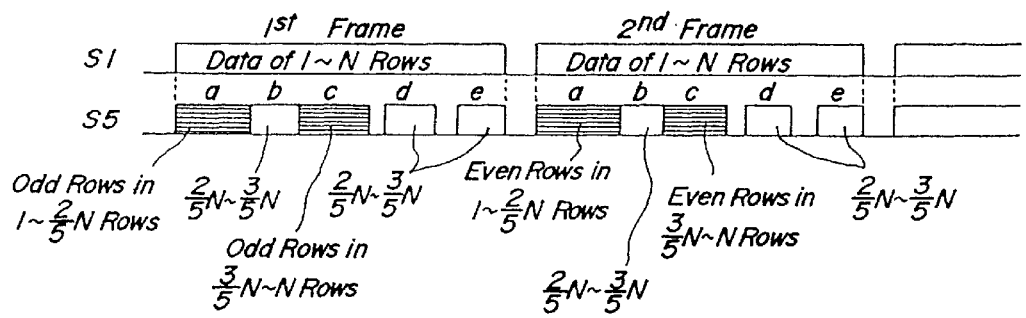

FIG_24
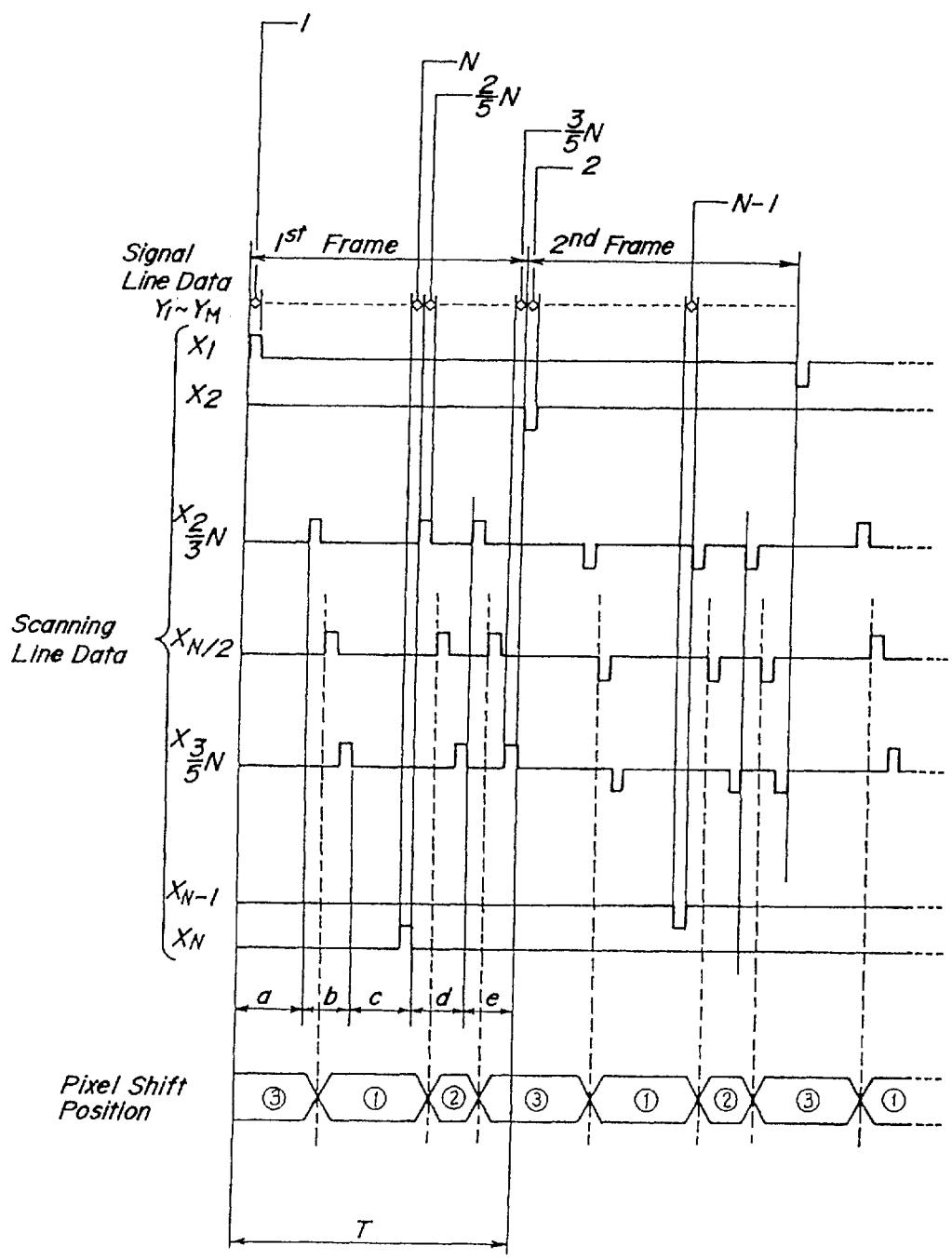

FIG_25
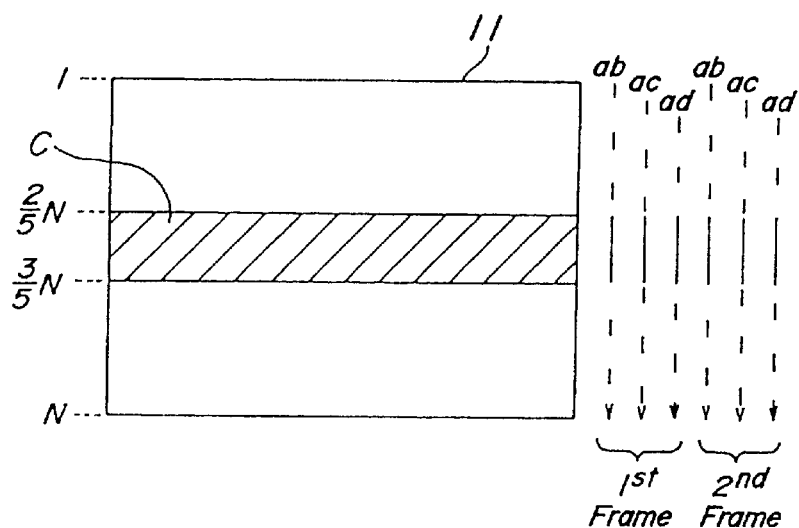
FIG_26
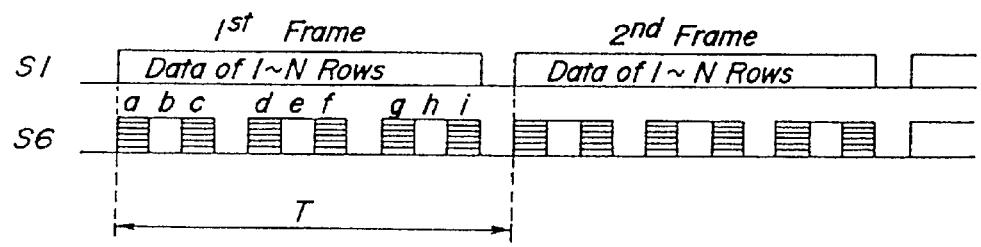

FIG_28
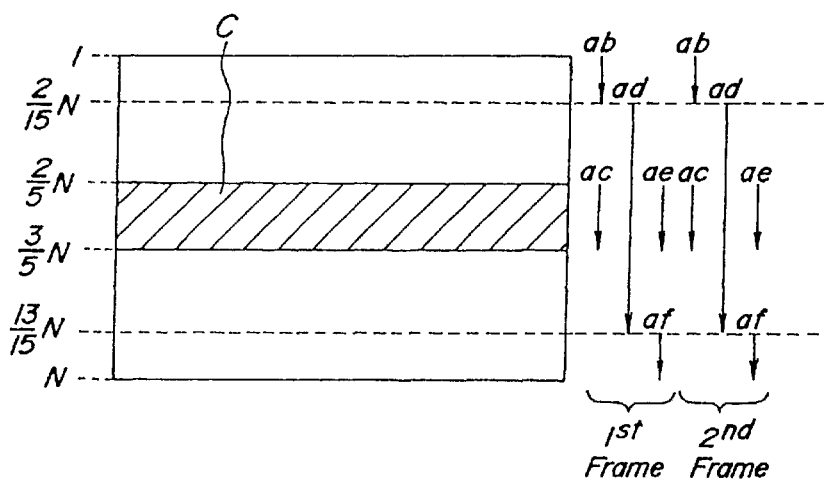
FIG_29
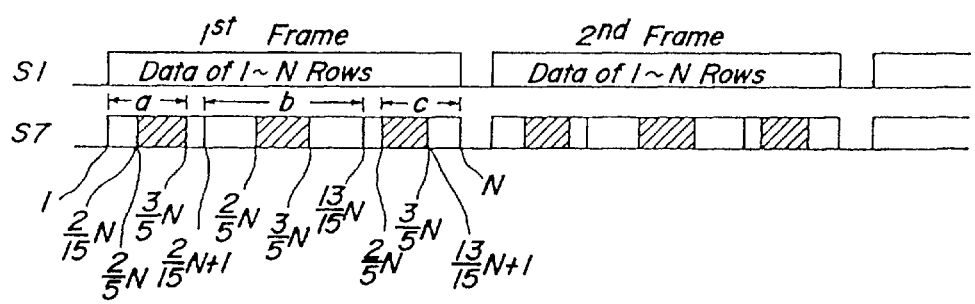

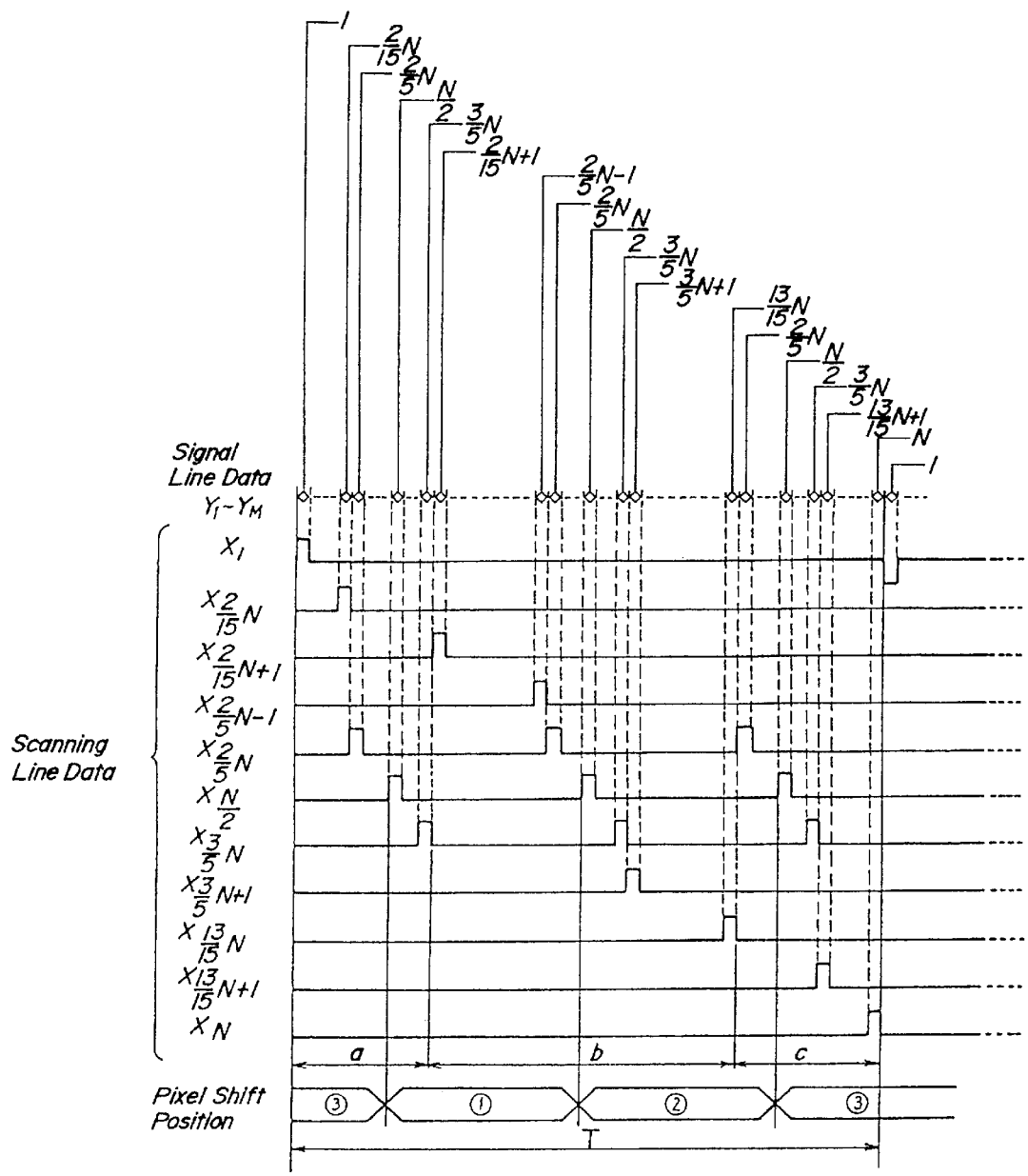
FIG_30

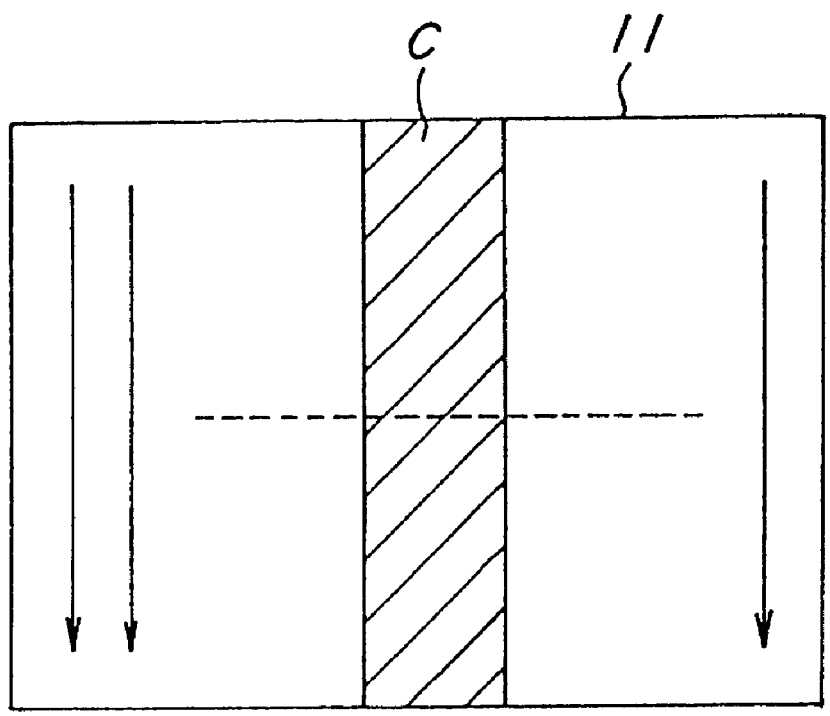
FIG_31

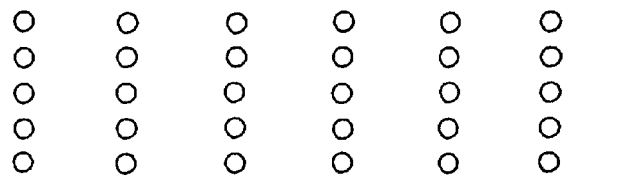
FIG_32A
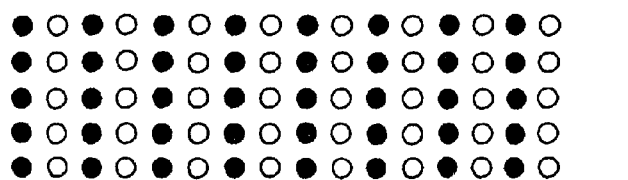
FIG_32B
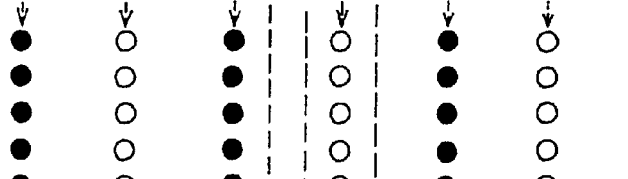
FIG_32C
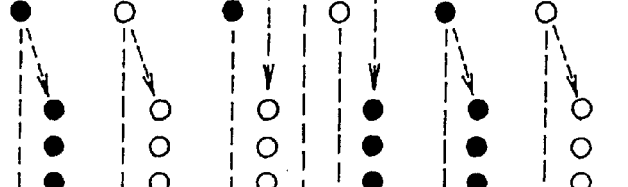
FIG_32D
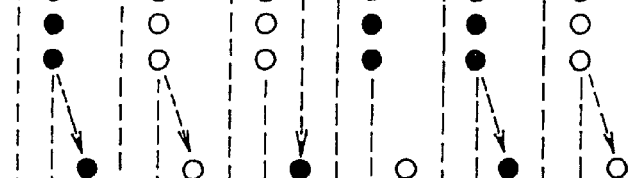
FIG_32E
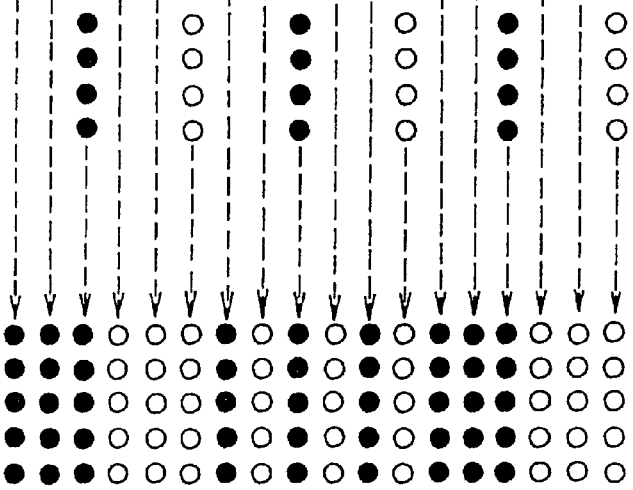
FIG_32F

FIG_35

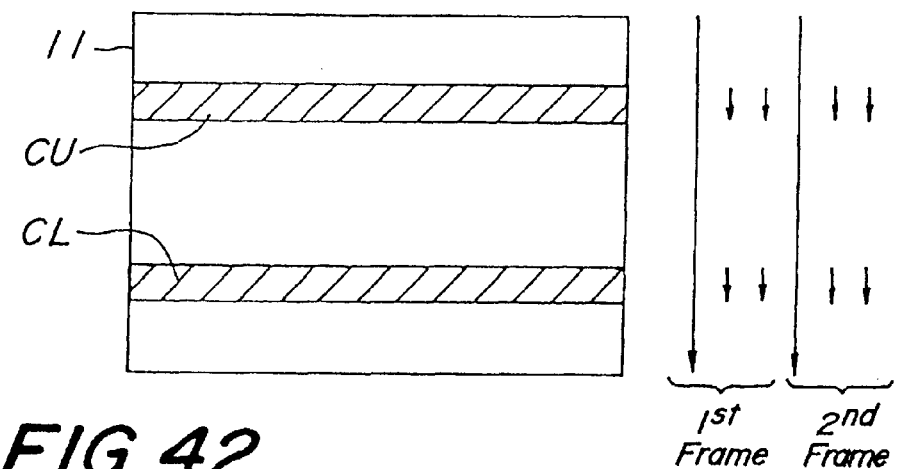
FIG_41
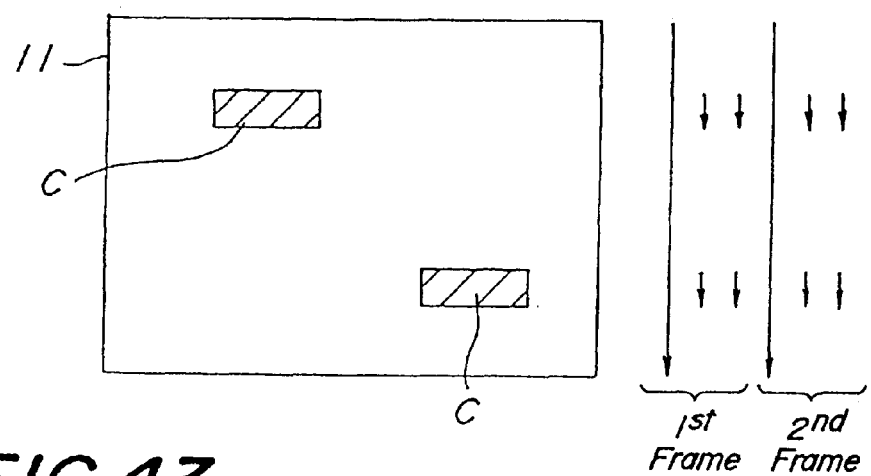
FIG_42
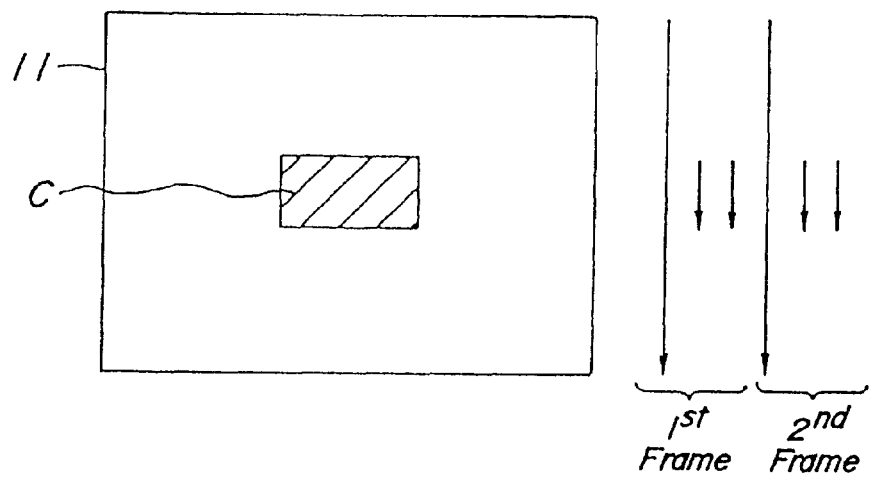
FIG_43

FIG_45
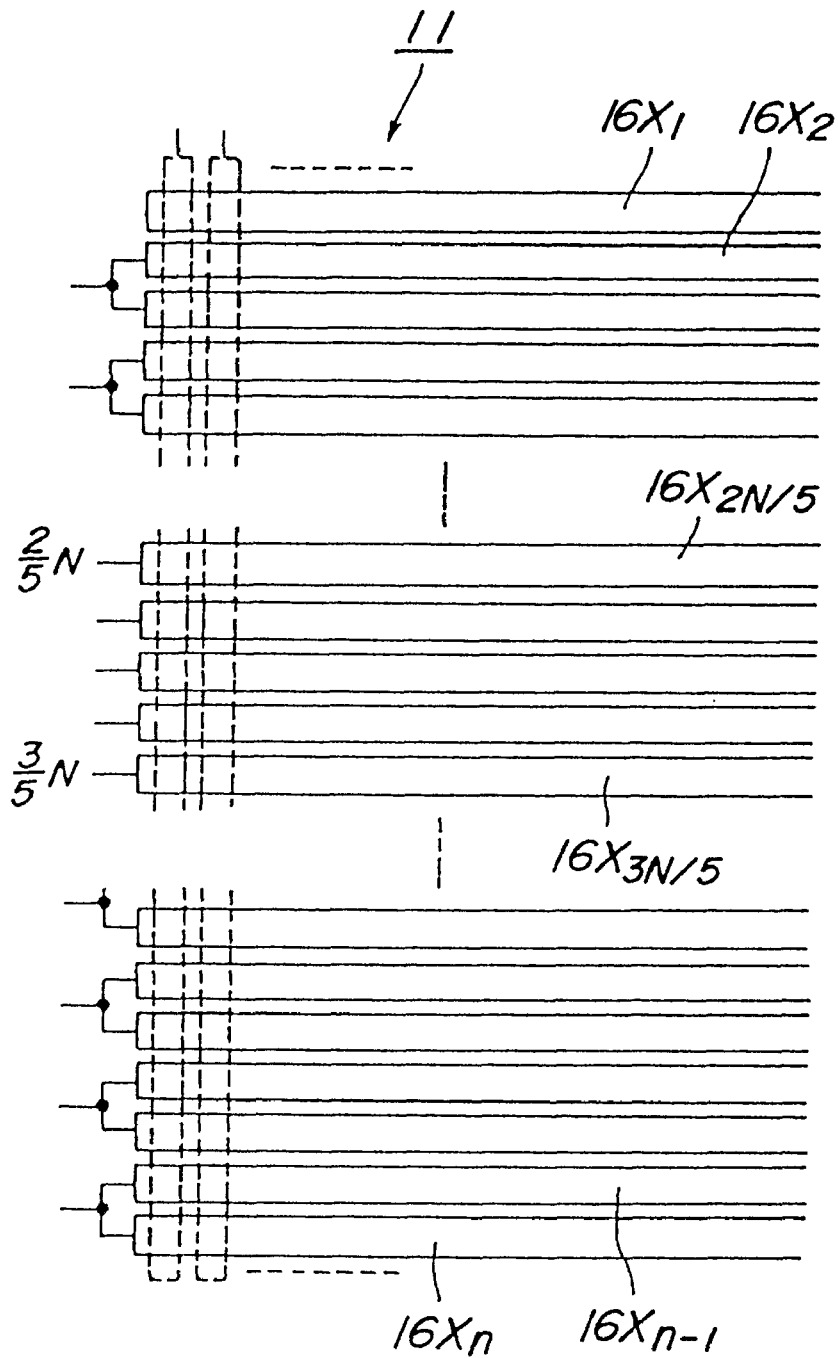

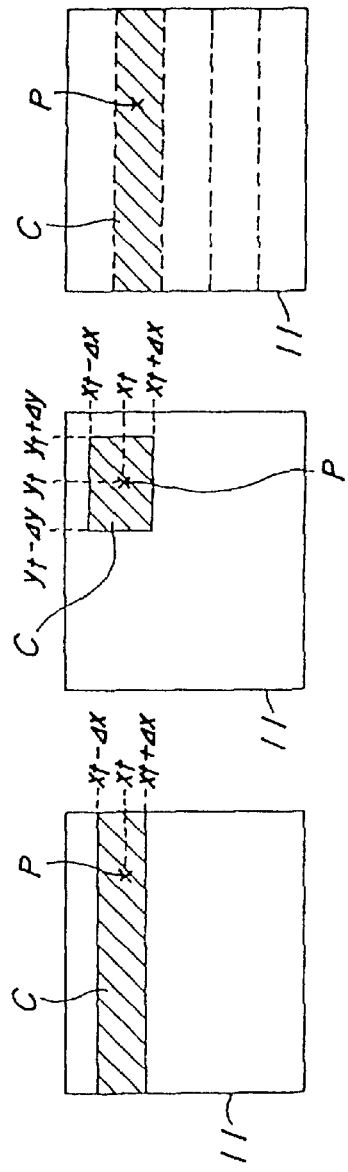
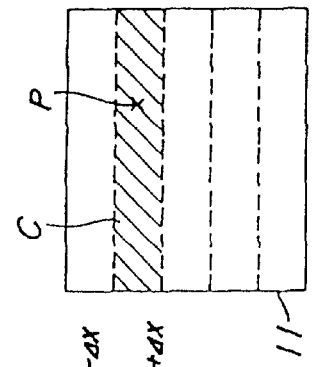
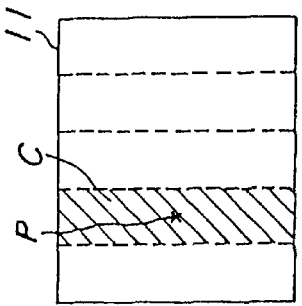
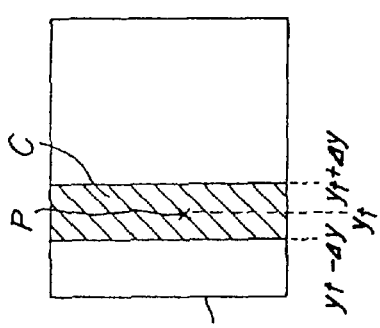
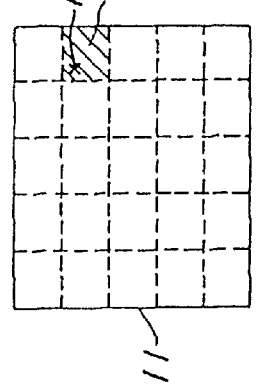

FIG_49A
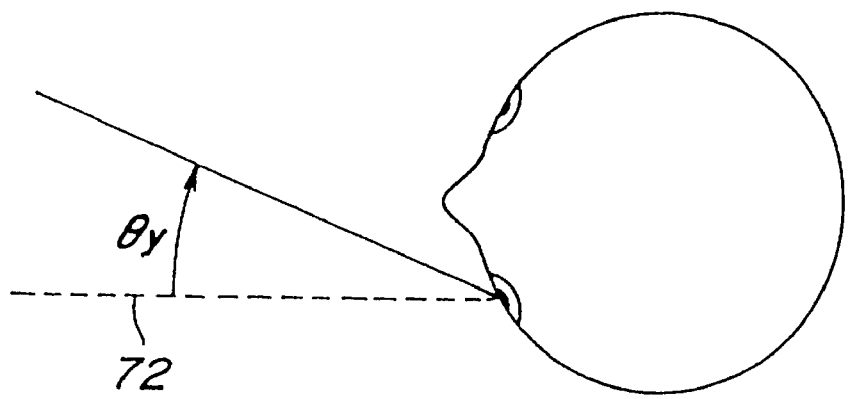
FIG_49B
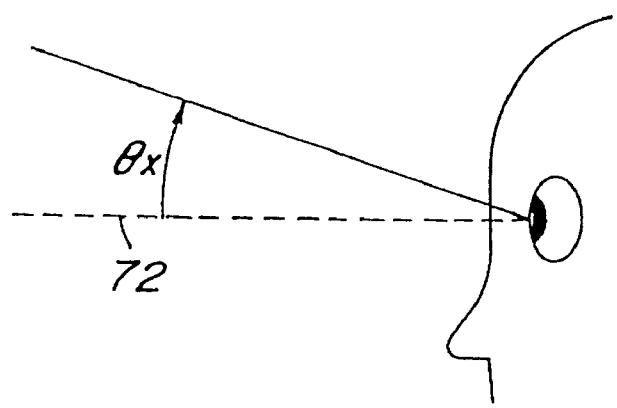

FIG_50A
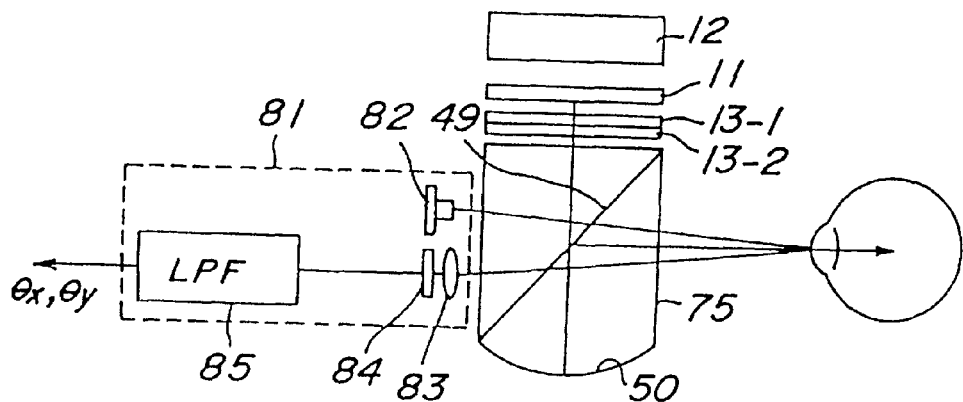
FIG_50B
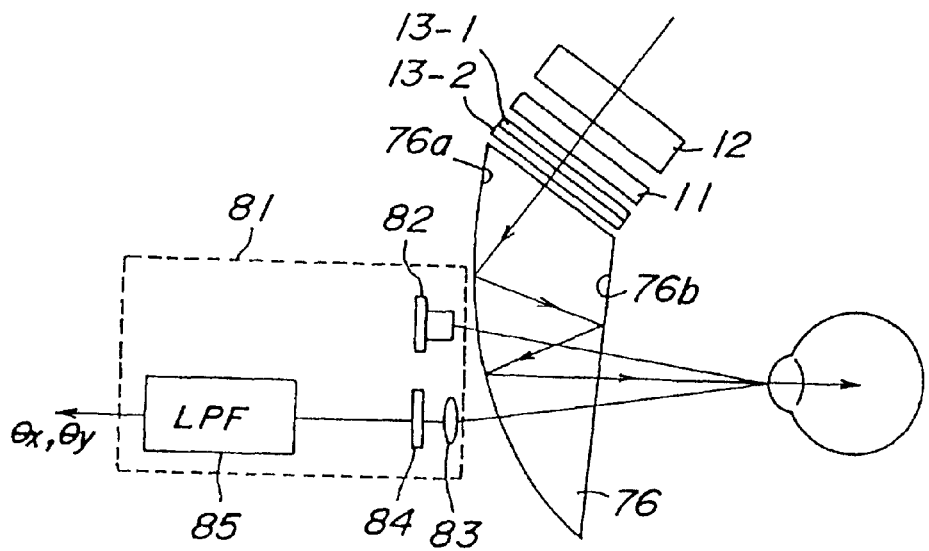

FIG_52
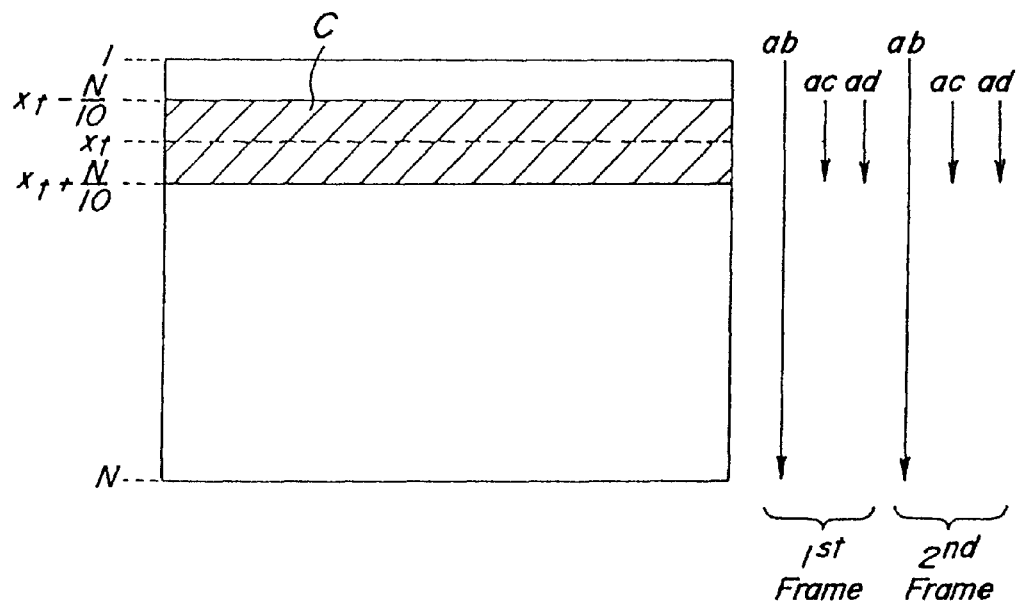
FIG_53
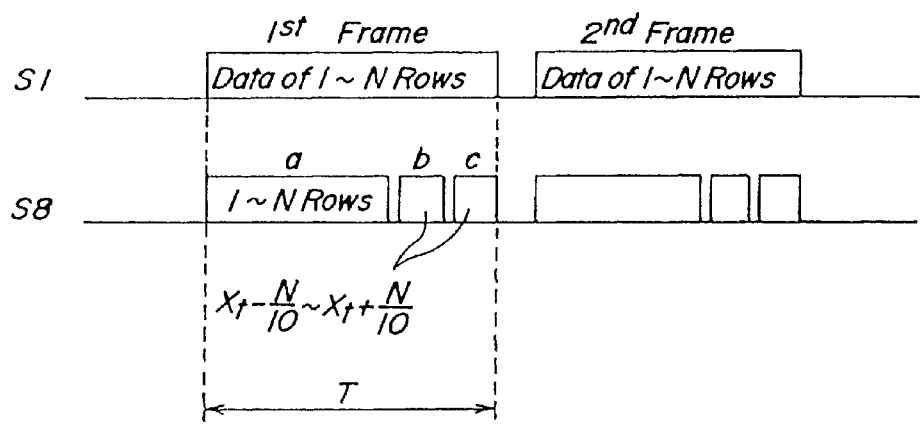

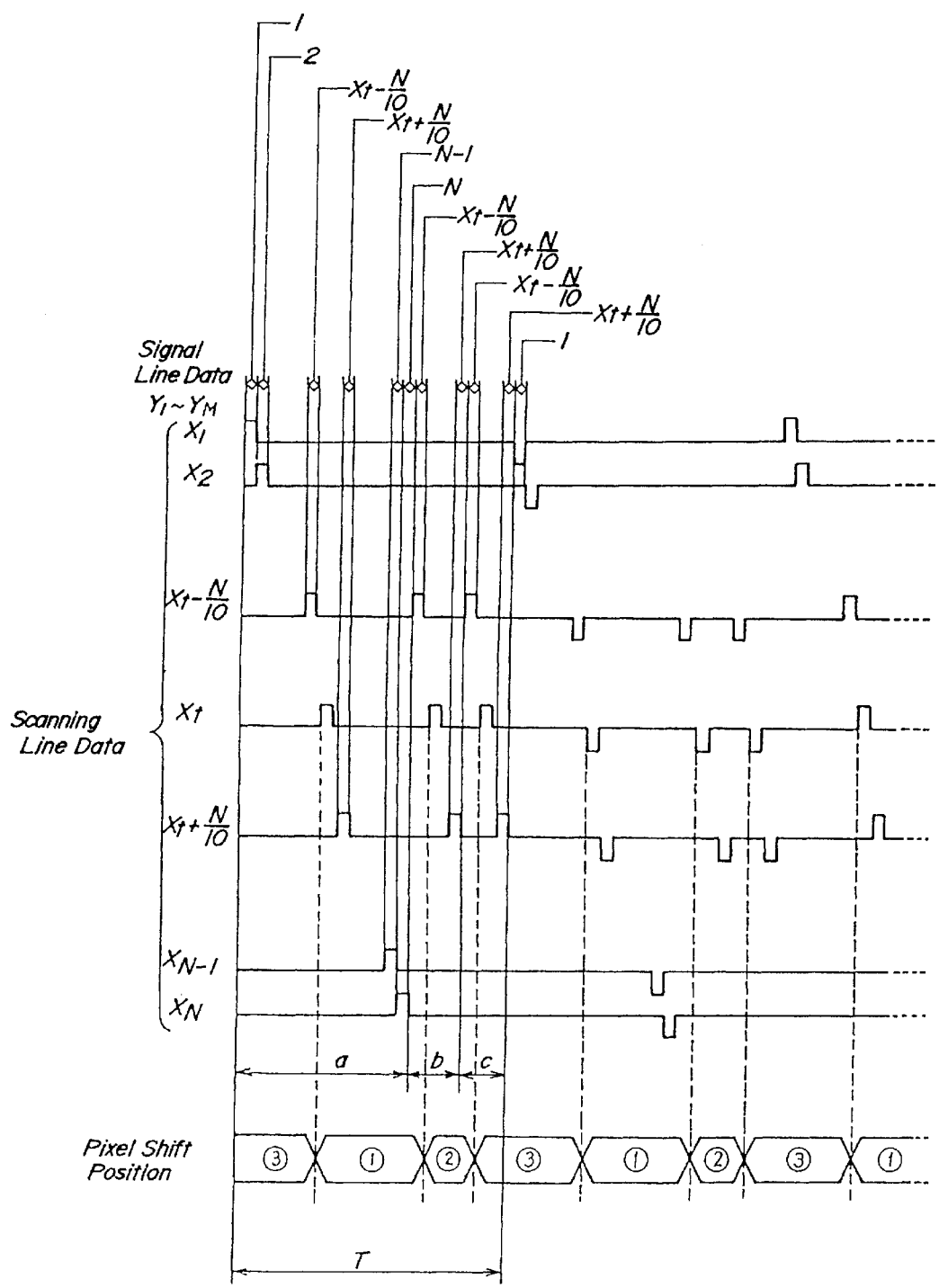
FIG_54

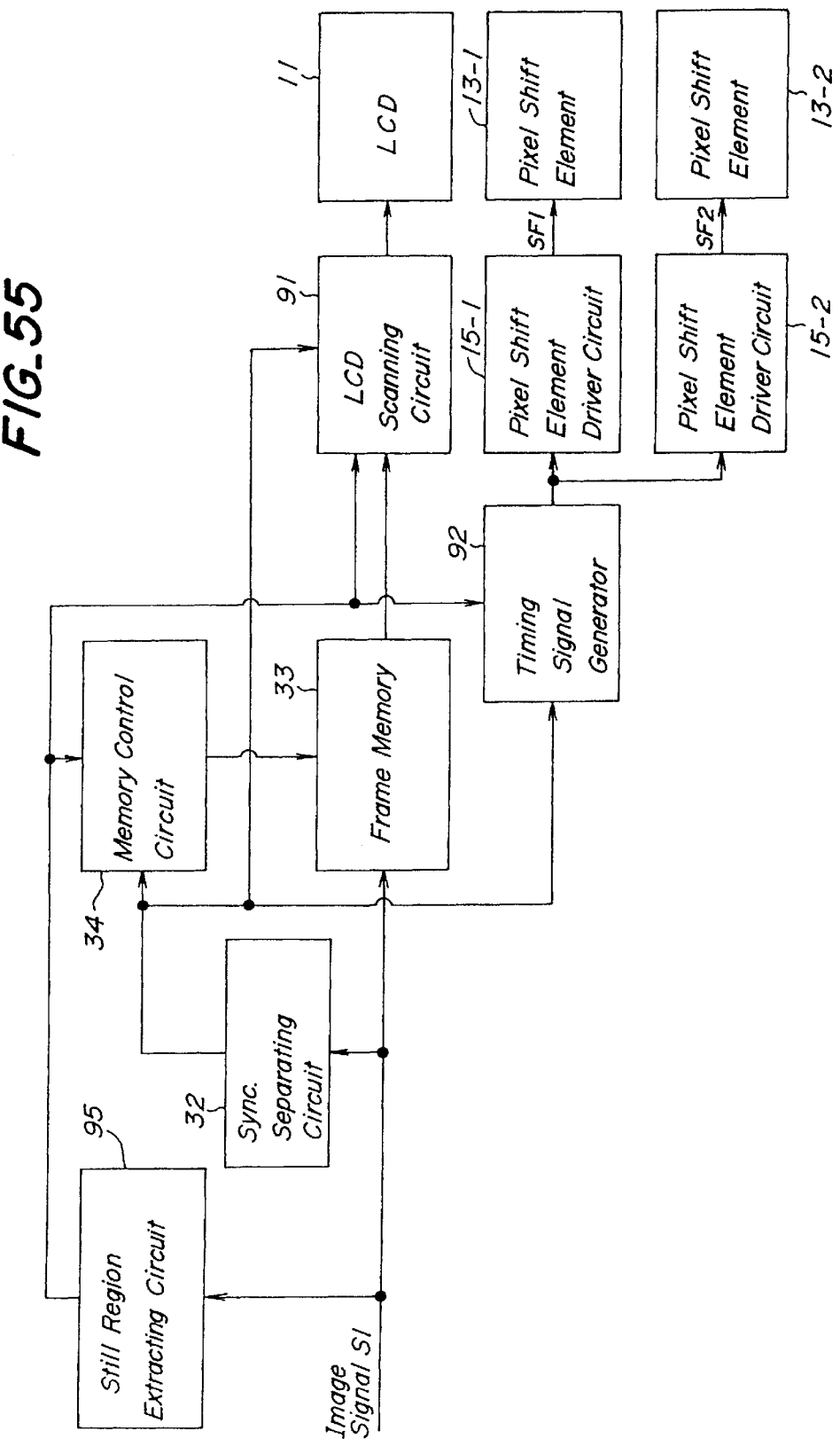

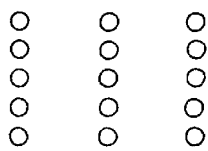
FIG_58A
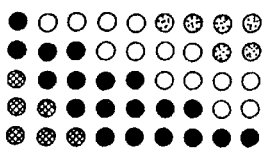
FIG_58B
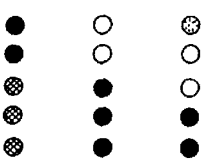
FIG_58C
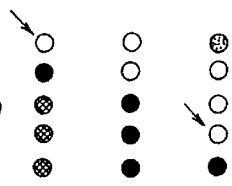
FIG_58D
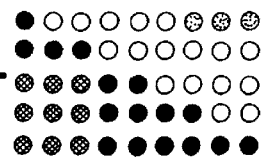
FIG_58F
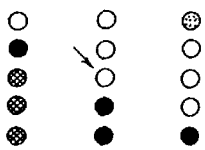
FIG_58E

FIG_59
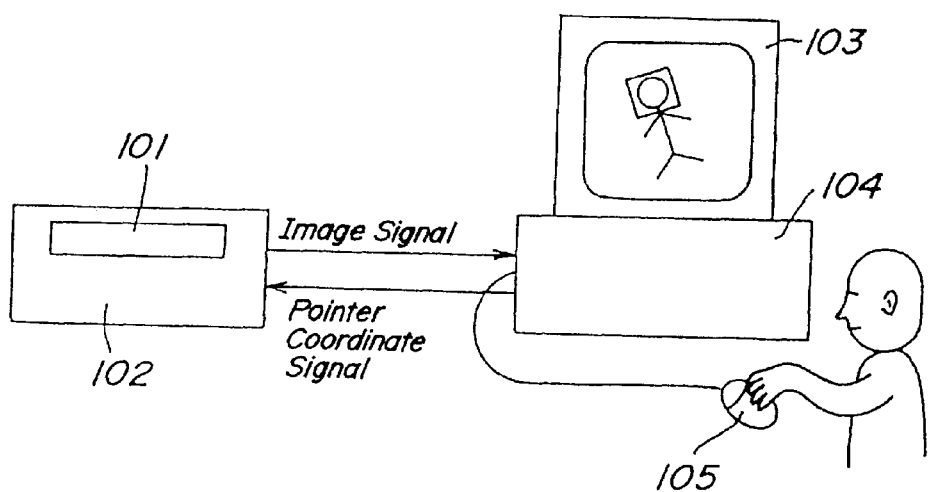

FIG_62A
PRIOR ART
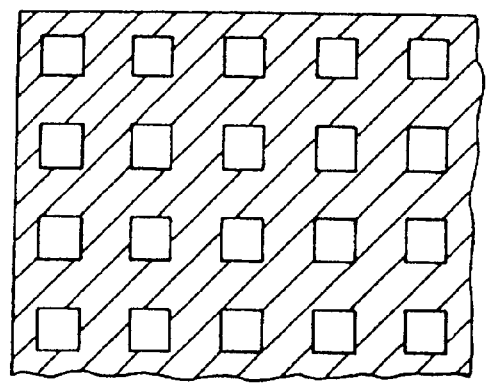
FIG_62B
PRIOR ART
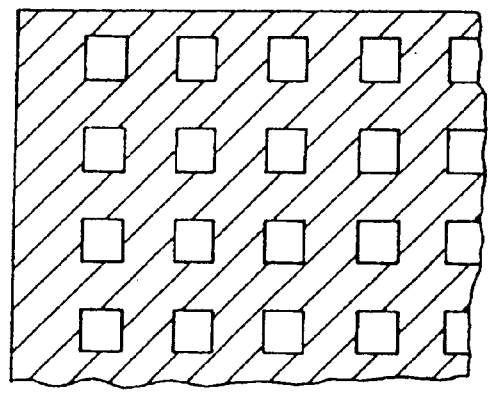
FIG_62C
PRIOR ART
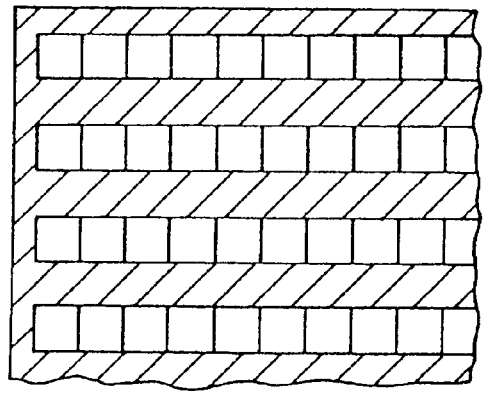

IMAGE DISPLAY APPARATUS WITH IMPROVED IMAGE PORTION

BACKGROUND OF THE INVENTION

1. Field of the Invention

The present invention relates to an image display apparatus for displaying an image by utilizing a pixel shift.

2. Related Art Statement

In Japanese Patent Application Laid-open Publication Kokai Hei 4-113308, there is proposed a known image display apparatus, in which an image of one frame is consisting of images of n fields, and a position of the images displayed in respective fields is shifted in a stepwise manner within a pixel pitch in up and down and right and left directions or in up and down, right and left and oblique directions. In this manner, the number of displaying image elements or pixels is equivalently increased by n times. FIG. 61 is a block diagram showing such a known image display apparatus. In front of an image displaying liquid crystal (LC) panel 1, there is arranged an image pixel shift element 4 comprising a polarizing direction controlling LC panel 2 and a birefringent or double refractive plate 3. Then, an original image can be displayed to have the number of pixels which is twice of that of pixels of the image displaying LC panel 1.

In the image display apparatus shown in FIG. 61, an input image signal of one frame is supplied to a divider 5 and is converted into image signals of two fields each corresponding to every other pixels viewed in the horizontal direction. These image signals are stored in frame memories 6 and 7. The image signals stored in the frame memories 6 and 7 are read-out successively under the control of a synchronizing signal generator 8 in such a manner that the image signals are read out alternately for successive fields and are supplied to the image displaying LC panel 1. In synchronism with the reading-out operation, a driving voltage generator 9 applies a given voltage to the polarizing direction controlling LC panel 2.

In case of displaying an image signal stored in the first frame memory 6, a voltage is applied to the polarizing direction controlling LC panel 2 such that an image displayed on the image displaying LC panel 1 is transmitted through the LC panel 2 without rotating a polarizing direction. Then, the image is made incident upon the birefringent element 3 as the ordinary light. Therefore, the image can be seen by a user such that the image is displayed at an ordinary position on the image displaying LC panel 1 as depicted in FIG. 62A. In the other words, no pixel shift occurs. When an image signal stored in the frame memory 7 is displayed, no voltage is applied to the polarizing direction controlling LC panel 2 from the driving voltage generator 9, and thus the polarizing direction of light emanating from the image displaying LC panel 1 is rotated by 90 degrees. Therefore, the light is made incident upon the birefringent element 3 as the extraordinary light. Therefore, the image can be seen by the user such that the image is displayed on the image displaying LC panel 1 at a position which is shifted by a half pixel pitch in the horizontal direction as illustrated in FIG. 62B.

As explained above, in the known image display apparatus shown in FIG. 61, the image signal of a frame is divided into two fields, and these fields are alternately displayed at a high rate. Then, the number of pixels in the horizontal direction can be increased twice as depicted in FIG. 62C. That is to say, the interpolation of pixels in the horizontal direction can be attained and the resolution in the horizontal direction can be increased.

In Japanese Patent Application Laid-open Publication Kokai Hei 7-13163, there is disclosed another known image display apparatus performing the vertical pixel shift. In case of displaying NTSC standard color television signal on an image display device such as a liquid crystal display having a lower resolution in the vertical direction, image signals of odd and even fields are not displayed on the same horizontal lines, but the pixel shift is effected in the vertical direction to improve the resolution in the vertical direction.

FIG. 63 shows another known image display apparatus using the above mentioned pixel shift technique. In front of an image displaying LC panel 1, there are arranged two pixel shift elements 4-1 and 4-2 successively, each of said pixel shift elements comprising a polarizing direction controlling LC panel and a birefringent element. The image displaying LC panel 1 has a delta arrangement of R, G and B color pixels as depicted in FIG. 64. By suitably driving the pixel shift elements 4-1 and 4-2, the image position to be seen by a user is shifted over two pixel pitches in the horizontal direction. Then, the number of effective image pixels can be increased by three times. It should be noted that in FIG. 63, a light ray emanating from a center of the image displaying LC panel 1 has three pixel shift positions ①, ② and ③ which are shifted vertically for the sake of clarity.

In case of carrying out the pixel shift as explained above, the image information has to be changed or rewritten for a time interval during which an ordinary image of one frame is displayed without the pixel shift. Therefore, it is advantageous to use, as the image displaying LC panel 1, ferro-electric liquid crystal panel (FLC) and anti-ferroelectric liquid crystal panel (AFLC) which can have a higher response speed than other LC panels.

These LC panels having a high response speed are generally driven in a simple matrix mode, and thus a time period for rewriting image data of one frame is equal to a product of the number of scanning lines and a response time. Therefore, when the number of scanning lines of the image displaying LC panel is increased or the number of times of the pixel shift operations in a frame period becomes large, a relatively long time is required for rewriting the image data of one frame and the desired pixel shift could be no more attained and the high resolution could never be achieved.

For instance, in FIG. 63, when the NTSC color television signal is displayed on the AFLC with 525 scanning lines and response time per line of 20 $\mu$s by effecting the pixel shift by two times for a frame period, a time x required for rewriting the image data of one frame will amount to $$X = 20\ \mu s \times (525+525+525) = 31.5\ ms$$

Then, it is impossible to rewrite the image data during one frame period of 1/60 seconds, i.e. about 16.6 ms.

This problem is not specific to the image display on the liquid crystal panel, but also occurs for plasma display, electro-luminescent panel, photochromic panel and others having pixels arranged in matrix or in an image display apparatus driven by any driving mode other than the simple matrix mode.

SUMMARY OF THE INVENTION

The present invention has for its object to provide a novel and useful image display apparatus, in which the resolution can be effectively increased even if an image display device having a large number of scanning lines is used and the number of pixel shift operations is made larger.

According to the invention, an image display apparatus comprises:

an image display plane composed of a plurality of pixels arranged with a pixel pitch;

image display control means for displaying an image on a substantially whole area of the image display plane and displaying a part of the image on a region of the image display plane by selectively shifting image display positions of the image with respect to said image display plane in a given direction by an integer multiple or an inverse of an integer multiple of the pixel pitch of the image display plane; and image display plane shift means for effectively and selectively shifting, in synchronism with the operation of said image display control means, said image display plane in a direction opposite to said given direction in which said image display position shifting is carried out.

In a preferable embodiment of the image display apparatus according to the invention, in order to increase the resolution at the selected region of the image, the image display control means is constructed such that for the selected region of the image display plane, the image whose display position is selectively shifted is displayed plural times for a given time period and for the remaining portion of the image display plane, an image data rewriting operation is performed only once for said given time period.

In a preferable embodiment of the image display apparatus according to the invention, said image display control means displays a first image corresponding to the whole image display plane at a first brightness, and then displays a second image a part of which is shifted at a second brightness different from said first brightness. Then, a variation in brightness of the displayed image due to the image data rewriting operation can be suppressed.

According to the invention, when the image display plane having a relatively low response speed is used, said image display control means is preferably constructed such that the image is displayed on the image display plane in such a manner that the vertical resolution of an image portion displayed in said selected region of the image display plane becomes higher than that of an image portion displayed in the remaining part of the image display plane.

According to the invention, it is preferable to construct the image display control means such that the image displayed in such a manner that time periods for rewriting the image for said selected region of the image display plane become identical with each other. Then, a variation in brightness of the displayed image due to the image data rewriting operation can be suppressed without adjusting the brightness during the image data rewriting operation.

In order to increase the resolution in a vertically prolonged region of the image display plane, said image display control means is preferably constructed such that the image is displayed by scanning successive vertical columns of the image display plane in a horizontal direction.

In another preferable embodiment of the image display apparatus according to the invention, said image display plane is divided into a plurality of portions, and said image display control means is constructed such that images are displayed on substantially whole areas of said respective portions of the image display plane and a display position of a part of an image displayed in a part of each of said plurality of portions is selectively shifted. In this embodiment, a multiple image can be advantageously displayed on the image display plane, and in each of plural images of the multiple image, the resolution can be increased in a selected region.

In another preferable embodiment of the image display apparatus according to the invention, said selected region in the image display plane is formed to have a plurality of areas which are separated from each other. Then, the resolution can be improved in a plurality of areas of the image display plane.

In another preferable embodiment of the image display apparatus according to the invention, there is further provided a means for detecting a point of view of a user on the image display plane, and said selected region in the image display plane is set to an area which contains said point of view. In this embodiment, the resolution can be selectively improved in a part of the displayed image at which the user looks.

In another preferable embodiment of the image display apparatus according to the invention, the apparatus further comprises a means for extracting, from the input image signal, a part of the images which shows a small or no movement between successive frames, and said selected region in the image display plane is set to an area which contains said part of images. In general, since the user looks at a still picture portion in the displayed image, the resolution can be effectively improved by increasing the resolution in the still picture portion.

In another preferable embodiment of the image display apparatus according to the invention, said apparatus further comprises a means for extracting a part of the image displayed on the image display plane having a high spatial frequency, and said selected region in the image display plane is set to an area including said part of the image. In this embodiment, the resolution can be selectively increased at the edge or contour portion of the displayed image, and thus the user can have a feeling of seeing a much more in-focused image.

In another preferable embodiment of the image display apparatus according to the invention, said selected region in the image display plane is determined in accordance with a region denoting signal transmitted in synchronism with the input image signal. In this embodiment, the resolution can be optimally improved at a region determined in accordance with the contents of the displayed image.

BRIEF DESCRIPTION OF THE DRAWINGS

FIG. 8 is a diagram representing an address of a frame memory storing the image signal;

FIG. 9 is a timing chart of reading the image data out of the frame memory;

FIG. 11 shows timing charts explaining the operation of the LCD driving circuit;

FIGS. 12A–12F are diagrams explaining the operation of the pixel shift;

FIGS. 13A–13F are diagrams representing the function of the pixel shift;

FIG. 15 is a schematic view showing the display unit shown in FIG. 14;

FIG. 16 is a diagram explaining the image data rewriting operation in a second embodiment of the image display apparatus according to the invention;

FIG. 17 is timing charts explaining the image data rewriting operation in the second embodiment;

FIG. 18 shows waveforms of signals in the second embodiment;

FIG. 19 is a diagram showing the image data rewriting operation in a third embodiment of the image display apparatus according to the invention;

FIG. 20 represents timing charts of the third embodiment;

FIG. 22 is a diagram explaining fourth embodiment of the image display apparatus according to the invention;

FIG. 23 are timing charts explaining the image data rewriting operation in a fourth embodiment;

FIG. 24 show signal waveforms of the fourth embodiment;

FIG. 25 is a diagram depicting the image data rewriting operation in a fifth embodiment of the image display apparatus according to the invention;

FIG. 26 shows timing charts of the fifth embodiment;

FIG. 28 is a diagram showing the image data rewriting operation in a sixth embodiment of the image display apparatus according to the invention;

FIG. 29 represents timing charts of the sixth embodiment;

FIG. 30 illustrates signal waveforms of the sixth embodiment;

FIG. 31 is a diagram showing the image data rewriting operation in an eighth embodiment of the image display apparatus according to the invention;

FIGS. 32A–32F are schematic diagrams showing the pixel shift in the seventh embodiment;

FIGS. 41, 42 and 43 are schematic diagrams showing the image data rewriting operation in a twelfth embodiment of the image display apparatus according to the invention;

FIGS. 44 and 45 are schematic views of the LCD in a thirteenth embodiment of the image display apparatus according to the invention;

FIGS. 46A–46F are schematic diagrams showing the image data rewriting operation in a fourteenth embodiment of the image display apparatus according to the invention;

FIGS. 49A and 49B are schematic views showing the horizontal and vertical line of sight angles detected by the line of sight detector;

FIGS. 50A and 50B show two examples of the line of sight detector;

FIG. 52 is a diagram showing the image data rewriting operation in a fourteenth embodiment of the image display apparatus according to the invention;

FIG. 53 illustrates timing charts explaining the operation of the fourteenth embodiment;

FIG. 54 represents signal waveforms in the fourteenth embodiment;

FIG. 55 is a block diagram depicting a fifteenth embodiment of the image display apparatus according to the invention;

FIGS. 58A–58F are diagrams explaining the image data rewriting in the sixteenth embodiment;

FIG. 59 is a schematic view explaining a seventeenth embodiment of the image display apparatus according to the invention;

FIGS. 62A–62C are diagrams explaining the pixel shift in the known apparatus;

EXPLANATION OF THE PREFERABLE EMBODIMENTS

Figure 1:
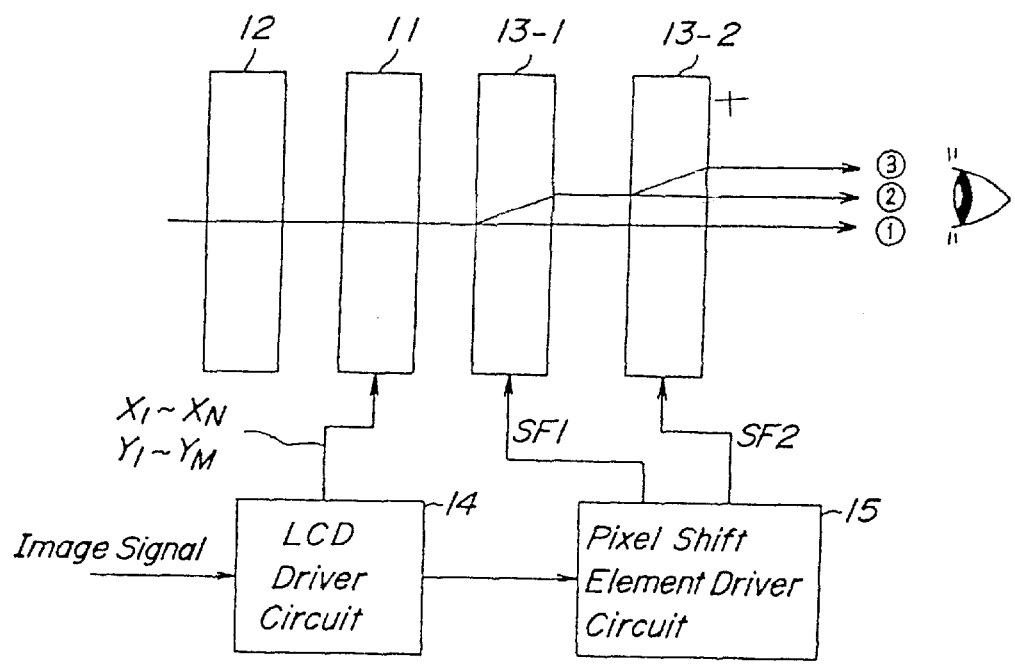
FIG. 1 is a schematic view showing a first embodiment of the image display apparatus according to the invention.

FIGS. 1–15 show a first embodiment of the image display apparatus according to the invention. As illustrated in FIG. 1, an image display plane is constituted by a liquid crystal display panel (hereinafter referred to LCD) 11, and a back light 12 is arranged on a rear side of the LCD 11. In front of the LCD 11, there are arranged first and second pixel shift elements 13-1 and 13-2. By suitably operating these pixel shift elements 13-1 and 13-2, an image display position is shifted in a horizontal direction to assume one of three positions. It should be noted that for the better understanding, in FIG. 1, these three display positions are shown by positions ①, ② and ③ which are shifted vertically.

The LCD 11 is driven by a LCD driver circuit 14 which constitutes the image display control means, and the first and second pixel shift elements 13-1 and 13-2 are driven by a pixel shift element driver circuit 15 which constitutes the image display plane shift means together with the pixel shift elements. These driver circuits 14 and 15 are operated in accordance with an input image signal such that images are displayed on the LCD 11 at positions which are suitable for attaining a desired pixel shift.

Figure 2:
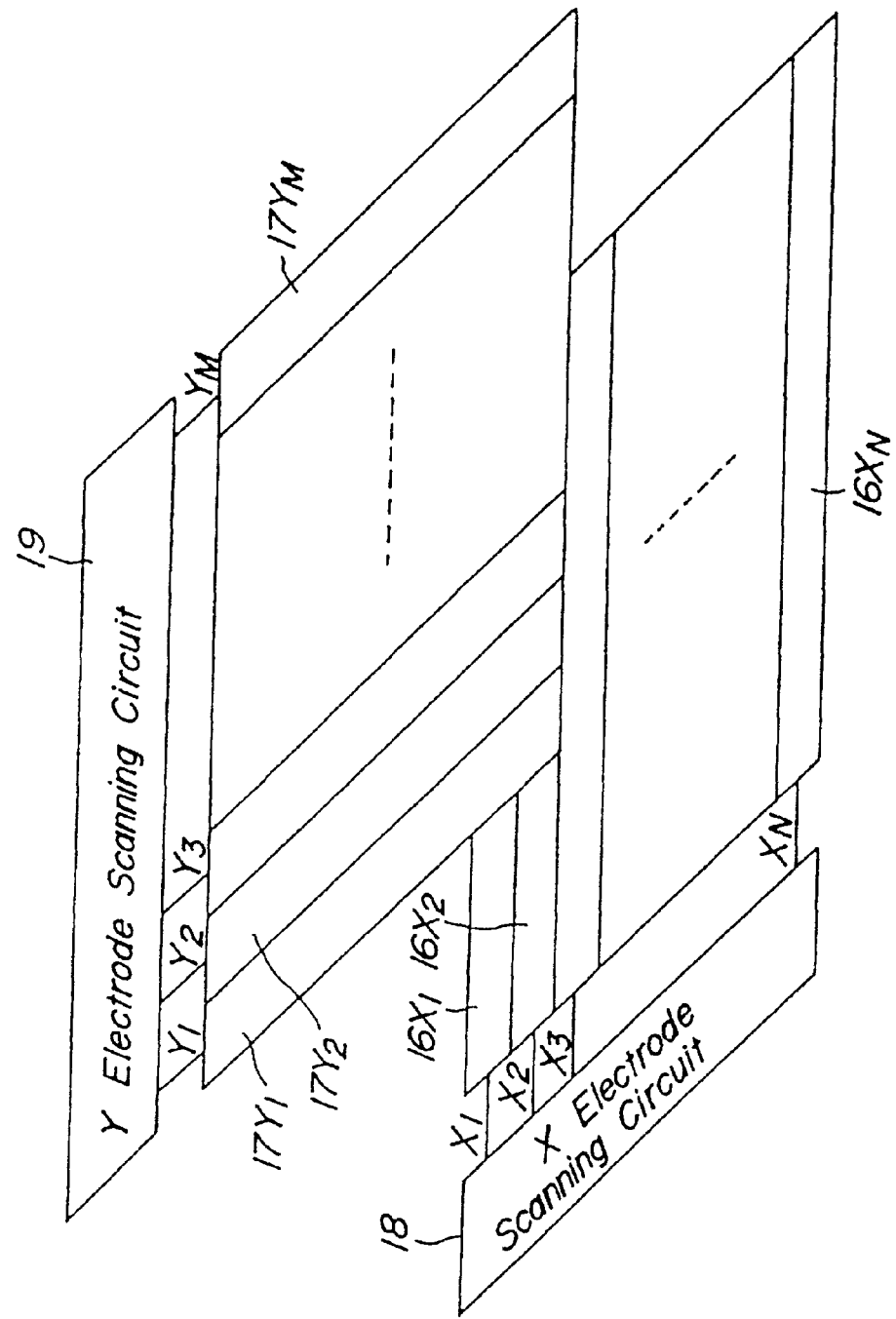
FIG. 2 is a schematic view illustrating the LCD shown in FIG. 1.

The LCD 11 may be formed by FLC or AFLC which is operated under the simple matrix driving mode. The LCD 11 of the simple matrix driving mode type comprises a liquid crystal element which is sandwiched by transparent X electrodes $16X_1$-$16X_N$ arranged in row and transparent Y electrodes $17Y_1$-$17Y_M$ arranged in column which is perpendicular to the row as shown in FIG. 2. In FIG. 2, the liquid crystal element is not depicted for the sake simplicity. To the X electrodes $16X_1$-$16X_N$ and Y electrodes $17Y_1$-$17Y_N$ are supplied from X electrode scanning circuit 18 and Y electrode scanning circuit 19, respectively scanning line data $X_1$-$X_N$ and signal line data $Y_1$-$Y_N$ shown in FIG. 3 such that the image data signals are rewritten in a line-wise manner from the first line successively.

Figure 3:
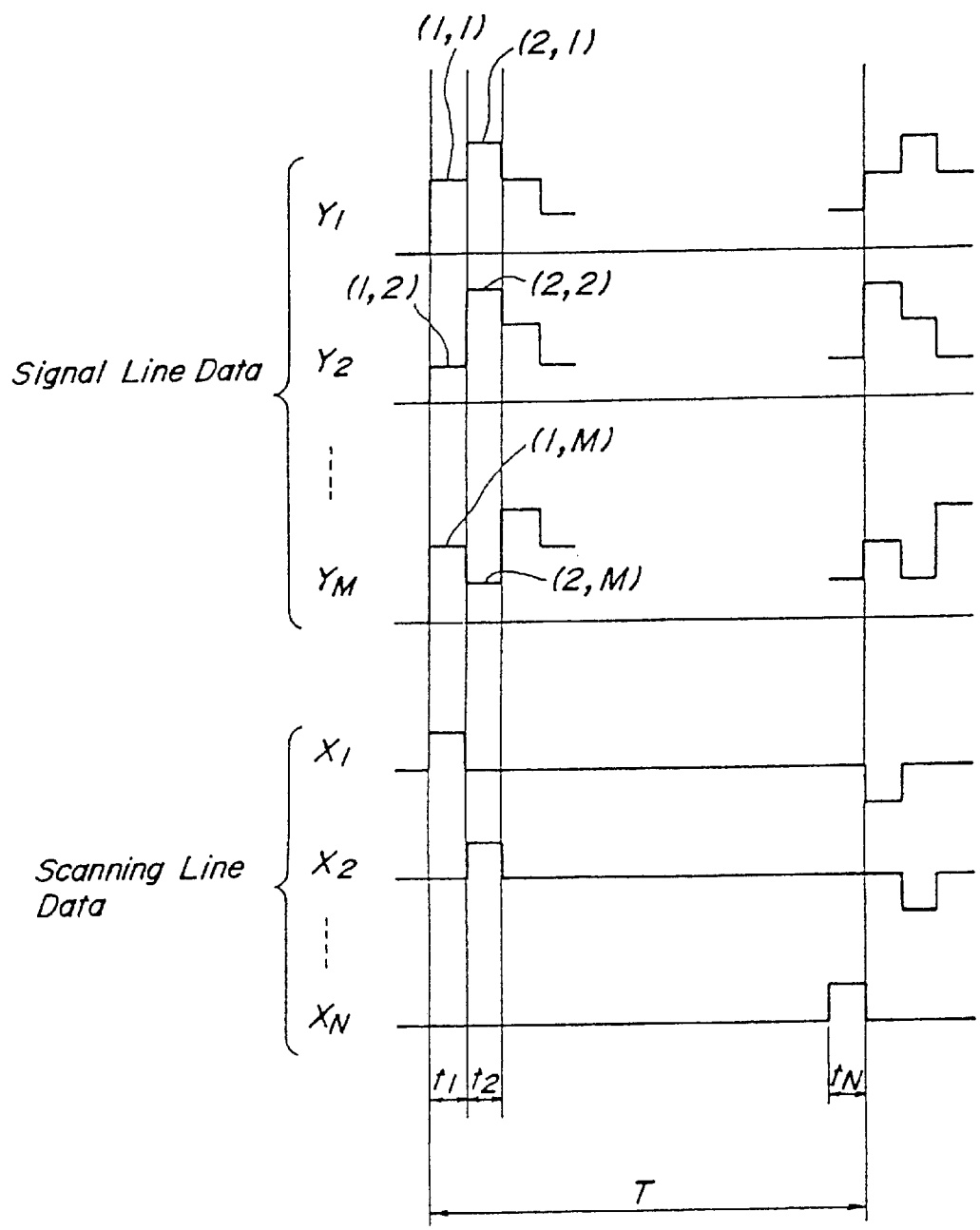
FIG. 3 depicts waveforms of signals to be supplied to the LCD shown in FIG. 2.
Figure 4:
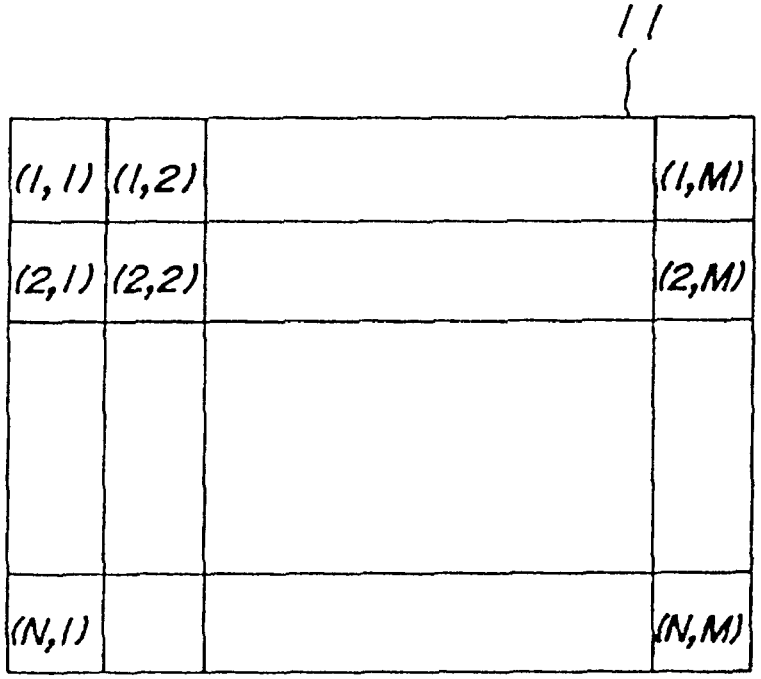
FIG. 4 is a schematic plan view representing the pixel arrangement of the LCD.

Now it is assumed that positions of respective pixels of the LCD 11 are denoted by coordinates as illustrated in FIG. 4. During a time period $t_1$ shown in FIG. 3, a voltage pulse (scanning line data $X_1$) is applied to the first X electrode $16X_1$ from the X electrode scanning circuit 18, and at the same time, pixel data signals (signal line data $Y_1$-$Y_N$) corresponding to successive pixels (1,1), (1,2) - - - (1,M) on the first line are applied to the Y electrodes $17Y_1$-$17Y_M$ from the Y electrode scanning circuit 19. During a next time period $t_2$, the signal line data $Y_1$-$Y_N$ corresponding to pixels (2,1), (2,2) - - - (2,M) on the second line is applied to the successive Y electrodes $17Y_1$-$17Y_N$, while a pulse is applied to the second X electrode $16X_2$. Similar control is performed for successive lines and an image of one frame is rewritten for a period T. As shown in FIG. 3, a polarity of the scanning line data $X_1$-$X_N$ is inverted for every frames in order to avoid a deterioration of the LCD 11.

Figure 5:
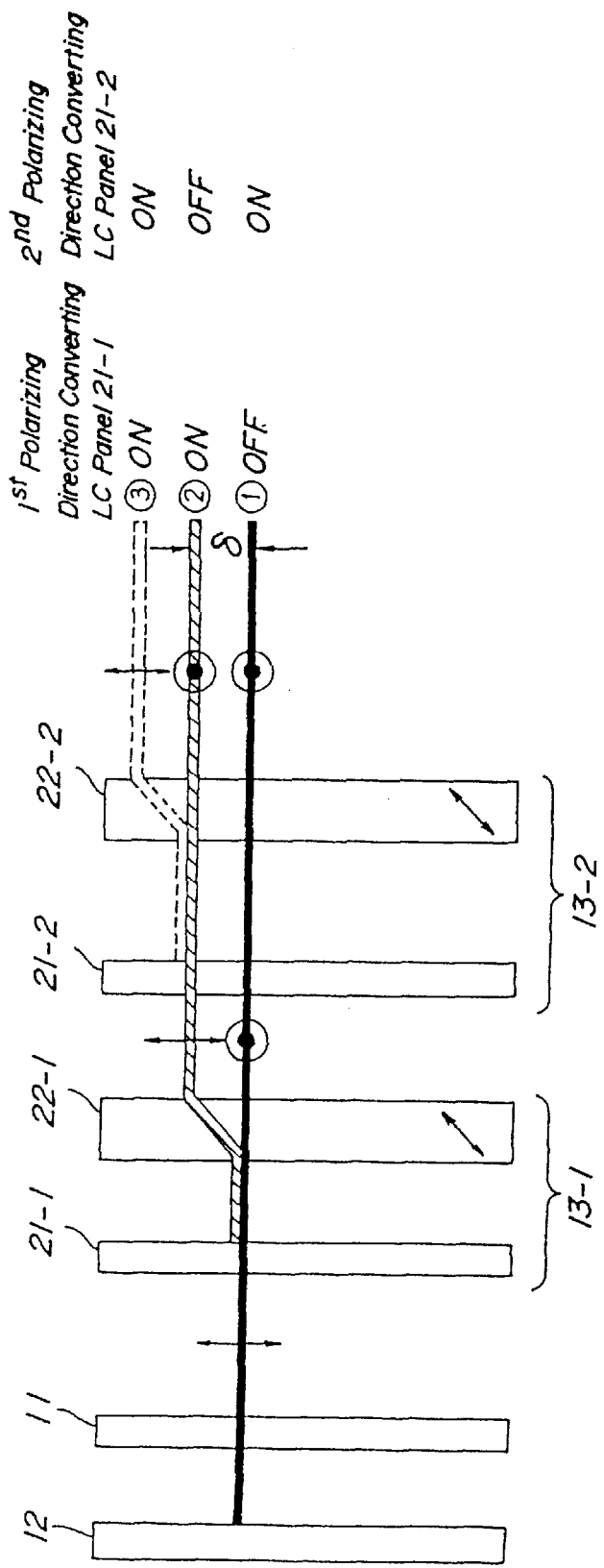
FIG. 5 is a schematic cross sectional view illustrating the image display device shown in FIG. 1.

As shown in FIG. 5 in detail, the first pixel shift element 13-1 is formed by a first polarizing direction converting LC panel 21-1 and a first birefringent plate 22-1, and the second pixel shift element 13-2 is constituted by a second polarizing direction converting LC panel 21-2 and a second birefringent plate 22-2. The first and second polarizing direction converting DC panels 21-1 and 21-2 are controlled in an on-off mode in synchronism with the display of image. When the polarizing direction converting LC panel is made on, the input light is transmitted through the panel as it is, but when the panel is made off, the polarizing direction of the incident light is rotated by 90 degrees.

The light transmitted through the first polarizing direction converting LC panel 21-1 is made incident upon the first birefringent plate 22-1 as the ordinary light or extraordinary light. When the light is the ordinary light, the light is transmitted through the birefringent plate 22-1 as it is, but when the light is the extraordinary light, the light is shifted by a shift amount δ in a given direction opposite to a direction in which image display positions of the image are selectively shifted with respect to said image display plane of the LCD 11 by an integer multiple or an inverse of an integer multiple of the pixel pitch of the LCD 11. The light emanating from first pixel shift element 13-1 is then made incident upon the second pixel shift element 13-2 and is shifted thereby in the given direction by the shift amount δ.

When the light is to be seen at the first pixel shift position ①, the voltage applied to the first polarizing direction converting LC panel 21-1 is made off and the voltage applied to the second polarizing direction converting LC panel 21-2 is made on; when the light is to be seen at the second pixel shift position ②, the voltage to the first polarizing direction converting LC panel 21-1 is made on and the voltage to the second polarizing direction converting LC panel 21-2 is made off; and when the light is to be seen at the third pixel shift position ③, the voltages to the first and second polarizing direction converting LC panels 21-1 and 21-2 are made on.

The first and second birefringent plates 22-1 and 22-2 may be made of quartz (δ-$SiO_2$), rutile ($TiO_2$), calcite ($CaCO_3$), Chile salpeter ($NaNO_3$) and $YVO_4$. Particularly, the birefringent plates may be advantageously made of rutile. Rutile has the birefringency which is larger than that of quartz by 30 times, and thus a thickness of the birefringent plate may be decreased to 1/30 of the quartz plate. For instance, the seeing position is to be shifted by 50 μm, a thickness of the birefringent plate may be 0.5 mm. Furthermore, since rutile has a higher Mohs hardness, it can be easily worked.

The first and second birefringent plates 22-1 and 22-2 are generally called Savart's plate, and its crystal axis is inclined by 45 degrees with respect to its surface. Therefore, ordinary light is transmitted through the Svart's plate as it is, but extraordinary light is shifted. A shift amount may be adjusted by a thickness of the Savart's plate. By using the Savart's plate, the non-shifted light and shifted light emanate therefrom along optical axes which are parallel with each other, and therefore the shift amount between these optical axes becomes constant in regardless of a distance from the LCD 11 to the Savart's plate and the freedom in the arrangement of the first and second birefringent plates 22-1 and 22-2 with respect to the LCD 11 becomes large.

In the present embodiment, the pixel shift amount δ in the horizontal direction by the first and second pixel shift elements 13-1 and 13-2 is set to an inverse of an integer multiple of the pixel pitch in the LCD 11, e.g. ⅓ for the monochrome image signal, and is set to an integer multiple of the pixel pitch in the LCD 11, e.g. 1 pitch for displaying R, G, B color image signal. According to the invention, by suitably controlling the order of rewriting the image data to be supplied to the LCD 11, it is possible to reduce the number of scanning lines at which the image data is to be rewritten while a high resolution can be attained. Now a manner of rewriting the image data will be explained with reference to FIG. 6.

It should be noted that in the following explanation, for the sake of simplicity, the input image signal is of a non-interlaced signal, and thus a field is identical with a frame. In the following explanation, a term "frame" is used. However, the present invention may be equally applied to the interlaced image signal. Moreover, in case displaying he NTSC color television signal on the LCD having 525 pixels in the vertical direction, the interlaced signal is generally converted into the non-interlaced signal, and thus the following explanation may be also applied to the interlaced image signal.

Figure 6:
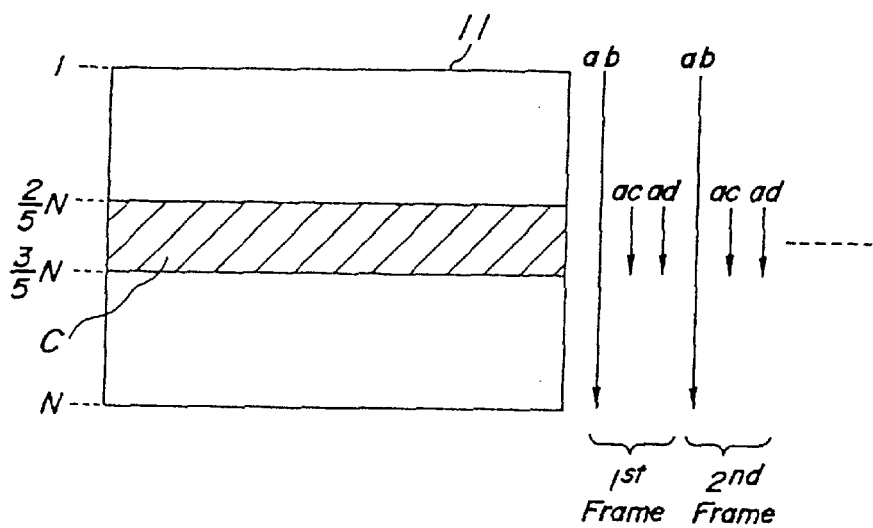
FIG. 6 is a schematic plan view explaining the image data rewriting operation of the first embodiment.

In FIG. 6, right hand arrows denote rows of the LCD 11 at which the image data is rewritten plural times during respective frame periods. In each frame, one picture frame is composed of performing the image data rewriting operation as indicated by arrows ab, ac and ad. Here, the arrow ab denotes that the image data is rewritten at all rows from the $1^{st}$ row to the $N^{th}$ row, the arrow ac represents that after effecting the rewriting operation by the arrow ab, the image data is rewritten at rows from $2N/5^{th}$ row to $3N/5^{th}$ row, and the arrow ad denotes that after performing the image data rewriting by the arrow ac, the image data is rewritten again at the rows from $2N/5^{th}$ row to $3N/5^{th}$ row. That is to say, in the present embodiment, after rewriting the image data at all the rows, the image data is rewritten selectively only at scanning lines within a central region C denoted by hatching by two times. That is to say, in the central region C, the image data rewriting operation is performed three times during one frame period. It should be noted that image data signals for the central region C are obtained by sampling the input image signal at three different sampling timings.

Figure 7:
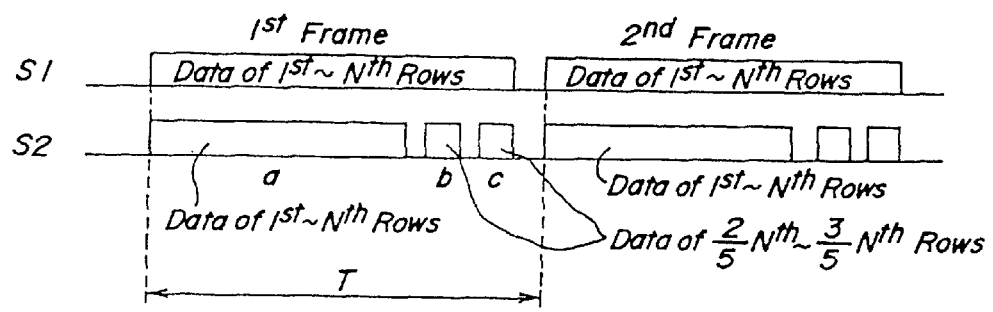
FIG. 7 is a timing chart explaining the image data rewriting operation of the first embodiment.

To this end, the input image signal S1 of the $1^{st}$ to $N^{th}$ lines of successive frames shown in FIG. 7 are sampled at the different timings, and the thus sampled image signals are stored in a frame memory 25 at successive addresses as shown in FIG. 8. Then, read-out addresses for the frame memory 25 are controlled such that the above mentioned rewriting operation can be achieved. That is to say, as depicted in FIG. 7, during a frame period T, the image data S2 for all the rows from the first row to the $N^{th}$ row is read out for a period a corresponding to the arrow ab in FIG. 6, then the image data S2 for the central region C from $2N/5^{th}$ row to $3N/5^{th}$ row is read out for a period b corresponding to the rewriting operation denoted by the arrow ac in FIG. 6, and finally the data S2 for the central region C from $2N/5^{th}$ row to $3N/5^{th}$ row is read out again for a period c corresponding to the arrow ad in FIG. 6. The thus read-out plural sets of the image data S2 are supplied to the LCD 11 as the signal line data.

These signal line data sets read-out in the periods a, b and c contain the image data signals for the same rows from $2N/5^{th}$ row to $3N/5^{th}$ row. However, these image data signal sets are different from each other as shown in FIGS. 8 and 9. That is to say, during the period a, image data signals stored in the frame memory 25 at addresses 3i (i=0, 1, 2- - -) such as 0, 3 - - - are read-out. For the central region C, image data signals stored at addresses AD+3i such as AD, AD+3 - - - are read out.

During the next period b, for the central region C, image data signals at addresses AD+3i+1 such as AD+1, AD+4 - - - are read-out, and during the last period c, image data signals stored at addresses AD+3i+2 such as AD+2, AD+5 - - - are read-out for central region C. In FIG. 9, periods $t_3$, $t_4$, $t_5$ represent a data reading out period for the central region C from $2N/5^{th}$ to $3N/5^{th}$ rows. The above explained image data rewriting operation is repeated for successive frames.

Figure 10:
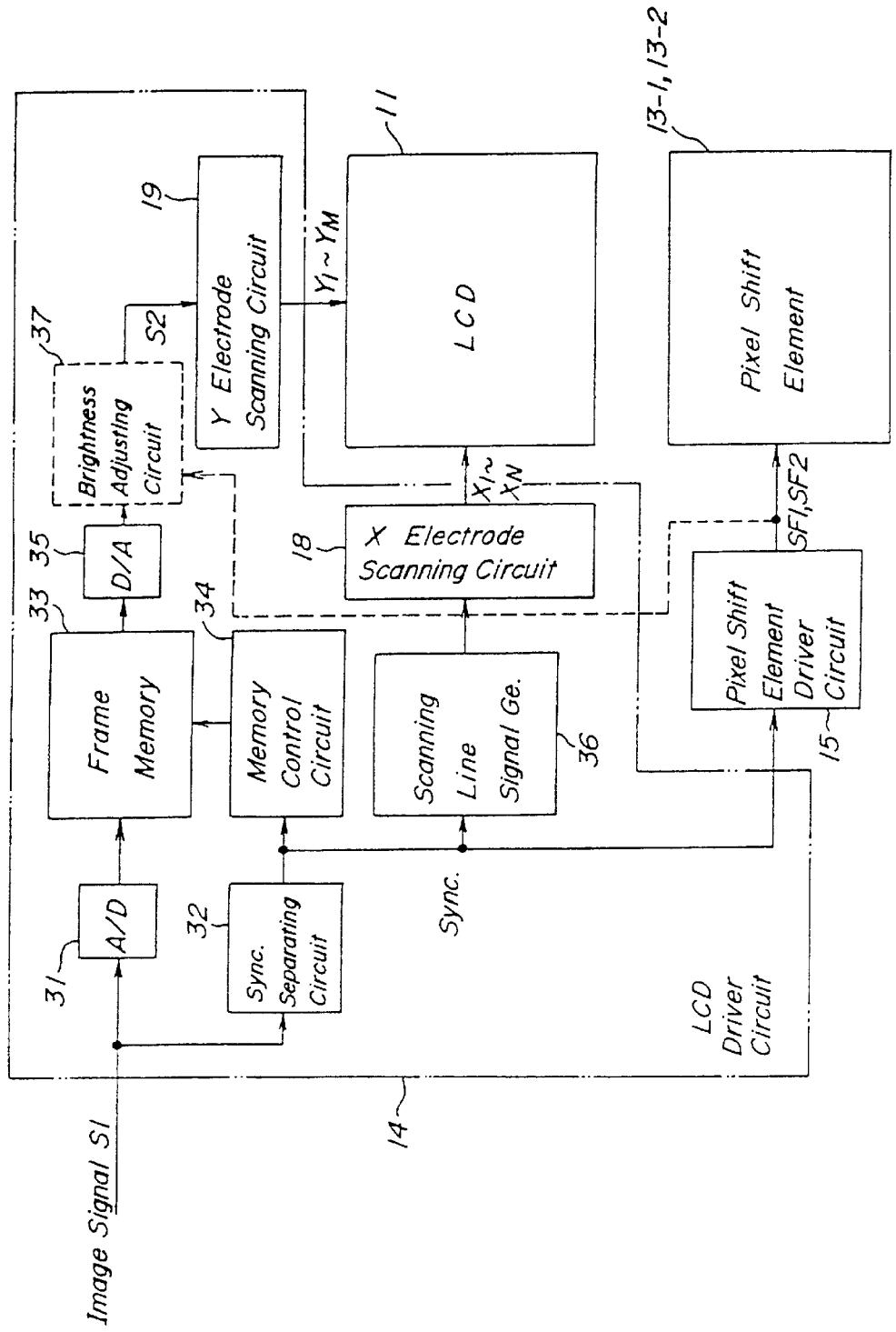
FIG. 10 is a block diagram showing the detailed construction of the LCD driving circuit.

FIG. 10 is a block diagram showing the detailed construction of the LCD driver circuit 14 illustrated in FIG. 1. In the present embodiment, the input image signal S1 is in the form of an analog signal, and is supplied to A/D converter 31 and synchronizing signal separating circuit 32. In the A/D converter 31, the input image signal S1 is sampled at a sampling frequency which is higher than an ordinary sampling frequency by three times, and is converted into digital image data signals. Said normal sampling frequency will be used for displaying an image on the LCD 11 without the pixel shift. The thus obtained digital image data signals are stored in a frame memory 33.

The frame memory 33 may be composed of two memories each having a capacity to store the image data signals of one frame. These two memories are driven alternately into a write mode and a read mode by means of a memory control circuit 34 which will be explained later. Therefore, while the image data signals generated from the A/D converter 31 are written into one of the two memories, the image data signals previously stored in the other memory are read-out. The image date signals read-out of one the two memories of the frame memory 33 are converted by a D/A converter 35 to derive an analog image signal. The converted analog image signal is then supplied to the Y electrode scanning circuit 19 and is converted thereby into the signal line data $Y_1$-$Y_N$ which are applied to the Y electrodes $17Y_1$-$17Y_N$.

If the input image signal is of the R, G, B color image signals, each of the three color image signals is stored in the frame memory composed of two frame memories, and the read out image data signals are applied to corresponding Y electrodes of the LCD 11.

In the synchronizing signal separating circuit 32, a synchronizing signal contained in the input image signal S1 is separated, and the thus extracted synchronizing signal is supplied to the memory control circuit 34, scanning line signal generating circuit 36 and pixel shift element driver circuit 15. The memory control circuit 34 controls the frame memory 33 such that the two memories of the frame memory are alternately driven into the write-in mode and read-out mode in a push-pull manner. The memory control circuit 34 also controls the addresses for these memories. In this manner, the image data is written into one of the two memories and at the same time the data is read-out of the other memory as explained above with reference to FIGS. 8 and 9.

In the scanning line signal generating circuit 36, a scanning line signal is generated on the basis of the synchronizing signal, and the thus generated scanning line signal is supplied to the X electrode scanning circuit 18 and the scanning line data signals $X_1$-$X_N$ are applied successively to the X electrodes $16X_1$-$16X_N$ of the LCD 11. The pixel shift driver circuit 15 supplies pixel shift driving signals SF1 and SF2 to the first and second polarizing direction converting LC panels 21-1 and 21-2 of the first and second pixel shift elements 13-1 and 13-2, respectively in synchronism with the synchronizing signal to perform the selective pixel shift.

Now the pixel shift of the present embodiment will be explained with reference to FIG. 11 showing mutual relationship of the signal line date signals $Y_1$-$Y_N$, scanning line data signals $X_1$-$X_N$ and pixel shift positions ①, ②, ③. In FIG. 11, the signal line data signals $Y_1$-$Y_N$ in respective rows are represented by a single mark, but in practice, a single signal mark contains M signal line data signals $Y_1$-$Y_M$ corresponding to the M Y-electrode positions (1,1)-(1,M) for the first row as shown in FIG. 4.

As can be understood from FIG. 11, during the period a, the image data signals for the $1^{st}$ to $N^{th}$ rows are successively rewritten, and thus the scanning line data signals $X_1$-$X_N$ are successively generated, but during the periods b and c, the data signals for only the central region C from $2N/5^{th}$ row to $3N/5^{th}$ row are rewritten, so that only the scanning line data signals $X_{2N/5}$-$X_{3N/5}$ are generated. In the present embodiment, the polarizing direction converting LC panel is formed such that the polarizing direction could not be controlled for respective rows, but is formed such that the polarizing direction is controlled simultaneously over the whole rows. Therefore, the pixel shift is carried out in synchronism with a timing at which an image data signal is to be rewritten at a middle row in the center row, i.e. $N/2^{th}$ row. During the period a, the image data signals corresponding to the pixel shift position ①are displayed, for the period b, the image data signals corresponding to the pixel shift position ②are displayed, and during the period c, the image data signals corresponding to the pixel shift position ③are displayed. It should be noted that the periods t3, $t_4$ and $t_5$ in FIG. 11 correspond to the periods $t_3$, $t_4$ and $t_5$ in FIG. 9 and the periods a, b and c in FIG. 11 correspond to the periods a, b and c in FIG. 7.

Now it is assumed that the number of the scanning lines N is set to 525 (in case of NTSC), the one frame period T is set to 1/60 seconds, and the LCD 11 is formed by AFLC having a response time of 20 $\mu$s (per one line). Then, a time period x during which a single frame is rewritten can be calculated as follows:

$$X=20 \mu s \times (525+525/5+525/5)=14.7 \text{ ms}$$

Therefore, it is possible to rewrite the image data signals within the frame period T=1/60 seconds (about 16.67 ms).

As explained above, in the present embodiment, during one frame period T, for the central region C from $2N/5^{th}$ row to $3N/5^{th}$ row, the signal line data is rewritten by three times by the data signals obtained at different sampling timings, and the pixel shift is performed at the center row $N/2^{th}$ in the direction which is opposite to the direction in which the image data signals are shifted on the LCD 11 due to the different sampling timings. By this measure, it is possible to increase effectively the resolution at the horizontally elongated center region C.

This will be further explained with reference to FIGS. 12A–12F. FIG. 12A depicts the pixels of the LCD 11, and FIG. 12B represents digital image data signal obtained by sampling the input analog image signal. In the pixel shift position ①, the data signals are displayed as shown in FIG. 12C, and in the pixel shift positions ②and ③, since only the central region rows from $2N/5^{th}$ row to $3N/5^{th}$ row are rewritten, the image data signals are displayed as depicted in FIGS. 12D and 12E, respectively. It should be noted that in the central region C of the LCD 11, the image data signals are displayed at positions which are shifted leftward by ⅓ or ⅔ pixel pitch with respect to inherent positions at which these image data signals should be displayed. A user can perceive a composite image shown in FIG. 12F by the after image effect of the user. That is to say, the user can see the image composed of the three images illustrated in FIGS. 12C, 12D and 12E. In this manner, the resolution in the central region of the image from $2N/5^{th}$ row to $3N/5^{th}$ row can be selectively increased.

As explained above, the pixel shift is performed at a time when the center row $N/2^{th}$ is to be rewritten, and thus the resolution becomes highest at the center row and becomes gradually lower in accordance with an increase in a distance from the center row. This will be explained with reference to FIGS. 13A–13F. For the sake of simplicity, in FIGS. 13A–13F, the pixel shift is effected only once.

FIG. 13A represents the sampled digital data signals. At first, odd numbered column data signals are displayed as shown in FIG. 13B. Next even numbered column data signals are displayed by rewriting the data signals from the first row as depicted in FIG. 13C. When the image data signal at the center row CR is to be rewritten, the pixel shift is performed as illustrated in FIG. 13D. After that, the image data signals are rewritten for succeeding rows as shown in FIG. 13E. Then, the user can perceive an image shown in FIG. 13F which is a composite image of the images illustrated in FIGS. 13C–13B. As can be understood from the composite image shown in FIG. 13F, the resolution becomes maximum at the center row CR and is gradually decreased apart from the center row.

The high resolution by the pixel shift at the center row has such a characteristic that the maximum resolution can be obtained at the center row, and thus the present embodiment in which only the central region is rewritten is suitable for such a pixel shift.

In the above explained embodiment, a display time of the image at respective pixel shift positions is proportional to the number of rows whose image data is to be rewritten, and thus as can be seen from FIG. 11, a display time at the pixel shift position ②becomes shortest. Further, a brightness of image at a pixel shift position is proportional to a display time. Therefore, the brightness of image differs for respective pixel shift positions. This results in that the resolution of the composed image could not be effectively improved due to a decrease in brightness.

In a modified embodiment, as shown by a broken line in FIG. 10, a brightness adjusting circuit 37 is provided between the D/A converter 35 and the Y electrode scanning circuit 19 and the brightness of the image data signals is controlled in synchronism with the change of the pixel positions by the pixel shift driver circuit 15 such that the images displayed at respective pixel shift positions have uniform brightness.

Now it is assumed that at the pixel shift position ①, a display time is T1 and an increasing or decreasing ratio of brightness is A1, at the pixel shift position ②a display time is T2 and an increasing or decreasing ratio of brightness is A2, and at the pixel shift position ③, a display time is T3 and an increasing or decreasing ratio of brightness is A3. Then, in order to obtain the uniform brightness for the displayed images at the respective pixel shift positions, the following relationship has to be satisfied:

$$A1 \times T1 = A2 \times T2 = A3 \times T3 \tag{1}$$

Furthermore, in order to keep the brightness of the whole image uniform, the following condition should be satisfied:

$$A1 \times T1 + A2 \times T2 + A3 \times T3 = T1 + T2 + T3 \tag{2}$$

From the above two equations (1) and (2), values A1, A2 and A3 are calculated and the brightness of the image data signals is adjusted, i.e. is increased or decreased. The values of T1, T2 and T3 can be derived from the number of rows at which the image data signals are to be rewritten. For instance, in the above explained numerical example, the brightness of the image data signals for the longer periods a and c shown in FIGS. 9 and 11 is decreased by 7/9, and the brightness of the image data signals for the shorter period b is increased by 7/3. Then, the images displayed at the respective pixel shift positions become uniform and the brightness of the whole image does not fluctuate, and thus the resolution can be effectively increased for the central region C.

In the above explained embodiment, the pixel shift is carried out twice in each frame periods in the horizontal direction. However, according to the invention, the number of times and direction of the pixel shift may be set at will. Moreover, in the above explanation, the resolution is increased selectively for the central region including N/5 rows, but according to the invention, the resolution may be improved for a wider region by using a display element having a higher response speed. It is also possible to reduce the region in which the resolution is increased smaller than N/5. In such a case, a display element having a lower response speed may be utilized in the LCD 11. Furthermore, the number of the scanning lines is not limited to 525, but may be set to any arbitrary number. In this manner, according to the invention, a resolution enhancing region within an image frame can be selected at will in accordance with a response speed and the number of scanning lines of the display element to be used. This will be equally applied to following embodiments of the image display apparatus according to the invention.

Figure 14:
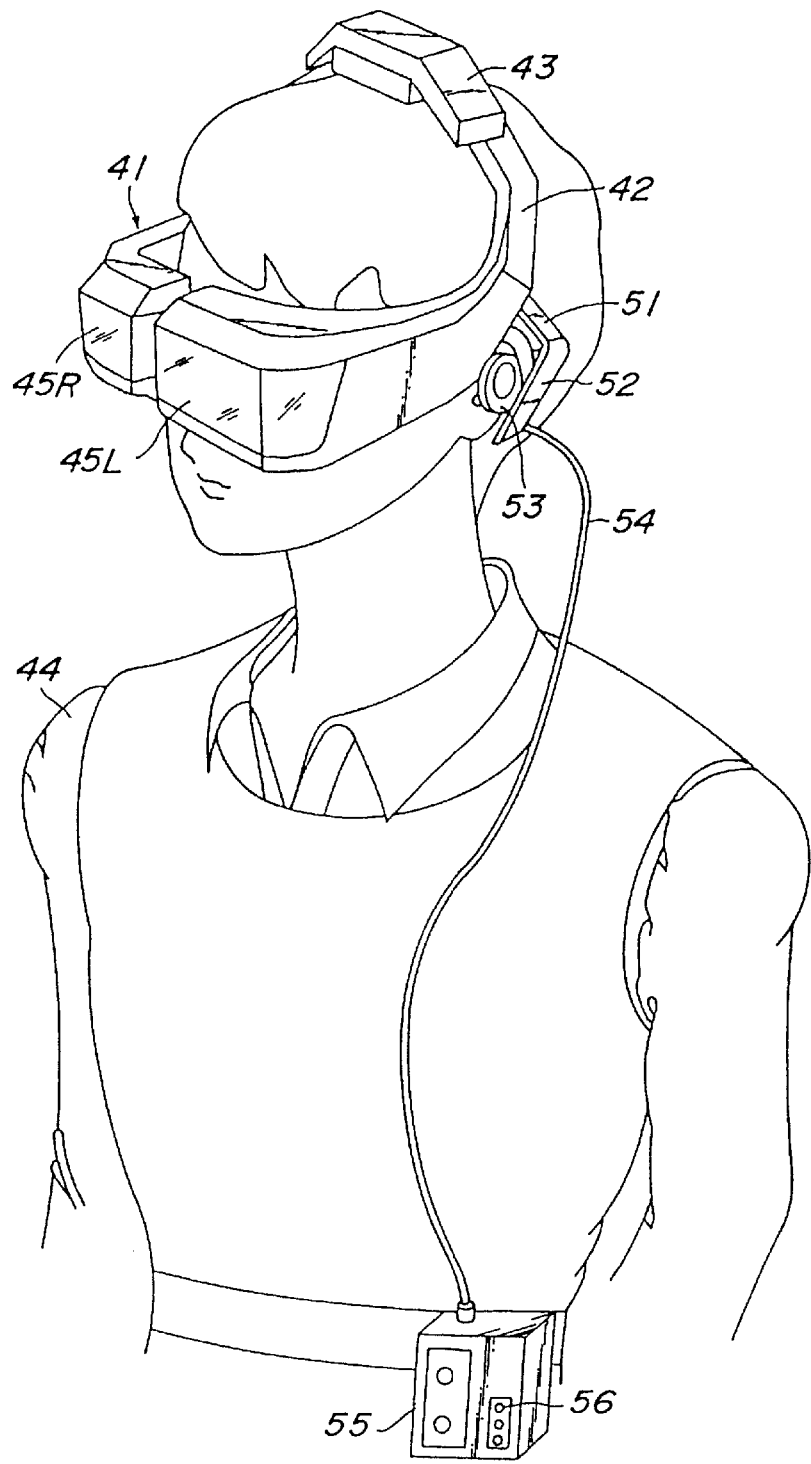
FIG. 14 is a perspective view depicting an HMD comprising the image display apparatus of the first embodiment.

FIG. 14 is a perspective view showing a head mounted type display (HMD) including the above mentioned image display apparatus according to the invention. The HMD comprises an image display main body 41, a side head frame 42 and a top head frame 43. The HMD can be placed on a top face of a user 44 by putting the side head frame 42 and top head frame 43 on the user's head.

The image display main body 41 includes right and left display units 45R and 45L corresponding to right and left eyes of the user 44. Each of the display units 45R and 45L comprises an eye piece optical system shown in FIG. 15. The eye piece optical system includes a back-light 46, LCD 47, first and second pixel shift elements 48-1 and 48-2, half mirror 49 and concave mirror 50. As explained above in the first embodiment, the LCD 47 is illuminated by the back-light 46 and the image displayed on the LCD 47 is shifted into a given direction by a given amount by means of the first and second pixel shift elements 48-1 and 48-2 to form three images. These images are transmitted through the half mirror 49, reflected by the concave mirror 50 and reflected by the half mirror 49 toward the eye of the user 44.

In FIG. 14, to the side head frame 42 is secured a rear frame 52 by means of a leaf spring 51, and a speaker is secured to the rear frame 52. The image display main body 41 is connected by means of a cable 54 to a reproducing unit 55 including adjusting means 56 such an audio volume. An image signal generated from the reproducing unit 55 is supplied to the right and left image display units 45R and 45L and an audio signal is supplied to the right and left speakers 53 (one of the speakers is not seen in FIG. 14).

It should be noted that the image display main body 41 may be connected to a usual video deck or TV tuner by means of the cable 54. Further, the image display main body 41 may be connected to a computer via the cable 54 to display computer graphic images or computer message images. Furthermore, instead of using the cable 54, the external signal may be supplied to the image display main body 41 in the wireless mode by means of an antenna provided on the image display main body. It should be also noted that by supplying image signals having a parallax to the right and left display units 45R and 45L, it is possible to display a stereoscopic image.

Now a second embodiment of the image display apparatus according to the invention will be explained with reference to FIGS. 16–18. In the present embodiment, in an odd numbered frame, the image data signals are rewritten for the LCD 11 in accordance with arrows ab, ac and ad, and in an even numbered frame, the image data signals are rewritten in accordance with arrows ae, af and ag as schematically illustrated in FIG. 16. In an odd numbered frame, the image data signals for all rows are rewritten, and then the image data signals obtained at different sampling timings and corresponding to the central region C from $2N/5^{th}$ row to $3N/5^{th}$ row are selectively rewritten twice. In an even numbered frame, only the image data signals for the central region C are rewritten three times.

To this end, in an odd numbered frame, the input image signals S1 for all the $1^{st}$ to $N^{th}$ rows shown in FIG. 17 are sampled at given timings, and in an even frame, a part of the input image signal corresponding to the central region C from $2N/5^{th}$ to $3N/5^{th}$ rows is sampled at suitable different timings. The thus sampled image data signals are stored in the frame memory. Upon reading the image data signals out of the frame memory, read-out addresses are controlled to read the data signals S3 corresponding to the rewriting operation shown by the arrows in FIG. 16.

During a rewriting time period illustrated by the arrow ab in FIG. 16, the image data signals S3 corresponding to the whole rows from $1^{st}$ to $N^{th}$ rows of an odd numbered frame are read out and displayed within a period a, during the rewriting time period shown by the arrow ac in FIG. 16, the image data signals S3 corresponding to the central region C from $2N/5^{th}$ to $3N/5^{th}$ rows of the odd numbered frame are read out and displayed within a period b, and during the rewriting time period denoted by the arrow ad in FIG. 16, the image data signals S3 corresponding to the central region C from $2N/5^{th}$ to $3N/5^{th}$ rows of the odd numbered frame are read out and displayed within a period c. During the data rewriting time periods represented by the arrows ae and af in FIG. 16, the image data signals S3 corresponding to the central region C from $2N/5^{th}$ to $3N/5^{th}$ rows of an even numbered frame are read out and displayed within periods d, e and f.

FIG. 18 shows the relationship between the signal line data $Y_1$-$Y_N$, scanning line data $X_1$-$X_N$ and pixel shift positions for explaining the operation of the second embodiment. Also in the present embodiment, the pixel shift is performed at a timing at which the signal line data at the center row, i.e. $(N/2)^{th}$ row is rewritten. It should be noted that the periods a–f in FIG. 18 correspond to the periods a–f in FIG. 17.

Now it is assumed that the number of the scanning lines is set to 525 (NTSC) and a single frame period T is set to 1/60 seconds. Then, the number of scanning lines whose signal line data is rewritten during two frame period of 1/30 seconds becomes equal to 525+(525/5)×5=1050. Therefore, a rewriting time for one scanning line is 1/(30×1050)≈31.75 µs.

Therefore, in the present embodiment, it is possible to increase the resolution in the central region C even by using relatively cheap LCD such as AFLC and FLC having a lower response speed. Moreover, the frame memory may be composed of two memories each having a capacity of storing the image data signals of N/5 rows. In this case, the image data signals for the an odd numbered frame are directly supplied to the LCD 11 and at the same time, the image data signals corresponding to the central region C are stored in the memory. In this manner, the memory size can be decreased and a cost for the frame memory can be reduced.

In the second embodiment, as can be seen from FIGS. 17 and 18, the display time during the periods b, c, d and e becomes shorter than that during the periods a and f. In order to make the brightness of the displayed images at the respective pixel shift positions uniform, the brightness of the image signals are adjusted in synchronism with the switching of the pixel shift timings like as the first embodiment. That is to say, during the periods a and f, the brightness of the image data signals is reduced by 5/9 and during the periods b, c, d and e, the brightness of the image data signals is increased by 15/9.

Figure 21:
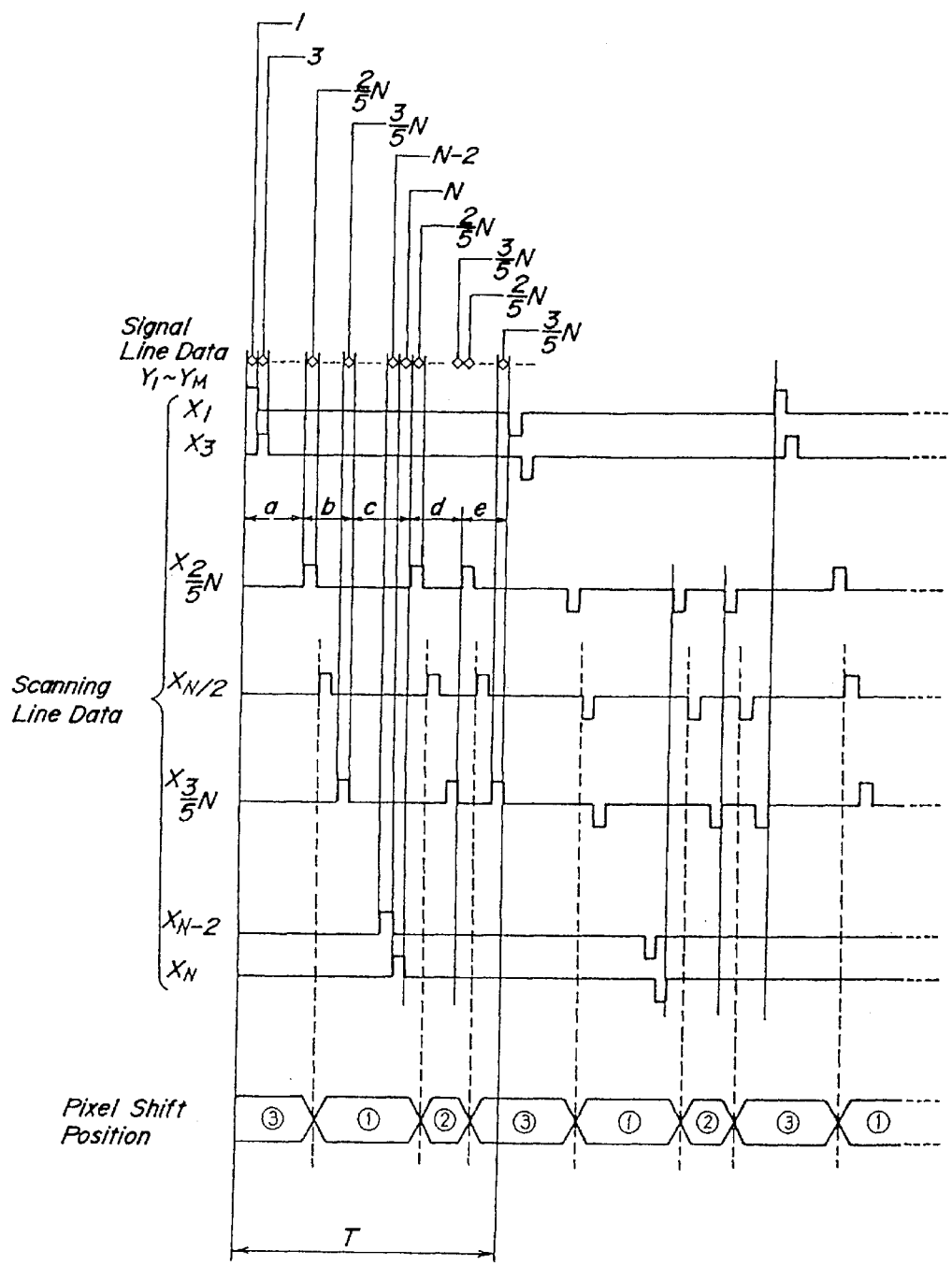
FIG. 21 illustrates signal waveforms in the third embodiment.

FIGS. 19–21 show a third embodiment of the image display apparatus according to the invention. In this embodiment, the image data signals for the LCD 11 are rewritten in a manner shown by arrows ab, ac and ad illustrated in FIG. 19. That is to say, during the data rewriting period denoted by the arrow ab, from $1^{st}$ to $(2N/5-1)^{th}$ rows, only odd numbered rows are rewritten; from $2N/5^{th}$ to $3N/5^{th}$ rows, all the rows are rewritten; and from $(3N/5+1)^{th}$ to $N^{th}$ rows, only odd numbered rows are rewritten. During the image date rewriting periods represented by the arrows ac and ad, from $2N/5^{th}$ to $3N/5^{th}$ rows, all the rows are rewritten. It should be noted that the image data signals to be rewritten in the periods ab, ac and ad are obtained by different sampling times like as the previous embodiments.

To this end, the input image signal S1 for $1^{st}$ to $N^{th}$ rows is sampled at given timings to obtain the digital image data signals, which are then stored in the frame memory. By suitably controlling read-out addresses, the signal line data S4 is read-out and displayed as illustrated in FIG. 20. During a rewriting time period illustrated by the arrow ab in FIG. 19, the image data signals S4 corresponding to odd numbered rows among $1^{st}$ to $(2N/5-1)^{th}$ rows are read-out and displayed within a period a, the image data signals S4 corresponding to $2N/5^{th}$ to $3N/5^{th}$ rows are read-out and displayed within a period b, and the image data signals S4 corresponding to $(3N/5+1)^{th}$ to $N^{th}$ rows are read-out and displayed within a period c. During the data rewriting time periods represented by the arrows ac and ad in FIG. 19, the image data signals S4 corresponding to the central region C from $2N/5^{th}$ to $3N/5^{th}$ rows are read-out and displayed within periods d and e.

FIG. 21 represents the relationship between the signal line data $Y_1$-$Y_N$, scanning line data $X_1$-$X_N$ and pixel shift positions ①, ②, and ③ for explaining the operation of the third embodiment. Also in the present embodiment, the pixel shift is performed at a timing at which the signal line data at the center row, i.e. $N/2^{th}$ row is to be rewritten. It should be noted that the periods a–e in FIG. 21 correspond to the periods a–f in FIG. 20.

Now it is assumed that the number of the scanning lines is set to 525. Then, the number of scanning lines for one frame of 1/60 seconds becomes a sum of 525×⅖×½=210 for a period (a+c) and 525×⅕×3=315 for a period of (b+d+e). Then, the number of scanning lines whose signal line data is rewritten during two frame period of 1/30 seconds becomes equal to 525+(525/5)×5=1050. Therefore, a total number of scanning lines to be rewritten within the frame period T is 525, and thus a rewriting time for one scanning line is $1/(60×525)≈31.75$ μs.

In this manner, in the present embodiment, since a portion except for the central region C of N/5 rows on the LCD 11 is displayed with a lower vertical resolution, it is possible to increase the resolution in the central region C even by using relatively cheap LCD having a low response speed such as AFLC and FLC. Moreover, in each frames, upper and lower portions of the LCD 11 are also rewritten, it is suitable to display an object moving at a higher speed than in the second embodiment.

In the third embodiment, as can be seen from FIGS. 20 and 21, the display time during the period d becomes shorter than that during the remaining periods, and the display density in the periods a and c becomes lower than that in the remaining periods. In order to make the brightness of the displayed images at the respective pixel shift positions uniform, the brightness of the image signals are adjusted in synchronism with the switching of the pixel shift timings like as the first and second embodiments. In the present embodiment, by considering the fact that during the periods a and c, the display density is reduced half and the brightness of the displayed image is reduced by two, during the periods b and e, the brightness of the image data signals is reduced by three times (⅓) and during the period d, the brightness of the image data signals is decreased to ⅔.

In the above mentioned third embodiment, during the periods a and c, only odd numbered rows are rewritten, but according to the invention, the image data rewriting may be performed for the even numbered rows. Further, every two rows may be rewritten instead of every other rows.

Now a fourth embodiment of the image display apparatus according to the invention will be explained with reference to FIGS. 22–24. In the present embodiment, as shown in FIG. 22, for instance, in an odd numbered frame, the image data rewriting is carried out in accordance with arrows ab, ac and ad and in an even numbered frame, the image data is rewritten in accordance with arrows ae, af and ag.

That is to say, during an odd numbered frame, like as the third embodiment, for the data rewriting period denoted by the arrow ab, from $1^{st}$ to $(2N/5-1)^{th}$ rows, only odd numbered rows are rewritten; from $2N/5^{th}$ to $3N/5^{th}$ rows, all the rows are rewritten; and from $(3N/5+1)^{th}$ to $N^{th}$ rows, only odd numbered rows are rewritten. During the image date rewriting periods represented by the arrows ac and ad, from $2N/5^{th}$ to $3N/5^{th}$ rows, all the rows are rewritten. Also in the present embodiment, the image data signals to be rewritten in the periods ab, ac and ad are obtained by different samplings like as the previous embodiments.

During an even numbered frame, for the data rewriting period denoted by the arrow ae, only even numbered rows are rewritten from $1^{st}$ to $(2N/5-1)^{th}$ rows; all rows from $2N/5^{th}$ to $3N/5^{th}$ are rewritten; and only even numbered rows among $(3N/5+1)^{th}$ to $N^{th}$ rows are rewritten. During the periods denoted by the arrows af and ag, like as the periods shown by the arrows ac and ad in the odd numbered frame, all the rows from $2N/5^{th}$ to $3N/5^{th}$ are rewritten. Also in the even numbered frame, the image data to be rewritten in the periods ae, af and ag is sampled at different timings.

To this end, the input image signal S1 for $1^{st}$ to $N^{th}$ rows is sampled at given timings to obtain the digital image data signals and these digital image data signals are then stored in the frame memory. By suitably controlling read-out addresses, the signal line data S5 is read-out and displayed as illustrated in FIG. 23. During the odd numbered frame, for the rewriting time period illustrated by the arrow ab in FIG. 22, the image data signals S5 corresponding to odd numbered rows among $1^{st}$ to $(2N/5-1)^{th}$ rows are read out and displayed within a period a, the image data signals S5 corresponding to all $2N/5^{th}$ to $3N/5^{th}$ rows are read-out and displayed within a period b, and the image data signals S5 corresponding to odd numbered rows among $(3N/5+1)^{th}$ to $N^{th}$ rows are read-out and displayed within a period c. During the data rewriting time periods represented by the arrows ac and ad in FIG. 22, the image data signals S5 corresponding to the central region C from $2N/5^{th}$ to $3N/5^{th}$ rows are read-out and displayed within periods d and e.

For the even numbered frame, the image data signals S5 corresponding to even numbered rows among $1^{st}$ to $(2N/5-1)^{th}$ rows are read-out and displayed within a period a, the image data signals S5 corresponding to all $2N/5^{th}$ to $3N/5^{th}$ rows are read-out and displayed within a period b, and the image data signals S5 corresponding to even numbered rows among $(3N/5+1)^{th}$ to $N^{th}$ rows are read-out and displayed within a period c. Furthermore, during the data rewriting time periods represented by the arrows af and ag in FIG. 22, the image data signals S5 corresponding to the central region C from $2N/5^{th}$ to $3N/5^{th}$ rows are read-out and displayed within periods d and e.

FIG. 24 represents the relationship between the signal line data $Y_1$-$Y_M$, scanning line data $X_1$-$X_N$ and pixel shift positions ①, ② and ③ for explaining the operation of the fourth embodiment. Also in the present embodiment, the pixel shift is effected at a timing at which the image data signal for the center $N/2^{th}$ row is to be rewritten. It should be noted that the periods a–e in FIG. 24 correspond to the periods a–f in FIG. 23.

Also in the fourth embodiment, the number of the scanning lines is assumed to be set to 525. Then, the number of scanning lines to be subjected to the data rewriting and rewriting time for one scanning line are identical with those of the third embodiment. Therefore, even by using relatively cheap AFLC or FLC having a low response speed, the resolution in the center region C can be improved. Moreover, in successive two frames, from $1^{st}$ to $(2N/5-1)^{th}$ rows and from $(3N/5+1)^{th}$ to $N^{th}$ rows are rewritten, and thus the resolution in these areas can be increased as compared with the third embodiment.

Also in the fourth embodiment, as can be understood from FIGS. 23 and 24, the display time during the period d becomes shorter than that during the remaining periods, and the display density in the periods a and c becomes lower than that in the remaining periods. In order to make the brightness of the displayed images at the respective pixel shift positions uniform, the brightness of the image signals are preferably adjusted in synchronism with the switching of the pixel shift timings like as the third embodiment. That is to say, during the periods b and e, the brightness of the image data signals is reduced by three times (⅓) and during the period d, the brightness of the image data signals is decreased to ⅔.

Figure 27:
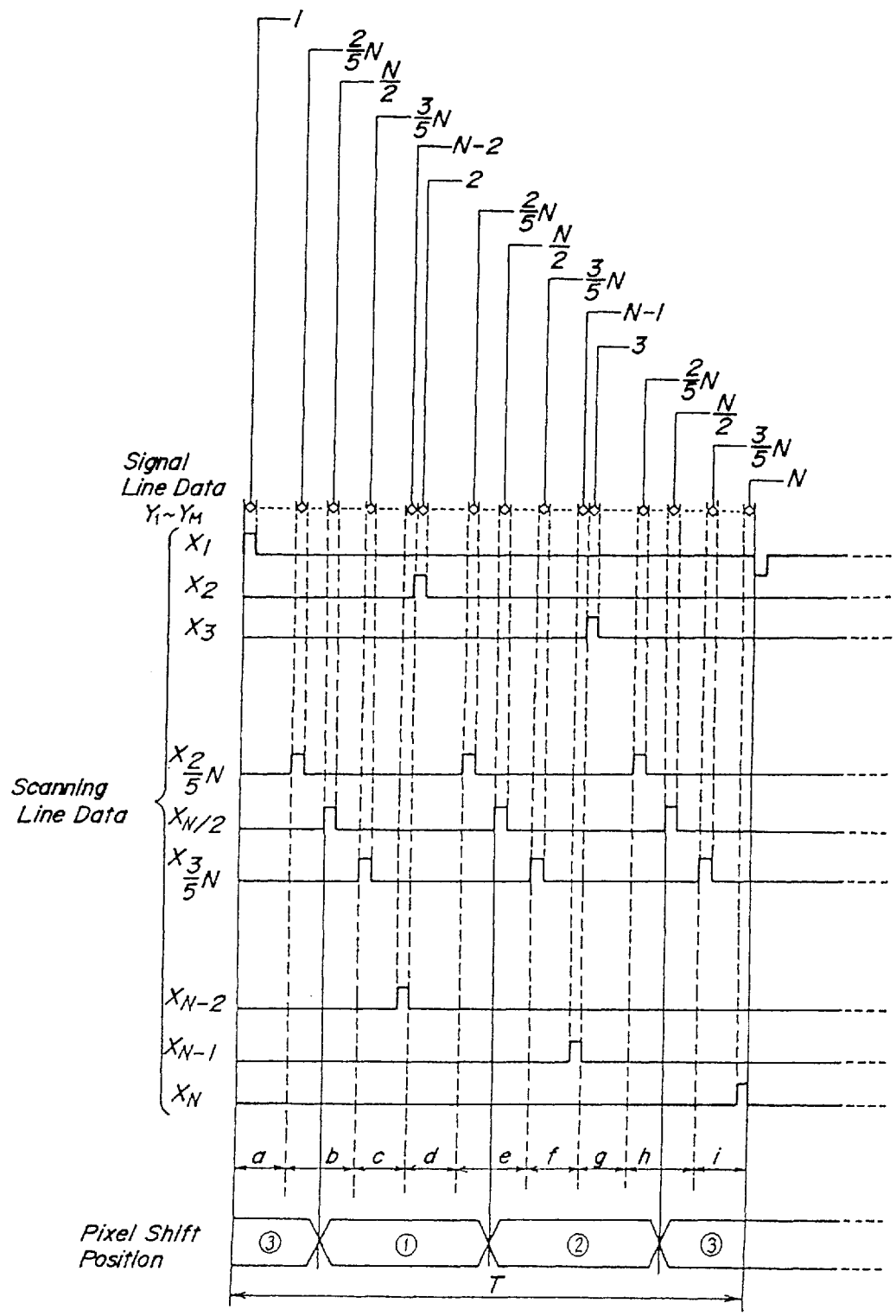
FIG. 27 illustrates signal waveforms of the fifth embodiment.

FIGS. 25–27 depict a fifth embodiment of the image display apparatus according to the invention. In the present embodiment, as shown in FIG. 25, for successive frames, the image data rewriting is carried out in accordance with arrows ab, ac and.

During a data rewriting period denoted by the arrow ab, for rows from $1^{st}$ to $(2N/5-1)^{th}$ rows and $(3N/5+1)^{th}$ to $N^{th}$ rows, only $(3n+1)^{th}$ rows (n=0, 1, 2 - - - ) are rewritten, and for rows in a central region C from $2N/5^{th}$ to $3N/5^{th}$ rows, all the rows are rewritten. During the next image date rewriting period represented by the arrow ac, for the rows from $1^{st}$ to $(2N/5-1)^{th}$ rows and $(3N/5+1)^{th}$ to $N^{th}$ rows, only $(3n+2)^{th}$ rows are rewritten, and for the rows in a central region C from $2N/5^{th}$ to $3N/5^{th}$ rows, all the rows are rewritten. During the last image data rewriting period denoted by the arrow ad, for the rows from $1^{st}$ to $(2N/5-1)^{th}$ rows and $(3N/5+1)^{th}$ to $N^{th}$ rows, only $(3n+3)^{th}$ rows are rewritten, and for the center region rows from $2N/5^{th}$ row to $3N/5^{th}$ row, all the rows are rewritten.

In the present embodiment, for the $1^{st}$ to $(2N/5-1)^{th}$ rows and $(3N/5+1)^{th}$ to $N^{th}$ rows, the image date rewriting is carried out only once during a one frame period T, and for the rows in the central region C from $_2N/5^{th}$ row to $3N/5^{th}$ row, the image data rewriting is performed three times during one frame period. Also in the present embodiment, the image data to be rewritten in the periods ab, ac and ad is sampled at different timings.

To this end, the input image signal S1 for $1^{st}$ to $N^{th}$ rows is sampled at given timings to obtain the digital image data signals and these digital image data signals are then stored in the frame memory as illustrated in FIG. 26. By suitably controlling read-out addresses, the signal line data S6 is read-out and displayed as shown in FIG. 26. During one frame period, for the rewriting time period illustrated by the arrow ab in FIG. 25, the image data signals S6 corresponding to $(3n+1)^{th}$ rows among $1^{st}$ to $(2N/5-1)^{th}$ rows are read out and displayed within a period a, the image data signals S6 corresponding to all $2N/5^{th}$ to $3N/5^{th}$ rows are read out and displayed within a period b, and the image data signals S6 corresponding to $(3n+1)^{th}$ rows among $(3N/5+1)^{th}$ to $N^{th}$ rows are read out and displayed within a period c.

During the data rewriting time periods represented by the arrow ac in FIG. 25, the image data signals S6 corresponding to $(3n+2)^{th}$ rows among $1^{st}$ to $(2N/5-1)^{th}$ rows are read out and displayed within a period d, the image data signals S6 corresponding to all $2N/5^{th}$ to $3N/5^{th}$ rows are read out and displayed within a period e, and the image data signals S6 corresponding to $(3n+2)^{th}$ rows among $(3N/5+1)^{th}$ to $N^{th}$ rows are read out and displayed within a period f. Similarly, the image data signals S6 corresponding to $(3n+3)^{th}$ rows among $1^{st}$ to $(2N/5-1)^{th}$ rows are read out and displayed within a period g, the image data signals S6 corresponding to all $2N/5^{th}$ to $3N/5^{th}$ rows are read out and displayed within a period h, and the image data signals S6 corresponding to $(3n+3)^{th}$ rows among $(3N/5+1)^{th}$ to $N^{th}$ rows are read out and displayed within a period i.

FIG. 27 shows the relationship between the signal line data $Y_1$-$Y_M$, scanning line data $X_1$-$X_N$ and pixel shift positions ①, ② and ③ for explaining the operation of the fifth embodiment. Also in the present embodiment, the pixel shift is performed at a timing at which the image data signal for the center $N/2^{th}$ row is to be rewritten. It should be noted that the periods a–i in FIG. 27 correspond to the periods a–i in FIG. 26.

In the fifth embodiment, the number of the scanning lines is assumed to be set to 525. Then, the number of scanning lines to be subjected to the data rewriting for one frame period and the rewriting time per one scanning line are identical with those of the first embodiment. Therefore, in the present embodiment, by using LCD such as AFLC having a high response speed of 20 μs per line, the resolution in the center region C can be improved like as the first embodiment.

In the present embodiment, as can be understood from FIGS. 26 and 27, since the display times at the respective pixel shift positions are identical with each other, the displayed image has a uniform brightness without adjusting the brightness of the image data signals.

FIGS. 28–30 illustrate a sixth embodiment of the image display apparatus according to the invention. In the present embodiment, the pixel shift is conducted at a timing every time the center line of the LCD is rewritten and the resolution for the center region of N/5 rows can be increased. To this end, as shown in FIG. 28, for successive frames, the image data rewriting operation is carried out by three times, i.e. in the first time two image data rewritings are carried out in accordance with arrows ab and ac, in the second time, only one rewriting operation denoted by an arrow ad in the second time, and in the third time two rewriting operations denoted by arrows ae and af. It should be noted that the image data signals for the first, second and third times' rewriting operations are obtained by different sampling timings.

In the first time, the signal line data is rewritten for rows from $1^{st}$ to $(2N/15)^{th}$ rows as denoted by the arrow ab and for $2N/5^{th}$ to $3N/5^{th}$ rows as depicted by the arrow ac, and in the second time, the signal line data is rewritten for $(2N/15+1)^{th}$ to $13N/15^{th}$ rows as denoted by the arrow ad. In the third time, the signal line data is rewritten for $2N/5^{th}$ to $3N/5^{th}$ rows as represented by the arrow ae and for $(13N/5+1)^{th}$ to $N^{th}$ rows as shown by the arrow af. In this manner, in the present embodiment, during respective frame period T, for the $1^{st}$ to $2N/5^{th}$ rows and $(3N/5+1)^{th}$ to $N^{th}$ rows, the signal line data is rewritten only once, but for the central region C from $2N/5^{th}$ row to $3N/5^{th}$ row, the signal line data is rewritten by three times.

To this end, the input image signal S1 for $1^{st}$ to $N^{th}$ rows is sampled at given timings to obtain the digital image data signals and these digital image data signals are then stored in the frame memory as illustrated in FIG. 29. By suitably controlling read-out addresses, the signal line data S7 is read-out and displayed as shown in FIG. 29. That is to say, during one frame period T, the image data signals S7 corresponding to $1^{st}$ to $(2N/15+1)^{th}$ rows and from $2N/5^{th}$ to $3N/5^{th}$ rows are read out and displayed within a period a to perform the data rewriting shown by the arrows ab and ac in FIG. 28. During a period b, the image data signals S7 corresponding to $(2N/15+1)^{th}$ to $3N/15^{th}$ rows are read out and displayed to effect the data rewriting denoted by the arrow ad in FIG. 28. During a last period c, the image data signals S7 corresponding to $2N/5^{th}$ to $3N/5^{th}$ rows and from $(13N/15+1)^{th}$ to $N^{th}$ rows are read out and displayed to carry out the data rewriting represented by the arrows ae and af in FIG. 28.

FIG. 30 depicts the relationship between the signal line data $Y_1$-$Y_M$, scanning line data $X_1$-$X_N$ and pixel shift positions ①, ② and ③ for explaining the operation of the sixth embodiment. It should be noted that the periods a–c in FIG. 30 correspond to the periods a–c in FIG. 29.

In the present embodiment, the signal line data is rewritten in the manner explained above and the pixel shift is performed at the center $N/2^{th}$ row, and thus the number of rows in which the data rewriting is carried out can be equal to 7N/15 rows. Therefore, the display times at the respective pixel shift positions can be made identical with each other, and the uniform brightness can be attained without adjusting the brightness of the image data signals.

In the present embodiment, when the number of scanning lines N is set to 525, the number of scanning lines whose data can be rewritten for one frame period T (1/60 seconds) and the data rewriting time per one line are identical with those of the first embodiment. Therefore, as the LCD, use may be made of AFLC having a high response speed of 20 μs per line.

FIGS. 31 and 32 show a seventh embodiment of the image display apparatus according to the invention. In the present embodiment, the pulsatory scanning line data is applied to the Y electrodes of the LCD 11 operating with the simple matrix driving mode and the signal line data is applied to the X electrodes such that the signal is successively rewritten in the vertical direction as shown by arrows in FIG. 31. For columns within a central region C of the LCD 11, the pixel shift is performed twice in the direction of row, i.e. in the horizontal direction. In this manner, three images obtained by different sampling timings are displayed in respective frames.

FIG. 32A illustrates the display pixels on the LCD 11, and FIG. 32B depicts the signal line data signals obtained by the three different sampling timings. In the pixel shift position ①, the image is displayed as shown in FIG. 32C, and in the pixel shift positions ② and ③, since only columns within the central portion C are subjected to the data rewriting, images shown in FIGS. 32D and 32E are displayed. Therefore, a user perceives a composite image illustrated in FIG. 32F due to the after image effect. In this manner, the horizontal resolution can be increased in the central region C. Therefore, this embodiment is particularly suitable for a case in which an object to be seen with a high resolution is elongated in the vertical direction.

Figure 33:
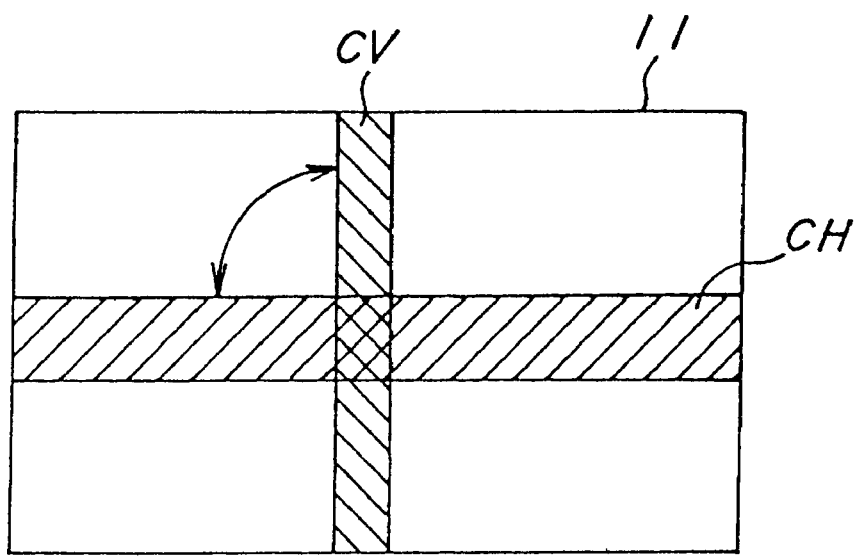
FIG. 33 is a diagram illustrating the image data rewriting operation in an eighth embodiment of the image display apparatus according to the invention.
Figure 34:
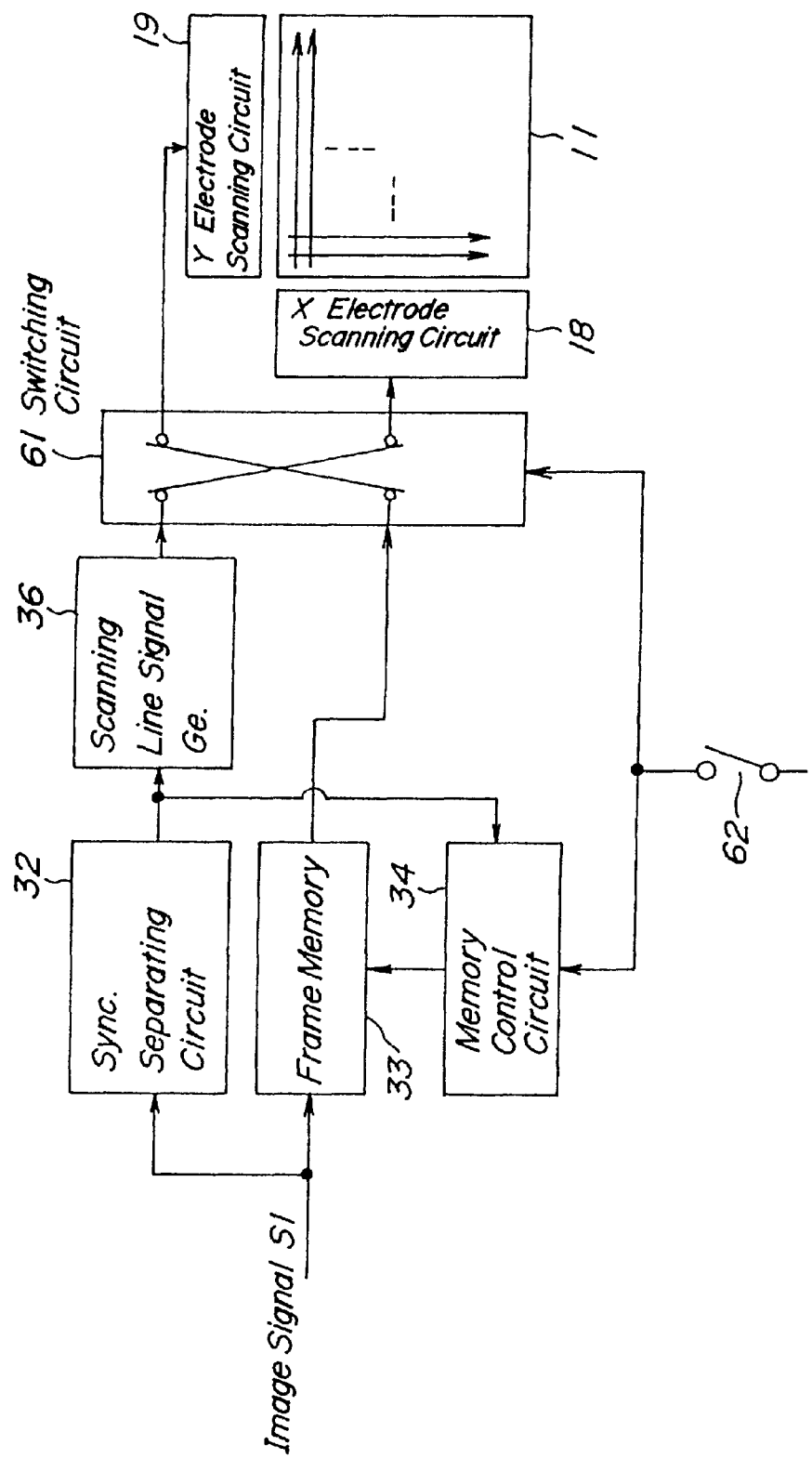
FIG. 34 is a block diagram showing a main portion of the eighth embodiment.

FIGS. 33 and 34 represent an eighth embodiment of the image display apparatus according to the invention. In the present embodiment, the resolution is improved in a central horizontal region CH as well as in a central vertical region CV of the LCD 11 as depicted in FIG. 33. Therefore, the present invention may be considered as a combination of any of the first to sixth embodiments and the seventh embodiment.

FIG. 34 is a block diagram showing a main portion of the LCD driving circuit of the present embodiment. In FIG. 34, portions similar to those shown in FIG. 10 are denoted by the same reference numerals used in FIG. 10. An input image signal S1 is supplied to a synchronizing signal separating circuit 32 as well as to a frame memory 33. The input image signal S1 is sampled at a sampling frequency which is higher than a normal sampling frequency by three times and the thus sampled image data signals are stored in the frame memory 33. It should be noted that in FIG. 34, the A/D converter and D/A converter arranged at input and output sides of the frame memory 33, respectively are omitted.

A synchronizing signal extracted by the synchronizing signal separating circuit 32 is supplied to a memory control circuit 34 and a scanning line signal generating circuit 36. In the scanning line signal generating circuit 36, a scanning line signal is generated on the basis of the synchronizing signal, and the thus generated scanning line signals are selectively supplied via a switching circuit 61 to X and Y electrode scanning circuits 18 and 19. In the memory control circuit 34, writing and reading address signals for the frame memory 33 are generated on the basis of the synchronizing signal, and read-out image data signals are selectively supplied to the X and Y electrode scanning circuits 18 and 19 by means of the switching circuit 61.

In the present embodiment, a scanning switch signal is supplied via a switch 62 to the memory control circuit 34 and switching circuit 61 to control a switching operation of the switching circuit and an address scanning direction for reading the frame memory 33. That is to say, in case of increasing the resolution for the central horizontal region CH of the LCD 11, the switch 62 is made off and the switching circuit 61 is driven into a condition illustrated in FIG. 34 such that the output signal from the scanning line signal generating circuit 36 is supplied to the X electrode scanning circuit 18 and the output signal from the frame memory 33 is supplied to the Y electrode scanning circuit 19. At the same time, the frame memory 33 is read-out in the horizontal direction.

When the resolution is to be improved in the central vertical region CV, the switch 62 is made on and the switching circuit 61 is driven into a condition opposite to that illustrated in FIG. 34. Therefore, the output signal from the scanning line signal generating circuit 36 is supplied to the Y electrode scanning circuit 19 and the output signal from the frame memory 33 is supplied to the X electrode scanning circuit 18. Further, the scanning direction of read-out address for the frame memory 33 is set into the vertical direction. It should be noted that in FIG. 34, the pixel shift element and its driving circuit are omitted for the sake of simplicity.

As explained above, in the present embodiment, the switch 62 is operated in accordance with a content of the input image such that either one of the central horizontal region CH and central vertical region CV can be selectively displayed with a higher resolution.

Figure 35:
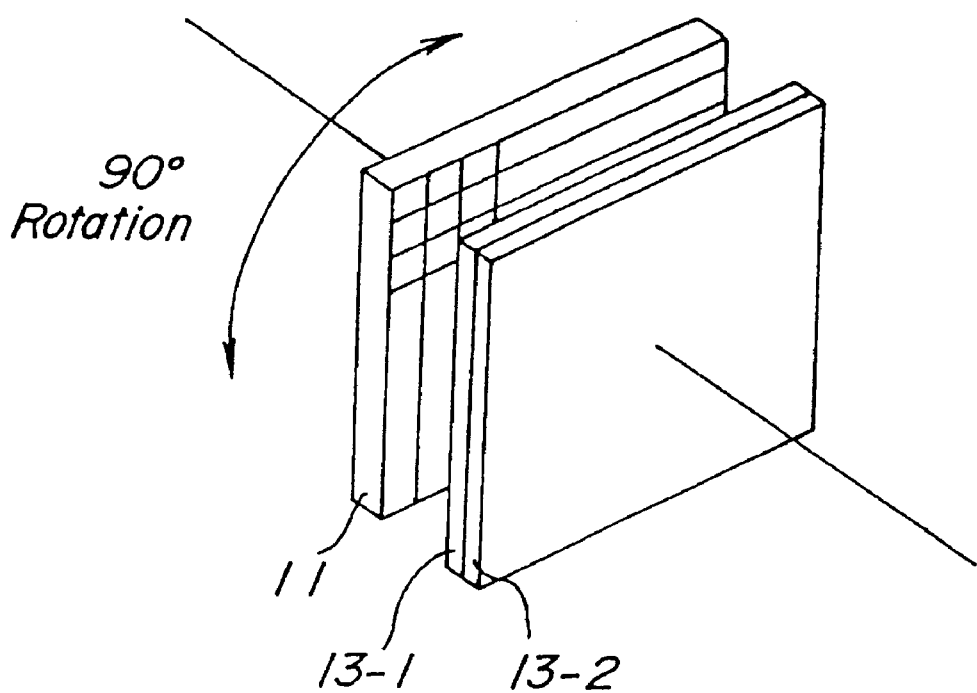
FIG. 35 is a perspective view showing a ninth embodiment of the image display apparatus according to the invention.

Now a ninth embodiment of the image display apparatus according to the invention will be explained with reference to FIGS. 35 and 36. In this embodiment, as illustrated in FIG. 35, the LCD 11 is arranged rotatably by 90 degrees together with its X and Y scanning circuits such that the resolution can be selectively increased either in the central horizontal region and central vertical region like as the eighth embodiment.

Figure 36:
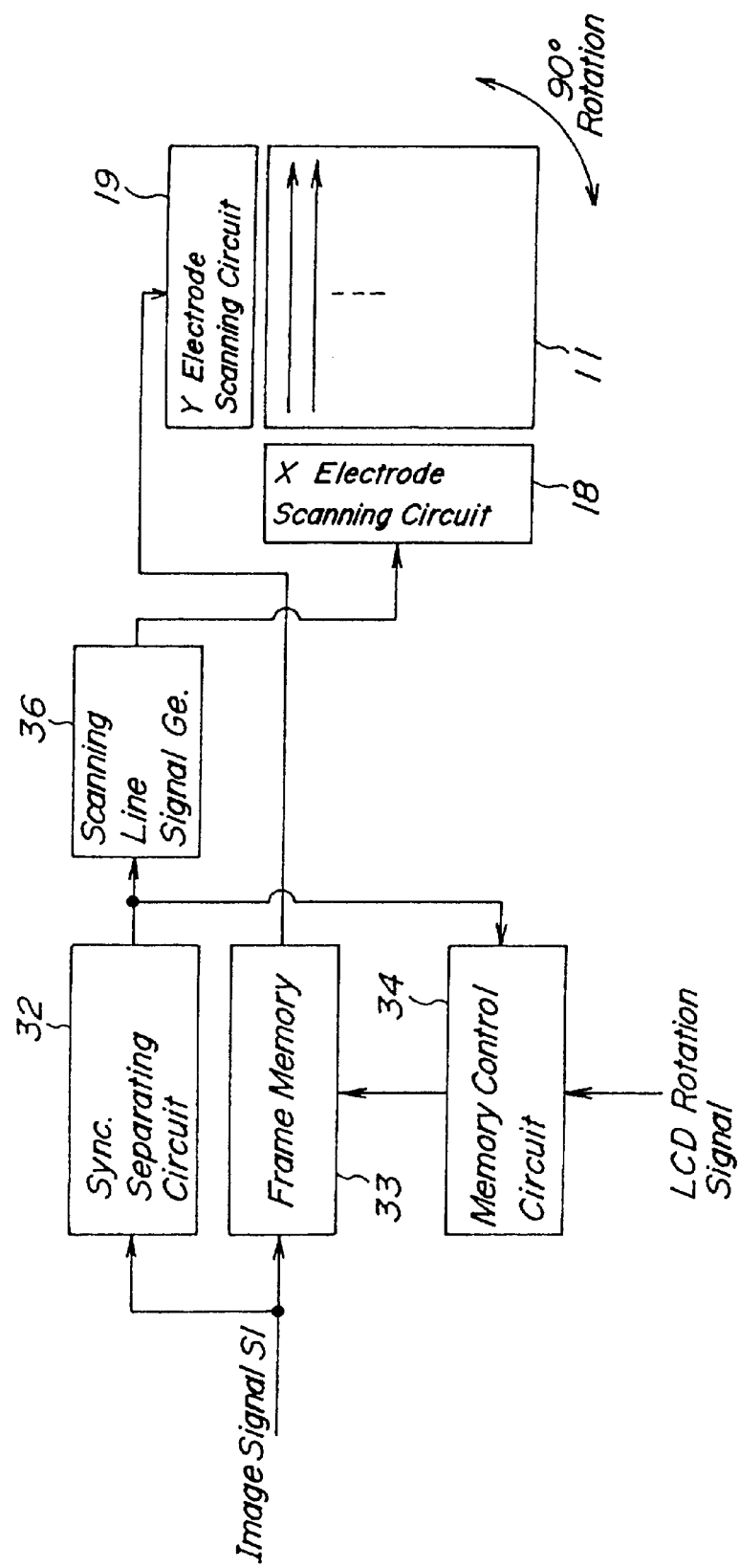
FIG. 36 is a block diagram illustrating a main portion of the ninth embodiment.

FIG. 36 is a block diagram showing a main portion of the LCD driving circuit of the present embodiment. An LCD rotation signal is supplied to the memory control circuit 34 in synchronism with the rotation of the LCD 11 such that the scanning direction of read-out addresses for the frame memory 33 can be changed in accordance with the rotation of the LCD 11. When the resolution is to be enhanced in the central horizontal region of LCD 11, the LCD is set at a position shown in FIG. 35 and the output signals from the scanning line signal generating circuit 36 and frame memory 33 are supplied to the X and Y electrode scanning circuits 18 and 19, respectively. Further, the frame memory 33 is read-out in the horizontal direction. Then, the image is displayed like as the first to sixth embodiments.

When the resolution is to be increased in the central vertical region, the LCD 11 is rotated by 90 degrees about an optical axis, and the output signals from the scanning line signal generating circuit 36 and frame memory 33 are supplied to the X and Y electrode scanning circuits 18 and 19. The frame memory 33 is read in a vertical direction. Then, the image is displayed just like as the seventh embodiment. The remaining structure of the present embodiment is similar to that of the previous embodiments. It should be noted that since the pixel shift elements 13-1 and 13-2 are not rotated, the pixel shift is always carried out in the horizontal direction in regardless of the rotation of the LCD 11.

Figure 37:
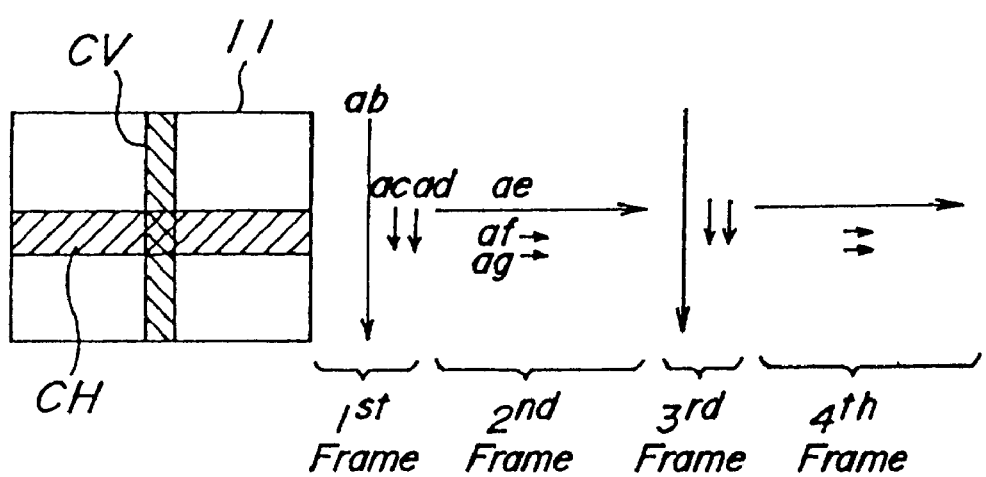
FIG. 37 is a diagram showing the image data rewriting operation in a tenth embodiment of the image display apparatus according to the invention.
Figure 38:
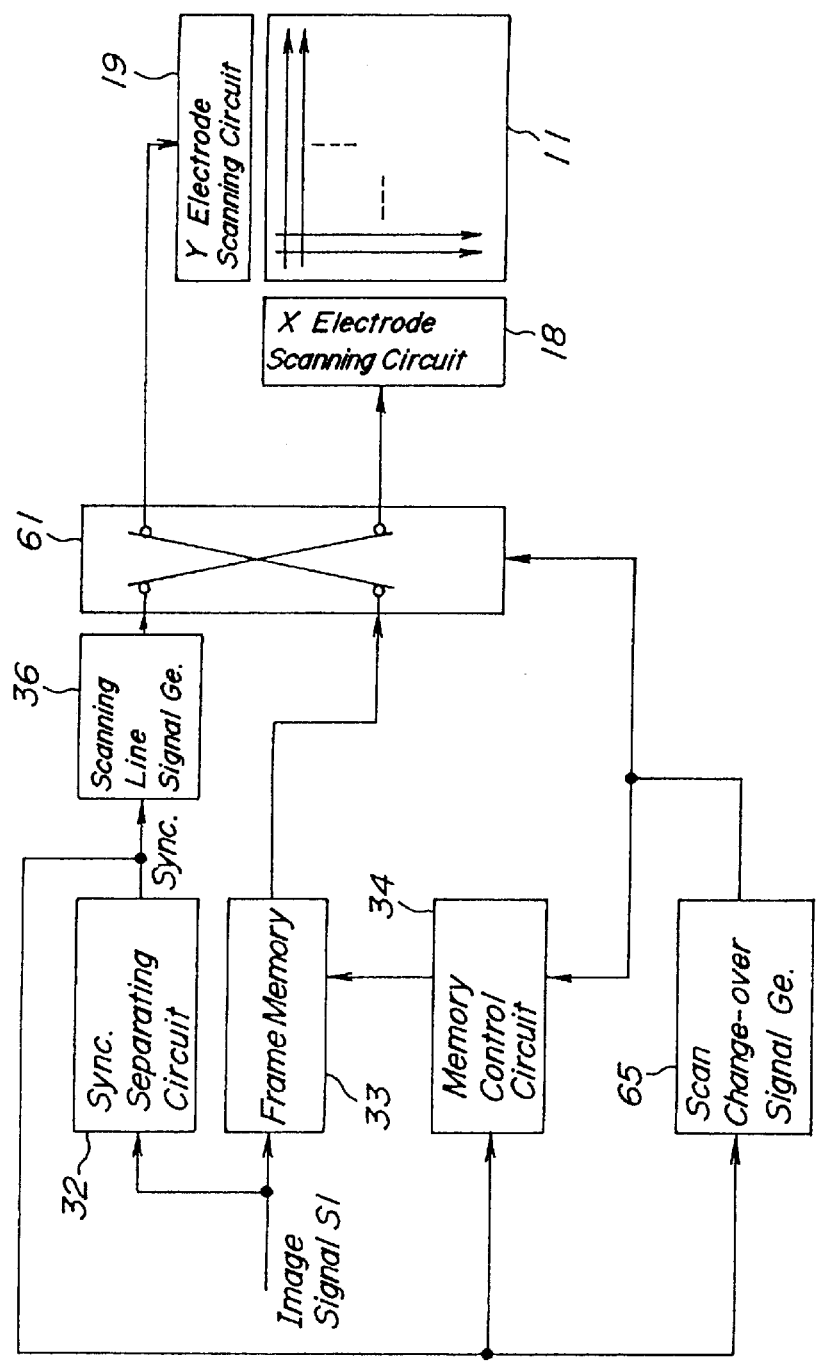
FIG. 38 is a circuit diagram of a main portion of the tenth embodiment.

FIGS. 37 and 38 show a tenth embodiment of the image display apparatus according to the invention. In the present embodiment, as depicted in FIG. 37, in an odd numbered frame, the image data signals are successively rewritten in the direction of successive rows as indicated by arrows ab, ac and ad, and in an even numbered frame, the image data signals are successively rewritten in the direction of successive columns as denoted by arrows ae, af and ag. Therefore, in odd numbered frames, the resolution is increased selectively for the central horizontal region CH, and in even numbered frames, the resolution is selectively enhanced in the central vertical region CV. It should be noted that the sampling timings for obtaining the image data signals and the pixel shift are identical with those of the previous embodiments. In this manner, the resolution can be selectively increased for the central horizontal and vertical regions CH and CV in alternate frames.

To this end, in the present embodiment, as shown in FIG. 38 which depicts a main portion of the LCD driving circuit, a scan change-over signal generating circuit 65 is added to the embodiment shown in FIG. 34 to produce a scan change-over signal on the basis of the synchronizing signal extracted by the synchronizing signal separating circuit 32. Then, the connecting condition of the switching circuit 61 and the direction of read-out addresses for the frame memory 33 are alternately changed-over for successive odd and even numbered frames under the control of a scan change-over signal generated by the scan change-over signal generating circuit 65. The image can be displayed in a similar manner to that explained above with reference to FIG. 34.

Therefore, in the present embodiment, the resolution can be increased alternately for the central horizontal region CH and central vertical region CV in successive frames, and thus the resolution of the displayed image can be improved much more effectively.

Figure 39:
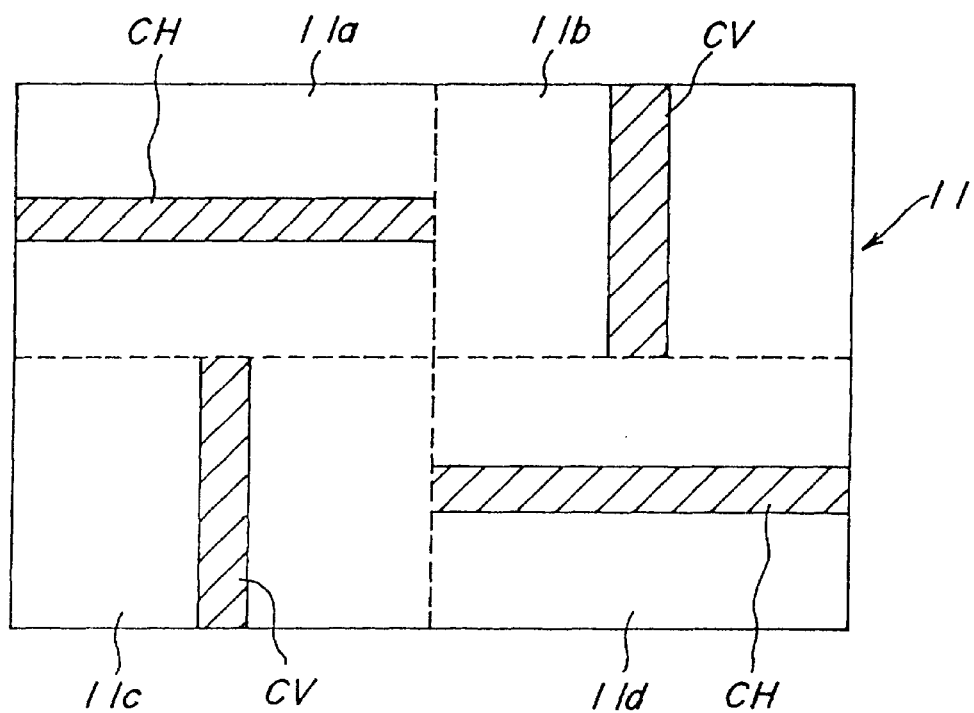
FIG. 39 is a schematic view depicting the image data rewriting operation in an eleventh embodiment of the image display apparatus according to the invention.
Figure 40:
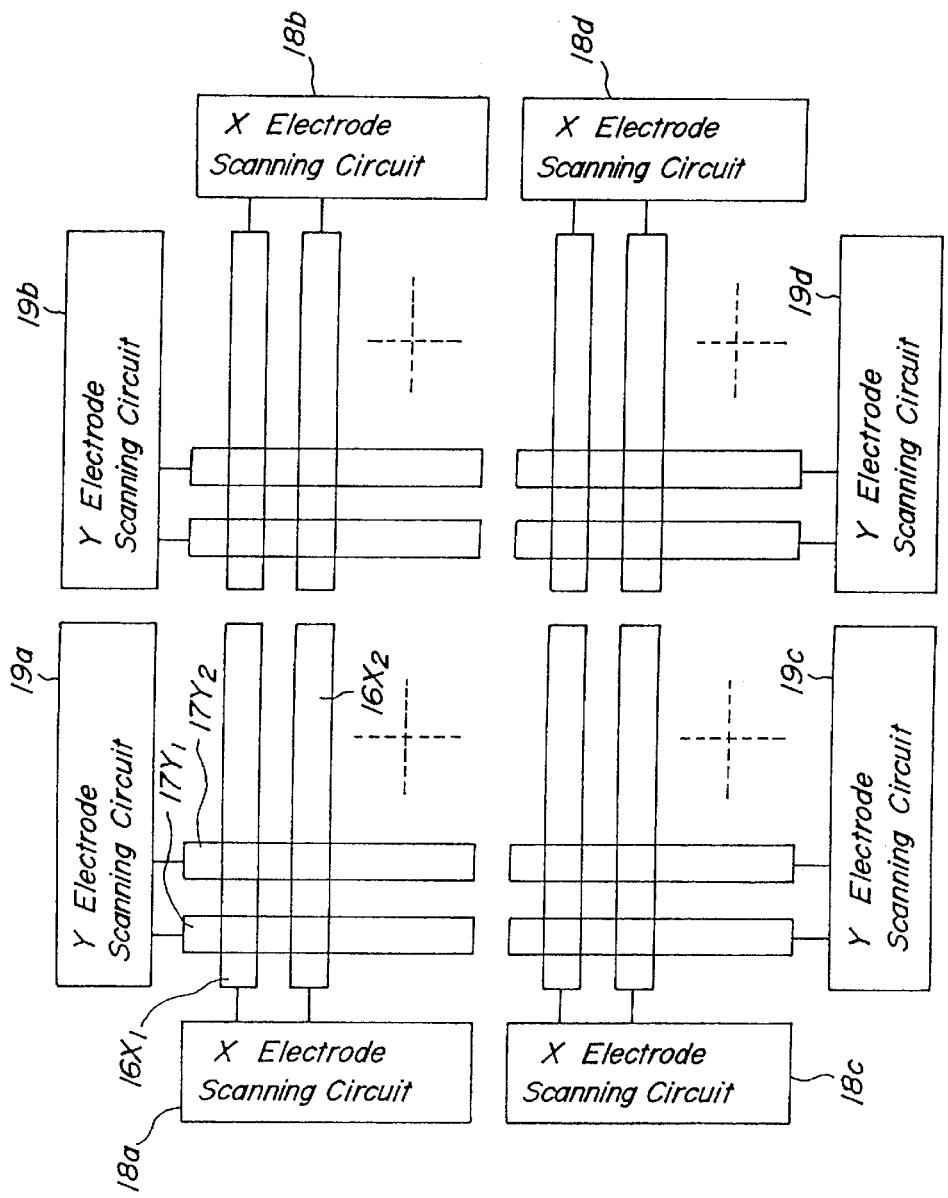
FIG. 40 is a block diagram of a main portion of the eleventh embodiment.

FIGS. 39 and 40 explain an eleventh embodiment of the image display apparatus according to the invention. In the present embodiment, the display area of the LCD 11 is divided into, for instance, four equal sections 11a–11d and in each sections, the resolution is selectively increased for central horizontal and vertical regions CH and CV by carrying out the pixel shift and the samplings at different timings in the respective sections.

As illustrated in FIG. 40, The X electrodes $16X_1$, $16X_2$ - - - and Y electrodes $17Y_1$, $17Y_2$ - - - are classified into four identical groups, and the X and Y electrodes are driven by X and Y electrode scanning circuits 18a–18d and 19a–19d corresponding to the four groups, respectively. Although the pixel shift elements are not shown in FIG. 40, they are also divided into four groups corresponding to the four groups of the LCD 11, and the thus divided four groups are driven independently from each other such that in each of the groups, the pixel shift is performed at its center row.

In the present embodiment, an input image may be displayed over the whole four display sections of the LCD 11 or four different input images may be displayed independently on the four display sections of the LCD 11 just like as a multi-image display. In any case, the resolution can be improved in the central horizontal and vertical regions CH and CV.

Next a twelfth embodiment of the image display apparatus according to the invention will be explained with reference to FIGS. 41–43. As illustrated in FIG. 41, in successive frames, the image data signals are rewritten in a manner denoted by arrows to increase the resolution in an upper central region CU of an upper half section of the LCD 11 as well as in a lower central region CL of a lower half section of the LCD.

In this case, the polarizing direction converting panels of the pixel shift elements are divided into upper and lower halves and the pixel shift is effected each time the image data signals are rewritten at center rows in each halves. It should be also noted that the image data signals for the central regions CU and CL are obtained at different sampling timings like as the previous embodiments.

FIG. 42 shows a modification, in which the image data is rewritten as shown by arrows in FIG. 42 such that the resolution can be improved in regions C denoted by hatching in FIG. 42. That is to say, the image data is rewritten selectively only in a left hand part of an upper central area and a right hand part of a lower central area. Also in this embodiment, the pixel shift elements have to be divided into the upper and lower halves.

In the embodiments shown in FIGS. 41 and 42, the resolution is selectively improved for the upper and lower regions in the image frame, and thus it can be advantageously applied to an image having subjects situating in upper and lower regions.

FIG. 43 illustrates another modification, in which the image data is rewritten as indicated by arrows to improve the resolution for a central region C. In general, a user sees a central portion of the display plane, and thus the present embodiment is much more effective. It should be noted that in the present embodiment, it is not necessary to divide the pixel shift elements into upper and lower portions.

Figure 44:
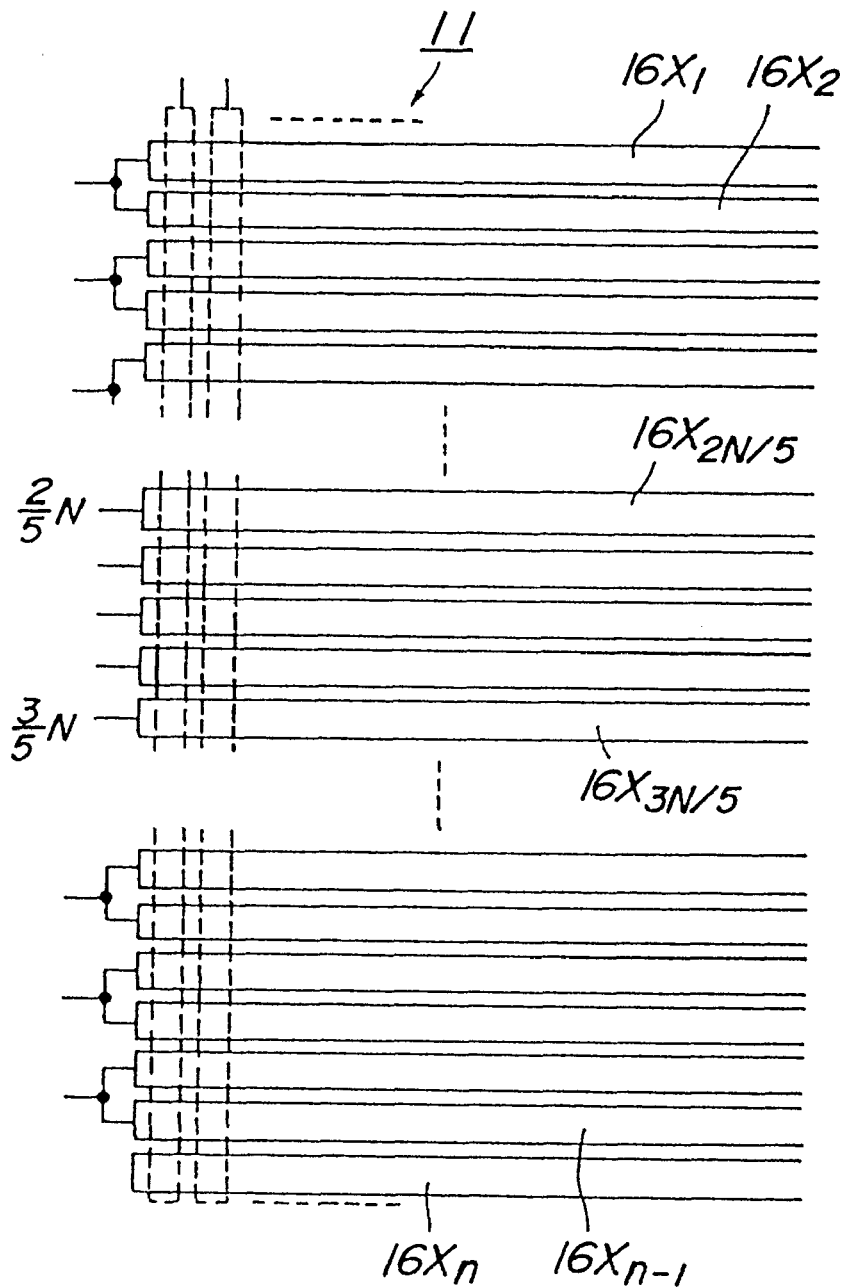
Figure 47:
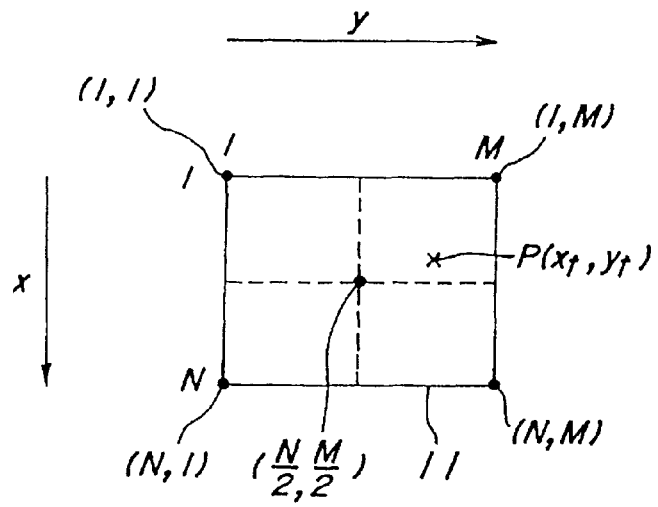
FIG. 47 is a diagram depicting coordinates on the LCD.
Figure 48:
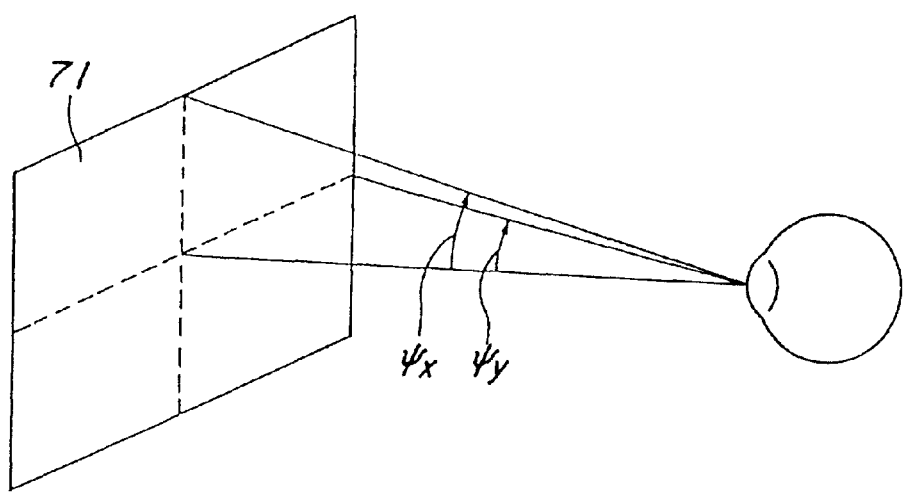
FIG. 48 is a schematic view showing the horizontal and vertical half viewing angles of a line of sight with respect to an enlarged virtual image viewed in HMD.

FIGS. 44 and 45 show a thirteenth embodiment of the image display apparatus according to the invention. In the present embodiment, the X electrodes $16X_1$–$16X_N$ of the LCD 11 is classified into three groups, i.e. a first group containing X electrodes belonging to $1^{st}$ to $(2N/5-1)^{th}$ rows, a second group including X electrodes belonging to $(2N/5)^{th}$ to $(3N/5)^{th}$ rows, and a third group having X electrodes belonging to $(3N/5+1)^{th}$ to $N^{th}$ rows. For the X electrodes belonging to the second group, respective electrodes can be driven independently from each other. But in the first and second groups, successive two X electrodes can be driven in a pairwise manner.

For instance, in an odd numbered frame, successive X electrodes in the first and second groups, i.e. $(2m-1)^{th}$ and $2m^{th}$ electrodes (m is a positive integer) are driven in a pairwise manner, and in an even numbered frame, successive two X electrodes which are shifted by one with respect to the paired electrodes in the odd numbered frame, i.e. $2m^{th}$ and $(2m+1)^{th}$ electrodes are driven in a pairwise manner as shown in FIGS. 44 and 45. It should be noted that the paired electrodes are driven simultaneously. The image data is rewritten in the same manner as that of the fourth embodiment and the resolution can be increased in the central region including the $(2N/5)^{th}$ to $(3N/5)^{th}$ rows.

In the present embodiment, the display density in the $1^{st}$ to $(2N/5-1)^{th}$ rows and $(3N/5+1)^{th}$ to $N^{th}$ rows does not decreased, and therefore it in possible to make the brightness of the displayed image uniform without adjusting the brightness of the image data. Moreover, in the present embodiment, the resolution in an area except for the central N/5 rows becomes lower, and thus it is preferable to use a cheap AFLC or FLC having a relatively slow response speed as the LCD like as the fourth embodiment.

In the embodiments so far explained, the region in which the resolution is selectively improved is predetermined, but according to the invention, it is also possible to change a position of the resolution improved region in the display plane. For example, a direction of a line of sight of a user is detected to know a point of view on the displayed image on the LCD and the resolution is increased in an area including this point of view.

FIGS. 46–54 show a fourteenth embodiment of the image display apparatus according to the invention, in which the resolution enhancing region is produced in accordance with a point of view of a user.

FIGS. 46A–46F represents various modes of determining the resolution increasing region C in the present embodiment. In FIG. 46A, the resolution is improved for a laterally elongated region C having a center x coordinate $x_t$ which corresponds to a viewing point P of the user and having a width from $x_t-\Delta x$ to $x_t+\Delta x$. In FIG. 46B, a resolution improved region C is set to an area having center coordinates $(x_t, y_t)$ corresponding to the point of view P of the user and having a width of $2\Delta x$ and a height of $2\Delta y$.

In the embodiment shown in FIG. 46C, the image display plane is divided horizontally into a plurality of elongated blocks and any one of these blocks which contains the point of view P of the user is selected as the resolution improved region C. In FIG. 46D, the image display plane is divided horizontally as well as vertically into a plurality blocks and any one of these blocks which includes the point of view P of the user is selected as the resolution improved region C.

In FIG. 46E, a resolution improved region C is determined as a vertically elongated region having a center y coordinate $y_t$ which corresponds to the point of view P of the user and having a width of $2\Delta y$. In FIG. 46F, the image display plane is divided vertically into a plurality of vertically elongated blocks, and any block containing the point of view P of the user is selected as the resolution improved region C.

In FIGS. 46A–46F, once the resolution enhanced region C has been determined, the image data rewriting is carried out several times in each frame only for the region C while the pixel shift is performed at a timing when the image data signal is rewritten for a central row or column within the region C like as the previous embodiments.

Now a method of detecting the coordinates $(x_t, y_t)$ of the point of view P of the user will be explained. Now the image display plane on the LCD 11 is denoted by defining coordinates as described in FIG. 47. A horizontal half frame angle $\psi_y$ and a vertical half frame angle $\psi_x$ are set on a viewing plane on which the image displayed on the LCD 11 is seen, for instance, on an enlarged virtual image plane 71 formed by an eyepiece optical system when the displayed image on the LCD 11 installed in the HMD is viewed. In this case, by detecting a horizontal viewing angle $\theta_x$ with respect to an optical axis 72 of the eyepiece optical system shown in FIG. 49A and a vertical viewing angle $\theta_y$ with respect to the optical axis 72 illustrated in FIG. 49B, the coordinate $(x_t, y_t)$ of the point of view P of the user may be given by the following equation:

$$(x_t, y_t)=[N/2+N.\tan \theta_x/\tan \psi_x, M/2+M.\tan \theta_y/\tan \psi_y] \quad (3)$$

FIGS. 50A and 50B depict two embodiments of the detector for detecting the line of sight for deriving the horizontal viewing angle $\theta_x$ and vertical viewing angle $\theta_y$. In FIG. 50A, the eyepiece optical system is similar to that shown in FIG. 15, but the half mirror 49 and concave mirror 50 are formed as a prism 75. In this eyepiece optical system, the image displayed on the LCD 11 illuminated by the back light 12 is made incident upon the prism 75 via the first and second pixel shift elements 13-1 and 13-2, is transmitted through the half mirror 49, is enlarged and reflected by the concave mirror 50, and is reflected by the half mirror 49 toward the user's eye.

In FIG. 50B, instead of the prism 75 shown in FIG. 50A, use is made of an eccentric concave optical element 76 having the function of the half mirror and concave mirror. The displayed image on the LCD 11 illuminated by the back light 12 is made incident upon the eccentric optical element 76 via the first and second pixel shift elements 13-1 and 13-2, is successively reflected and enlarged by concave surface 76a, flat surface 76b and concave surface 76c of the eccentric optical element 76, and is then emanated from a flat surface 76d toward the user's eye.

In FIGS. 50A and 50B, the line of sight detector 81 comprises an infrared light source 82, collimator lens 83, two dimensional position detector such as a semiconductor position detector 84 and a low pass filter 85. In FIG. 51A, infrared light emitted by the light source 82 is made incident upon a corresponding eye of the user by means of the prism 75 and infrared light reflected by the eye is made incident upon the two dimensional position detector 84 as a spot by means of the prism 75 and collimator lens 83. An output signal from the two dimensional position detector 84 is passed through the low pass filter 85 to remove a signal component due to a jumping motion of the line of sight, and by suitably processing an output signal from the low pass filter, it is possible to derive the horizontal viewing angle signal $\theta_x$ and vertical viewing angle signal $\theta_y$.

In FIG. 50B, the infrared light emitted from the light source 82 is made incident upon the corresponding eye via the eccentric concave optical element 76 and the infrared light reflected by the eye is made incident upon the two dimensional position detector 84 by means of the eccentric optical element 76 and collimator lens 83 as a spot. By processing the output signal from the low pass filter 85, it is also possible to derive the horizontal viewing angle signal $\theta_x$ and vertical viewing angle signal $\theta_y$.

Figure 51:
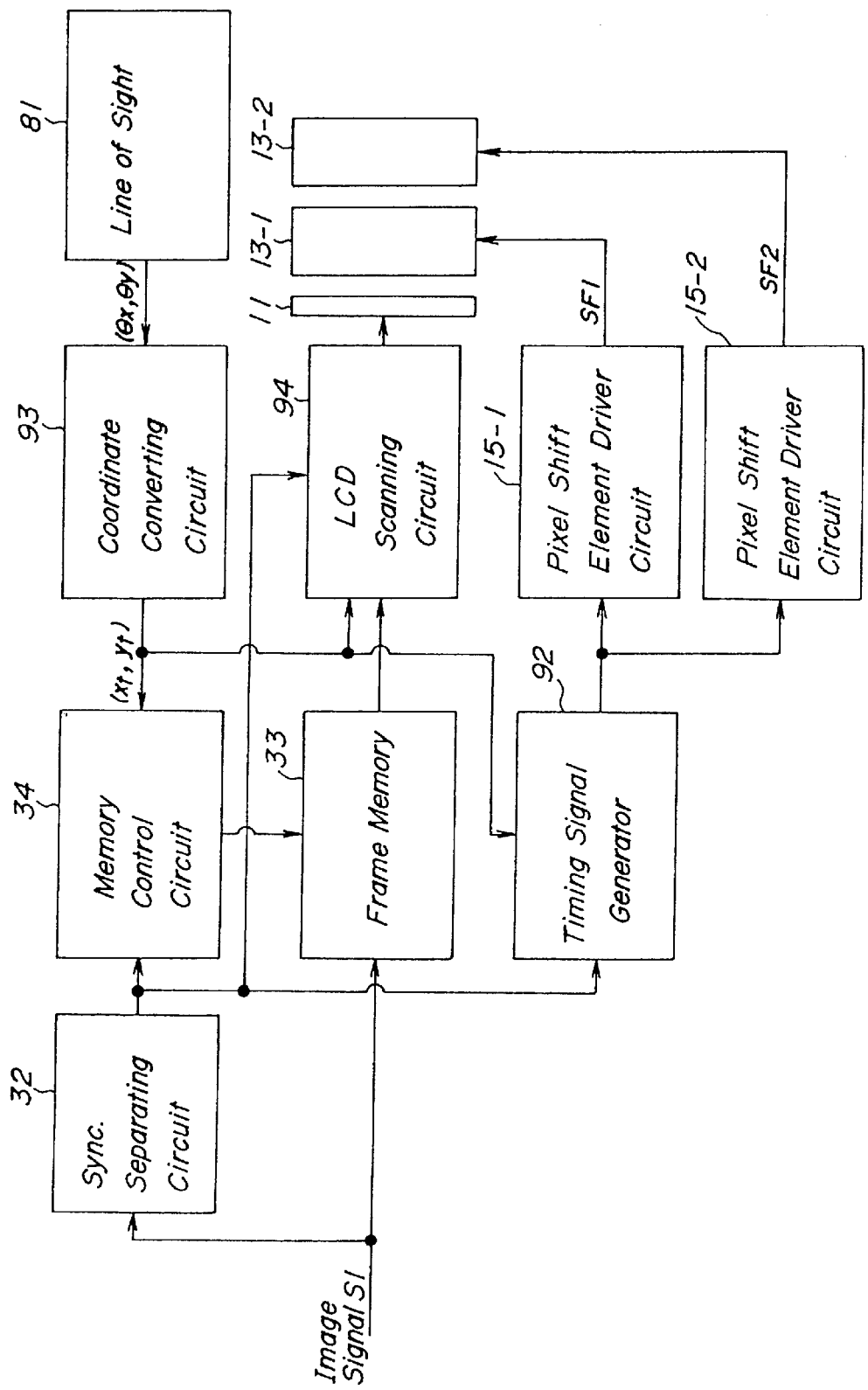
FIG. 51 is a circuit diagram showing main portion of the fourteenth embodiment.

FIG. 51 is a block diagram depicting a major portion of the LCD deriving circuit of the present embodiment. In FIG. 51, portions similar to those shown in FIG. 10 are denoted by the same reference numerals used in FIG. 10. The input image signal S1 is supplied to the synchronizing signal separating circuit 32 to extract the synchronizing signal as well as to the frame memory 33 to sample the input image signal at a sampling frequency which is higher than a normal sampling frequency by three times. The thus sample image data signals are stored in the frame memory 33. Also in FIG.

51, the A/D converter and A/D converter provided at the input and output sides of the frame memory 33 are omitted.

The synchronizing signal extracted by the synchronizing signal extracting circuit 32 is supplied to LCD scanning circuit 94 which comprises the scanning line signal generating circuit 36, X electrode scanning circuit 18 and Y electrode scanning circuit 19, memory control circuit 34 and timing signal generating circuit 92.

The viewing angle signals $\theta_x$ and $\theta_y$ produced by the line of sight detector 81 are supplied to a point of view coordinate converting circuit 93 which constitutes the point of sight detecting means together with the line of sight detector 81. In the point of view coordinate converting circuit 93, coordinates of point of view $(x_t, y_t)$ on the LCD 11 are calculated from the viewing angle signals $\theta_x$ and $\theta_y$ in accordance with the equation (3). The thus derived the coordinates of the point of view are supplied to the memory control circuit 34, LCD scanning circuit 91 and timing signal generating circuit 92. The timing signal generated by the timing signal generating circuit 92 is supplied to the first and second pixel shift element driver circuits 15-1 and 15-2 to control the operation thereof.

In the present embodiment, when the coordinates $(x_t, y_t)$ of the point of view of the user on the LCD 11 are detected by the point of view coordinate converting circuit 93, the read-out addresses for the frame memory 33 are controlled by the memory control circuit 34 to enhance the resolution for a desired region including the point of view P as illustrated in FIGS. 46A–46F. The thus read-out image data signals are supplied to the LCD 11 by means of the LCD scanning circuit 94, and at the same time the pixel shift is carried out in synchronism with the image data rewriting operation on a row or column including the point of view by controlling the pixels shift elements 15-1 and 15-2 by the timing signal generating circuit 92.

For instance, in case of improving the resolution by the scanning method of the first embodiment while the width $2\Delta x$ is set to N/5, the rewriting of the image data signals is performed as indicated by arrows in FIG. 52 in relation to a row $x_t$ including the point of view of the user. That is to say, in a first image data rewriting operation, the image data signals of all the rows from $1^{st}$ to $N^{th}$ are rewritten as shown by the arrow ab, while the pixel shift is effected at the point of view row $x_t$. In second and third image data rewriting operations, only image data signals corresponding to the region C from $(x_t-N/10)^{th}$ to $(x_t+N/10)^{th}$ rows are rewritten as denoted by the arrows ac and ad, while the pixel shift is conducted at the point of view row $x_t$. It should be noted that the image data signals for the rewritings denoted by the arrows ab, ac and ad are obtained by the different sampling timings.

To this end, the read-out addresses for the frame memory 33 are controlled as shown in FIG. 53 in accordance with the coordinates of the detected point of view of the user. During the first frame period T, the image data signal S8 corresponding to the from $1^{st}$ to $N^{th}$ rows is read-out and displayed for a period a, the image data signal S8 corresponding to the $(x_t-N/10)^{th}$ to $(x_t+N/10)^{th}$ rows are read-out and displayed for a period b, and the image data signal S8 corresponding to the $(x_t-N/10)^{th}$ to $(x_t+N/10)^{th}$ rows, but being shifted by one pixel with respect to the image data signals for the period b, are read-out and displayed for a period c.

FIG. 54 is a timing chart of the signal line data $Y_1$-$Y_N$, scanning line data $X_1$-$X_N$ and pixel shift positions ①, ② and ③. In the present embodiment, the display time for the period b is smaller than those for the periods a and c.

Therefore, like as the first embodiment, the brightness of the image signals for the periods a and c are decreased by 7/9 and the brightness of the image signals for the period b is increased by 7/3 such that a brightness of the displayed image does not fluctuate.

In the present embodiment, the resolution is selectively increased by using the scanning method of the first embodiment, but according to the invention, it is also possible to improve the resolution by using any of the scanning methods of the second to thirteenth embodiments. Moreover, in case of enhancing the resolution for the horizontally elongated region having the center corresponding to the x coordinate $x_t$ of the point of view P of the user on the LCD 11 and expanding in the up and down directions by $\pm\Delta x$ as illustrated in FIG. 46A or the horizontally elongated region including the point of sight P as depicted in FIG. 46C, it is sufficient to detect only the vertical line of sight angle information $\theta_y$, a one-dimensional position detector extending in the vertical direction may be used instead of the two dimensional position detector 84.

Similarly, in case of enhancing the resolution for the vertically elongated region having the center corresponding to the y coordinate $y_t$ of the point of view P of the user on the LCD 11 and expanding in the right and left directions by $\pm\Delta y$ as illustrated in FIG. 46E or the vertically elongated region including the point of view P as depicted in FIG. 46F, it is sufficient to detect only the horizontal line of sight angle information $\theta_x$, a one-dimensional position detector extending in the horizontal direction may be used instead of the two dimensional position detector 84.

As explained above, in the present embodiment, the point of view of the user on the LCD 11 is detected and the resolution is selectively increased for the region including the thus detected point of view, and thus the displayed image can be seen with the high resolution in an effective manner.

FIGS. 55 and 56 show a fifteenth embodiment of the image display apparatus according to the invention. In the present embodiment, from the input image signal of successive frames, a region in which an image does not move, i.e. a still picture region is extracted and the resolution is selectively improved in the thus extracted still picture region by effecting the image data rewriting several times while the pixel shift is carried out.

To this end, in the present embodiment, the input image signal S1 is supplied to the synchronizing signal extracting circuit 32 to extract the synchronizing signal as well as to the frame memory 33 to store the image data signals sampled at a higher sampling frequency than a normal sampling frequency by three times. At the same time, the input image signal S1 is supplied to a still picture region extracting circuit 95 to extract the still picture region. Also in FIG. 55, the A/D converter and D/A converter arranged at the input and output sides of the frame memory 33 are omitted.

The still picture extracting circuit 95 comprises two frame memories and a differential circuit. The image data signals of successive frames are stored into the two frame memories alternately, and the image data signals are read-out from the two frame memories in a parallel manner and are supplied to the differential circuit to derive a difference between successive frames. A region in the frame having a small difference is extracted as the still picture region. Instead of the differential circuit, a co-relation circuit may by utilized to calculate a co-relation between successive frames and a region in which corresponding points have a small amount of movement is detected as the still picture region.

The still picture region detected by the still picture extracting circuit 95 is supplied to the memory control circuit 34 and timing signal generating circuit 92. The synchronizing signal extracted by the synchronizing signal extracting circuit 32 is supplied to the memory control circuit 34, LCD scanning circuit 91 and timing signal generating circuit 92. The image data signals read-out of the frame memory 33 are supplied to the LCD 11.

The read-out addresses for the frame memory 33 are controlled by the memory control circuit 34 in accordance with the still picture region detected by the still picture extracting circuit 95 and the synchronizing signal extracted by the synchronizing signal extracting circuit 32. The read-out image data signals are supplied to the LCD 11 by means of the LCD scanning circuit 91 and the pixel shift is performed in synchronism with the rewriting the data for the still picture region by controlling the first and second pixel shift elements 13-1 and 15 via the pixel shift element driving circuits 15-1 and 15-2 in accordance with the timing signal supplied from the timing signal generating circuit 92.

In the present embodiment, the polarizing direction converting LC plate of the pixel shift element 13-1, 13-2 is formed by a so-called line electrode type, in which electrodes are divided corresponding to respective rows of LCD 11, and the pixel shift can be performed in synchronism with the image data rewriting at respective rows. Such a line electrode type polarizing direction converting LC plate has been disclosed in a co-pending U.S. patent application Ser. No. 08/589,706.

Figure 56A:
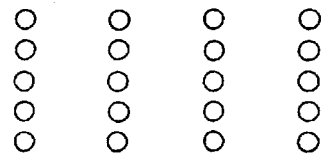
FIGS. 56A–56G are diagrams showing the pixel shift in the fifteenth embodiment.
Figure 56B:
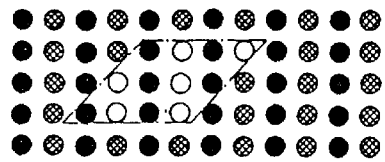
Figure 56C:
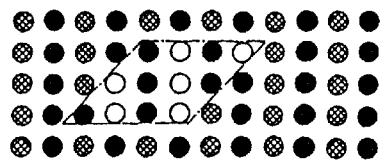

FIGS. 56A–56G are diagrams explaining the operation of the present embodiment. FIG. 56A shows an pixel arrangement of the LCD 11, and FIGS. 56B and 56C depict the image data signals of successive frames. By extracting the difference or co-relation between the successive frames, the still picture region denoted by a parallelogram is detected.

Figure 56D:
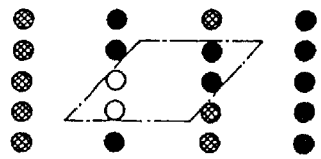
Figure 56E:
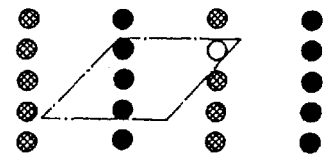
Figure 56F:
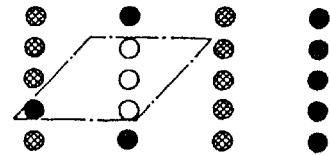
Figure 56G:
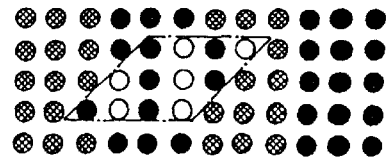

In the pixel shift position ①, the image data signals are rewritten at all the rows as shown in FIG. 56D, but in the pixel shift positions ② and ③, only the image data signals within the still picture region are rewritten as illustrated in FIGS. 56E and 56F. Therefore, the user can see the image shown in FIG. 56G which is a composition of the images shown in FIGS. 56D–56F. In this manner, the resolution can be selectively increased in the still picture region. In general, the user watches the still picture portion in the displayed image, the present embodiment is particularly suitable for displaying the image including the still picture portion.

Figure 57:
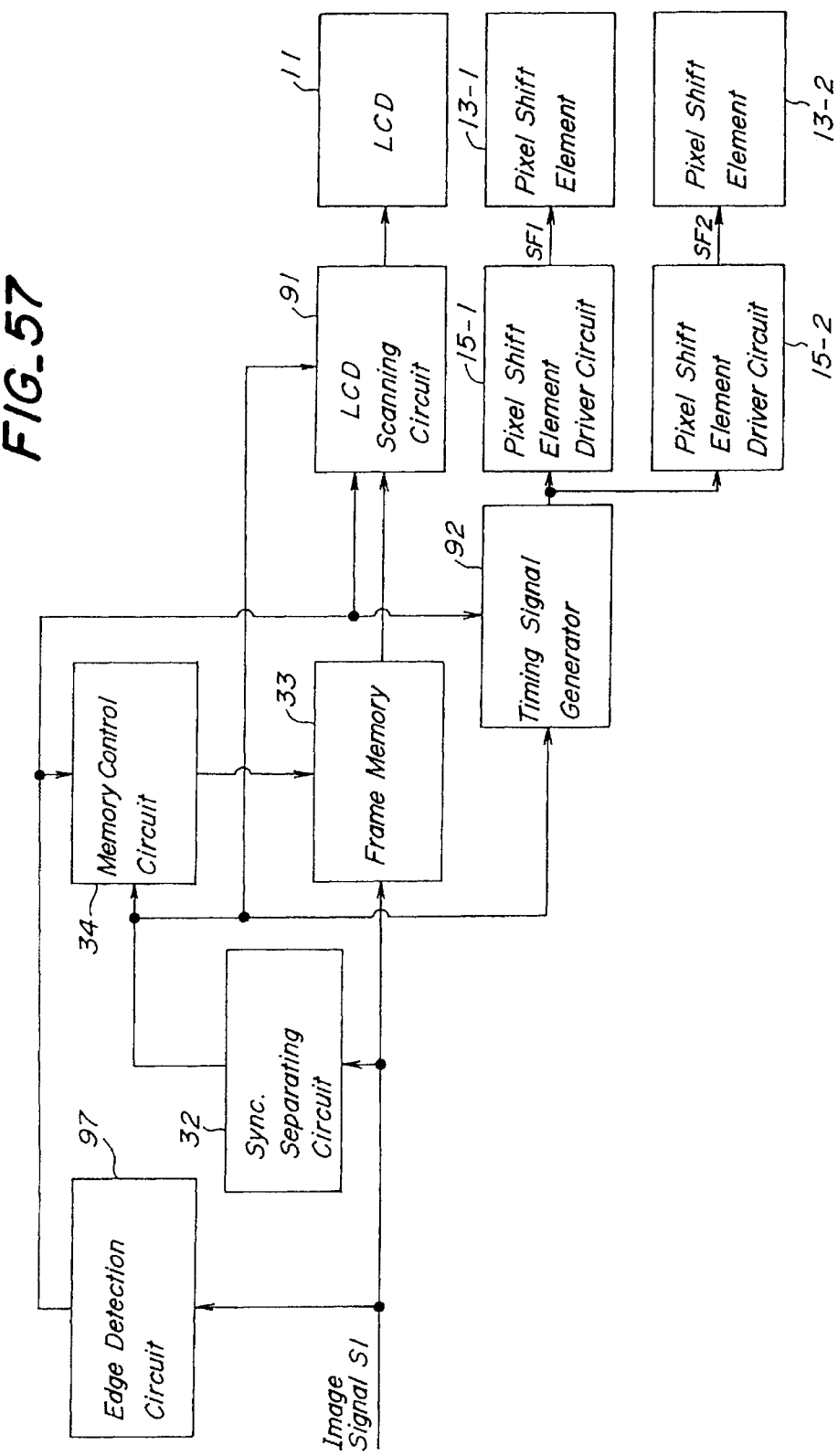
FIG. 57 is a block diagram representing a main portion of a sixteenth embodiment of the image display apparatus according to the invention.

FIGS. 57 and 58 depict a sixteenth embodiment of the image display apparatus according to the invention. In the present embodiment, a region having a high frequency component, i.e. an edge or contour portion in the image is detected from the input image signal, and the image data signals obtained by different sampling timings are selectively rewritten at the thus detected edge portion.

To this end, in this embodiment, as shown in FIG. 57, the input signal S1 is supplied not only to the synchronizing signal extracting circuit 32 and frame memory 33, but also to an edge detection circuit 97 to extract an edge portion of the input image. It should be noted that also in FIG. 57, the A/D converter and D/A converter provided at the input and output sides of the frame memory 33, respectively are omitted.

The edge detection circuit 97 comprises a frame memory and a differentiating circuit, and the image data signals obtained by sampling the input image signal S1 at a higher sampling frequency than a normal sampling frequency by three times are stored in the frame memory. The image data signals of successive rows are read-out and are supplied to the differentiating circuit to detect the edge portion. Instead of the differentiating circuit, use may be made of a differential circuit to derive a difference between successive image data signals.

The edge information detected by the edge detection circuit 97 is supplied to the memory control circuit 34, LCD scanning circuit 91 and timing signal generating circuit 92. The synchronizing signal extracted by the synchronizing signal extracting circuit 32 is supplied also to the memory control circuit 34, LCD scanning circuit 91 and timing signal generating circuit 92. The image data signals read-out of the frame memory 33 are supplied to the LCD scanning circuit 91.

The read-out addresses for the frame memory 33 are controlled by the memory control circuit 34 in accordance with the edge information detected by the edge detection circuit 97 as well as the synchronizing signal obtained by the synchronizing signal separating circuit 32, and the thus read-out image data signals are supplied to the LCD 11 by means of the LCD scanning circuit 91 and the pixel shift is carried out in synchronism with the rewriting of the image data signals at the detected edge portion by controlling the pixel shift elements 13-1 and 13-2 via the pixel shift element driving circuits 15-1 and 15-2, respectively by means of the timing signal generating circuit 92.

Also in the present embodiment, the line electrode type polarizing direction converting LC plates are used in the pixel shift elements 13-1 and 13-2 like as the fifteenth embodiment, and the pixel shift is performed in synchronism with the rewriting of the image data signals at respective rows of the LCD 11.

FIGS. 58A–58F are diagrams explaining the operation of the sixteenth embodiment. FIG. 58A shows an pixel arrangement of the LCD 11, and FIG. 58B depicts the image data signals of a frame sampled by the edge detection circuit 97. In the pixel shift position ①, the image data signals are rewritten at all the rows as shown in FIG. 58C, but in the pixel shift positions ② and ③, only the image data signals at the detected edge portion are rewritten as depicted by arrows in FIGS. 58D and 58E. In this manner, the user can see a composite image shown in FIG. 58F of the images shown in FIGS. 58C–58E. In this manner, the resolution can be selectively increased at the edge portion of the image. In case of displaying a still picture, the resolution can be selectively improved only at an in-focused image portion.

Figure 60:
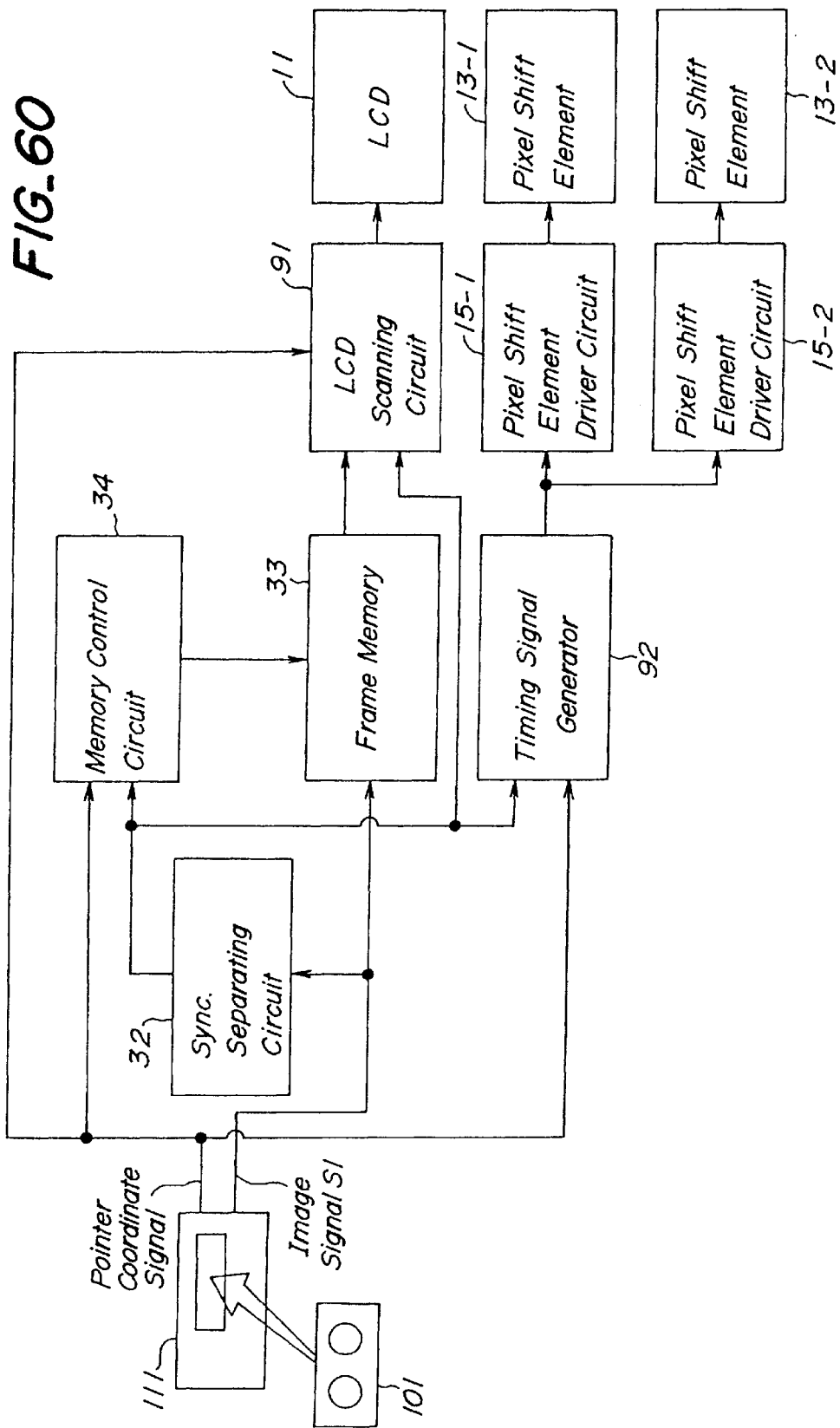
FIG. 60 is a block diagram illustrating a main portion of the seventeenth embodiment.
Figure 61:
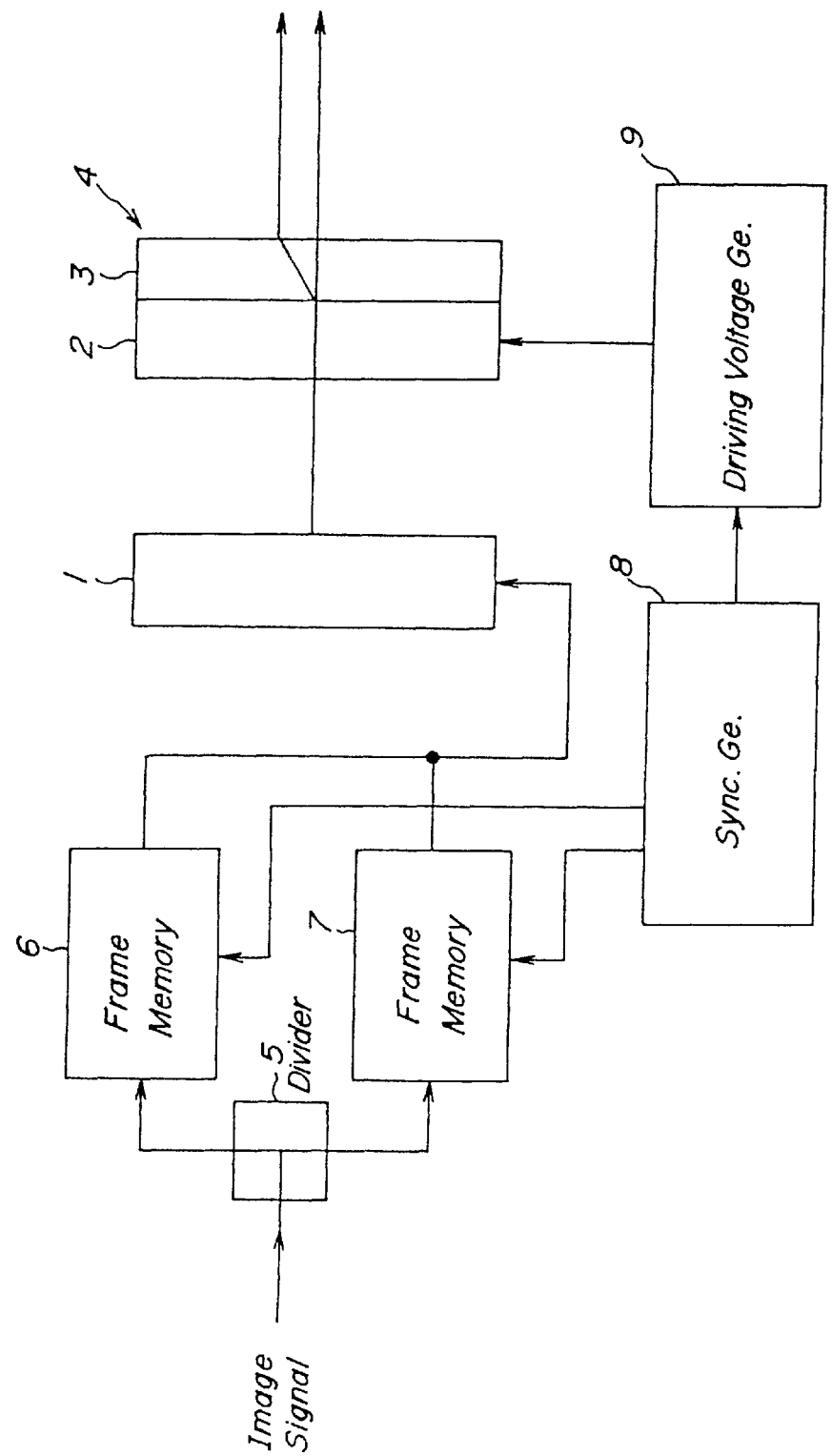
FIG. 61 is a block diagram showing a known image display apparatus.
Figure 63:
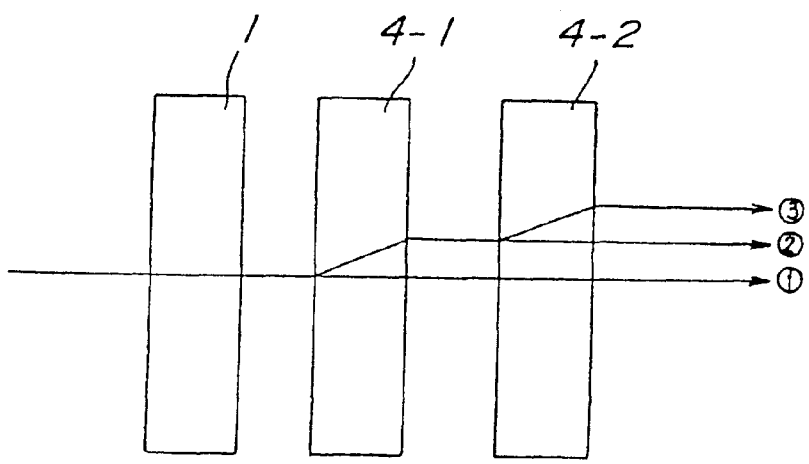
FIG. 63 is a schematic view depicting the pixel shift element of the known apparatus.
Figure 64:
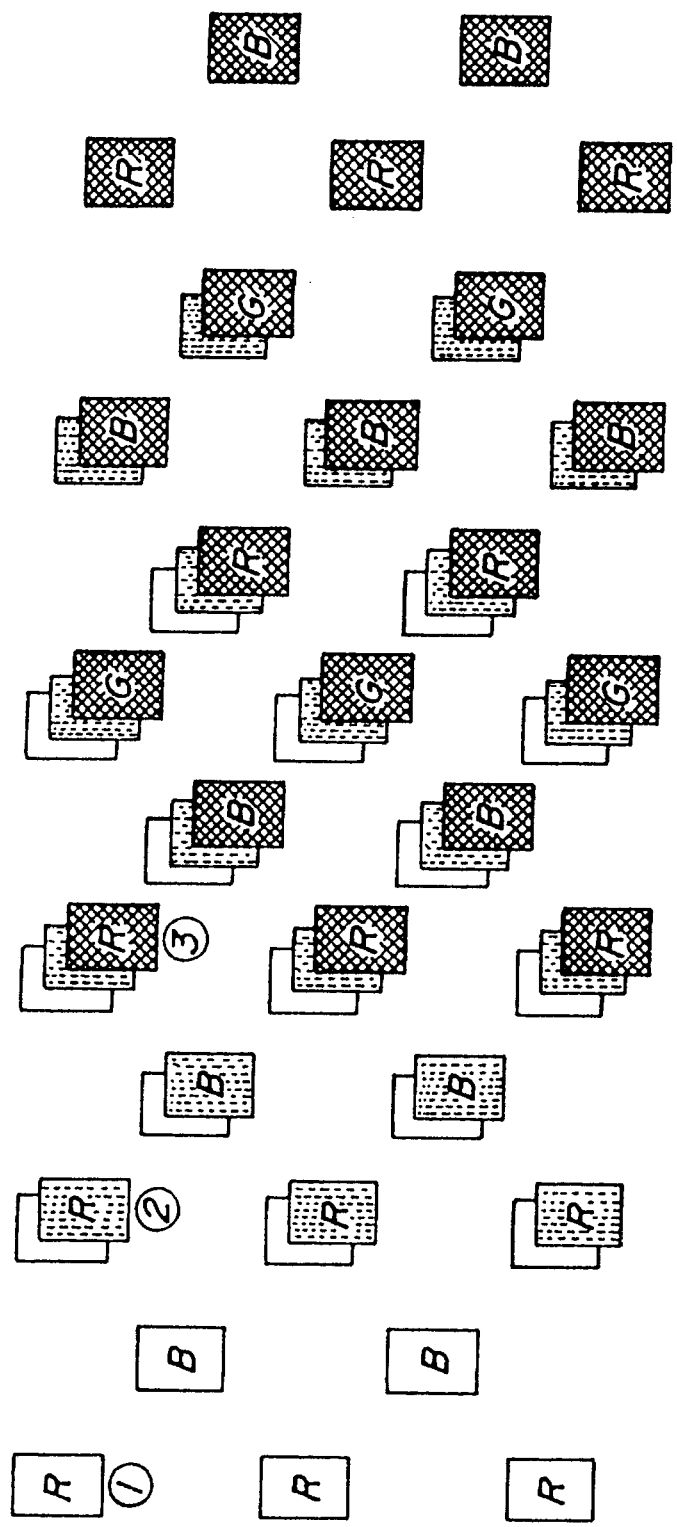
FIG. 64 is a schematic view explaining the operation of the known pixel shift element shown in FIG. 63.

FIGS. 59 and 60 show a seventeenth embodiment of the image display apparatus according to the invention. In the present embodiment, the image signal is recorded on a record medium and a region indication signal for indicating a region in an image at which the resolution is to be increased is also recorded on the record medium in synchronism with the image signal. Upon reproducing the record medium, the resolution is selectively improved under the control of the reproduced region indication signal.

For this purpose, as illustrated in FIG. 59, a record medium such as a video tape 101 is installed in a tape deck 102 and a reproduced image is displayed on a monitor 103 of an image processing device 104. During the reproduction, a desired region in a displayed image in which the resolution is to be enhanced is denoted by operating a pointer 105, and a pointer coordinate signal is supplied to the video deck 102 and is recorded on the video tape 101 in synchronism with the image signal.

Upon reproducing the video tape 101 having the pointer coordinate signal recorded thereon on the LCD 11, the pointer coordinate signal is read-out of the video tape 101 and the image data signal rewriting operation is carried out selectively at a region denoted by the pointer coordinate signal by rewriting the image data signals in this region several times like as the fourteenth embodiment.

FIG. 60 is a circuit diagram showing a main portion of the LCD driving circuit of the present embodiment. The video tape 101 is set on a video playback device 111 and the image signal S1 and pointer coordinate signal are read-out. The thus read-out image signal S1 is supplied to the synchronizing signal separating circuit 32 and frame memory 33 and is processed in the same manner as that of the previous embodiments. The read-out pointer coordinate signal is supplied to the memory control circuit 34, LCD scanning circuit 91 and timing signal generating circuit 92. Also in FIG. 60, the A/D converter and D/A converter are omitted.

In this manner, the resolution can be improved selectively in the region denoted by the pointer coordinate signal in the same manner as that of the fourteenth embodiment.

In the present embodiment, when only one region is denoted by the pointer, it is not necessary to divide the pixel shift elements 13-1 and 13-2, but when a plurality of regions may be denoted in one image, the pixel shift elements have to be divided like as the fifteenth and sixteenth embodiments. That is to say, the line electrode type polarizing direction converting LC plates are used and the pixel shift is performed in synchronism with the rewriting operation for respective rows.

In this manner, in the present embodiment, the resolution can be selectively improved for one or more regions denoted by the pointer coordinate signal in accordance with contents of the displayed image.

The present invention is not limited to the embodiments explained above, but many alternations and modifications may be conceived by those skilled in the art with the scope of the invention. For instance, in the above embodiments, the image displayed on the LCD 11 is shifted in an optical manner by using the pixel shift elements, but according to the invention, the LCD 11 may be shifted by means of a suitable moving device such as a piezoelectric element. Furthermore, the present invention is not only applicable to the HMD in which the displayed image is seen via the eyepiece optical system, but also applicable to other applications in which the image displayed on CRT or LCD is directly seen with naked eyes.

As described above in detail, according to the invention, the image is displayed over the substantially whole area of the display plane, and at a portion of the image plane, the resolution is increased by the pixel shift. Therefore, the relatively high resolution can be realized even by using the display device having a relatively large number of scanning lines or even by performing the pixel shift at a large number of times.

What is claimed is:

1. An image display apparatus comprising:
    an image display plane comprising a plurality of pixels arranged with a pixel pitch;
    image display control means for receiving an input image signal and, in accordance with said input image signal, displaying an image on a sustantially whole area of the image display plane and a part of the image, which is less than the entire image, on a selected region of the image display plane, said selected region being less than said substantially whole area, by shifting image display positions of the image with respect to said image display plane in a given direction by an integer multiple or an inverse of an integer multiple of the pixel pitch of the image display plane; and
    image display plane shift means for effectively and selectively shifting, in synchronism with the operation of said image display control means, a display position of said part of said image with respect to said selected region of said image display plane, in a direction opposite to said given direction in which said image display position shifting is carried out,
    wherein said image display control means displays, for said selected region of the image display plane, said part of the image whose display position is shifted, plural times for a given time period, and displays, for a remaining portion of the image display plane, the image only once for said given time period.

2. An apparatus according to claim 1, wherein said image display control means is constructed such that a first image corresponding to the whole image display plane is displayed at a first brightness and then a second image a part of which is shifted in the given direction with respect to said first image is displayed at a second brightness which is different from said first brightness.

3. An apparatus according to claim 1, wherein said image display control means is constructed such that the image is displayed on the image display plane in such a manner that the vertical resolution of an image portion displayed in said selected region of the image display plane becomes higher than that of an image portion displayed in the remaining part of the image display plane.

4. An apparatus according to claim 1, wherein said image display control means is constructed such that the image is displayed in such a manner that time periods for rewriting the image portion displayed in said selected region of the image display plane become identical with each other.

5. An apparatus according to claim 1, wherein said image display control means is constructed such that the image is displayed by scanning successive vertical columns of the image display plane in a horizontal direction.

6. An apparatus according to claim 1, wherein said image display plane is divided into a plurality of portions, and said image display control means is constructed such that images are displayed on substantially whole areas of said respective portions of the image display plane and a display position of a part of an image displayed in a part of each of said plurality of portions is selectively shifted.

7. An apparatus according to claim 1, wherein the apparatus further comprises a means for detecting a point of view of a user on the image display plane, and said selected region in the image display plane is set to an area which contains said point of view.

8. An apparatus according to claim 1, wherein said apparatus further comprises a means for extracting a part of the image displayed on the image display plane having a high spatial frequency, and said selected region in the image display plane is set to an area including said part of the image.

9. An apparatus according to claim 1, wherein said selected region in the image display plane is determined in accordance with a region denoting signal transmitted in synchronism with the input image signal.

10. An apparatus according to claim 1, wherein said image display means comprises first and second optical image shift elements arranged successively along an optical axis, each of which includes a polarizing direction converting liquid crystal panel and a birefringent plate.

11. An apparatus according to claim 10, wherein said polarizing direction converting liquid crystal panel is of a line electrode type, and said image display plane shift means is constructed such that when image data signals for lines in the selected region are to be rewritten, an area of the image display plane corresponding to the selected region is shifted.

12. An apparatus according to claim 1, wherein said image display plane shift means is constructed such that when image data signals for a center line of said selected region of the image display plane are to be rewritten, the image display plane is shifted.

13. An apparatus according to claim 1, wherein said selected region in the image display plane is formed to have a plurality of areas which are separated from each other.

14. An apparatus according to claim 1, wherein the apparatus further comprises a means for extracting, from the input image signal, a part of the images which shows a small or no movement between successive frames, and said selected region in the image display plane is set to an area which contains said part of images.

15. The image display apparatus according to claim 1, wherein said selected region is located at substantially a center of said image display plane.

16. The image display apparatus according to claim 1, wherein different pixel data is used for each of said plural times of displaying said part of said image, and said different pixel data is obtained by sampling said input image signal at plural sampling timings.

17. An image display apparatus, comprising:

an image display plane comprising a plurality of pixels arranged with a pixel pitch;

image display control means for receiving an input image signal and, in accordance with said input image signal, displaying an image on a substantially whole area of the image display plane and a part of the image on a selected region of the image display plane by shifting image display positions of the image with respect to said image display plane in a given direction by an integer multiple or an inverse of an integer multiple of the pixel pitch of the image display plane; and image display plane shift means for effectively and selectively shifting, in synchronism with the operation of said image display control means, a display position of said part of said image with respect to said selected region of said image display plane, in a direction opposite to said given direction in which said image display position shifting is carried out, wherein said selected region in the image display plane is formed to have a plurality of areas which are separated from each other.

18. An image display apparatus, comprising:

an image display plane comprising a plurality of pixels arranged with a pixel pitch;

image display control means for receiving an input image signal and, in accordance with said input image signal, displaying an image on a substantially whole area of the image display plane and a part of the image on a selected region of the image display plane by shifting image display positions of the image with respect to said image display plane in a given direction by an integer multiple or an inverse of an integer multiple of the pixel pitch of the image display plane;

image display plane shift means for effectively and selectively shifting, in synchronism with the operation of said image display control means, a display position of said part of said image with respect to said selected region of said image display plane, in a direction opposite to said given direction in which said image display position shifting is carried out; and means for extracting, from the input image signal, a part of the images which shows small or no movement between successive frames, and said selected region in the image display plane is set to an area which contains said part of images.

* * * * *